(12) United States Patent
Maxfield et al.

(10) Patent No.: US 11,692,975 B2
(45) Date of Patent: Jul. 4, 2023

(54) SYSTEMS AND METHODS FOR GENERATING ULTRASONIC WAVES, EXCITING SPECIAL CLASSES OF ULTRASONIC TRANSDUCERS AND ULTRASONIC DEVICES FOR ENGINEERING MEASUREMENTS

(71) Applicant: itRobotics, Inc., Missouri City, TX (US)

(72) Inventors: Bruce Wright Maxfield, Missouri City, TX (US); Zhiyong Wang, Missouri City, TX (US); Anouar Jamoussi, Houston, TX (US); Mansoor Shah, Missouri City, TX (US)

(73) Assignee: itRobotics, Inc., Missouri City, TX (US)

( * ) Notice: Subject to any disclaimer, the term of this patent is extended or adjusted under 35 U.S.C. 154(b) by 238 days.

(21) Appl. No.: 16/251,384

(22) Filed: Jan. 18, 2019

(65) Prior Publication Data

US 2019/0227037 A1    Jul. 25, 2019

Related U.S. Application Data

(60) Provisional application No. 62/619,491, filed on Jan. 19, 2018.

(51) Int. Cl.
*G01N 29/24* (2006.01)
*G01N 29/04* (2006.01)
(Continued)

(52) U.S. Cl.
CPC ......... *G01N 29/2412* (2013.01); *B06B 1/04* (2013.01); *B06B 1/08* (2013.01); *G01N 29/041* (2013.01);
(Continued)

(58) Field of Classification Search
CPC ............ G01N 29/2412; G01N 29/041; G01N 29/403; G01N 2291/0421;
(Continued)

(56) References Cited

U.S. PATENT DOCUMENTS 3,697,867 A * 10/1972 Kleesattel ................ B06B 1/04
324/207.15
4,471,658 A * 9/1984 Morimoto ................ B06B 1/04
324/220
(Continued)

FOREIGN PATENT DOCUMENTS

DE    3634374 A1    4/1988
EP    0451375 B1    10/1991
(Continued)

OTHER PUBLICATIONS

Written Opinion and International Search Report of PCT/US2019/014111, dated Jan. 7, 2019.
(Continued)

*Primary Examiner* — Lisa M Caputo
*Assistant Examiner* — Rose M Miller
(74) *Attorney, Agent, or Firm* — Polsinelli PC

(57) ABSTRACT

Embodiments include an electromagnetic acoustic transducer (EMAT) system. The EMAT system includes a plurality of magnets and a conductor set. The plurality of magnets has a like pole arrangement and wherein each magnet is in close proximity to one another. The conductor set includes electrically conductive elements. A portion of the conductor set is positioned proximate to the plurality of magnets. The plurality of magnets and the conductor set are positioned proximate to a test object. The EMAT system is configured to perform at least one of generating and receiving an elastic wave. Embodiments also include a method of elastic wave measurement for nondestructive testing and
(Continued)

evaluation. The method includes the steps of positioning an EMAT proximate a test object, generating an elastic wave such that the elastic wave propagates about the test object, detecting the elastic wave propagating about the test object, and analyzing difference in elastic wave character between the elastic wave in the generating step and the elastic wave in the detecting step to evaluate the test object.

11 Claims, 26 Drawing Sheets

(51) Int. Cl.
  *B06B 1/04* (2006.01)
  *B06B 1/08* (2006.01)
(52) U.S. Cl.
  CPC ... *G01N 29/043* (2013.01); *G01N 2291/0421* (2013.01); *G01N 2291/0422* (2013.01); *G01N 2291/0423* (2013.01); *G01N 2291/0425* (2013.01); *G01N 2291/0427* (2013.01)
(58) Field of Classification Search
  CPC ... G01N 2291/0422; G01N 2291/0423; G01N 2291/0427; G01N 2291/0425; B06B 1/04; B06B 1/08
  USPC .......................................................... 73/643
  See application file for complete search history.

(56) References Cited

U.S. PATENT DOCUMENTS

| | | |
|---|---|---|
| 5,148,414 A | 9/1992 | Graff et al. |
| 5,936,162 A * | 8/1999 | Lingenberg ............... B06B 1/04 |
| | | 73/643 |
| 2007/0074572 A1 | 4/2007 | Koch et al. |
| 2014/0028300 A1 | 1/2014 | Jamoussi et al. |
| 2017/0333946 A1 | 11/2017 | Cegla et al. |
| 2020/0011838 A1* | 1/2020 | Bondurant ............. G01N 29/11 |

FOREIGN PATENT DOCUMENTS

| | | |
|---|---|---|
| GB | 2545044 A | 6/2017 |
| JP | 2014081235 A | 5/2014 |
| WO | 2016066997 A1 | 5/2016 |

OTHER PUBLICATIONS

English Abstract of JP2014081235 retrived from www.espacenet.com.

S.J. Turner and B.W. Maxfield, "Polarized shear waves for crack detection and characterization," AIP Conference Proceedings, vol. 1211, p. 995 (2009); 8 pgs.

* cited by examiner

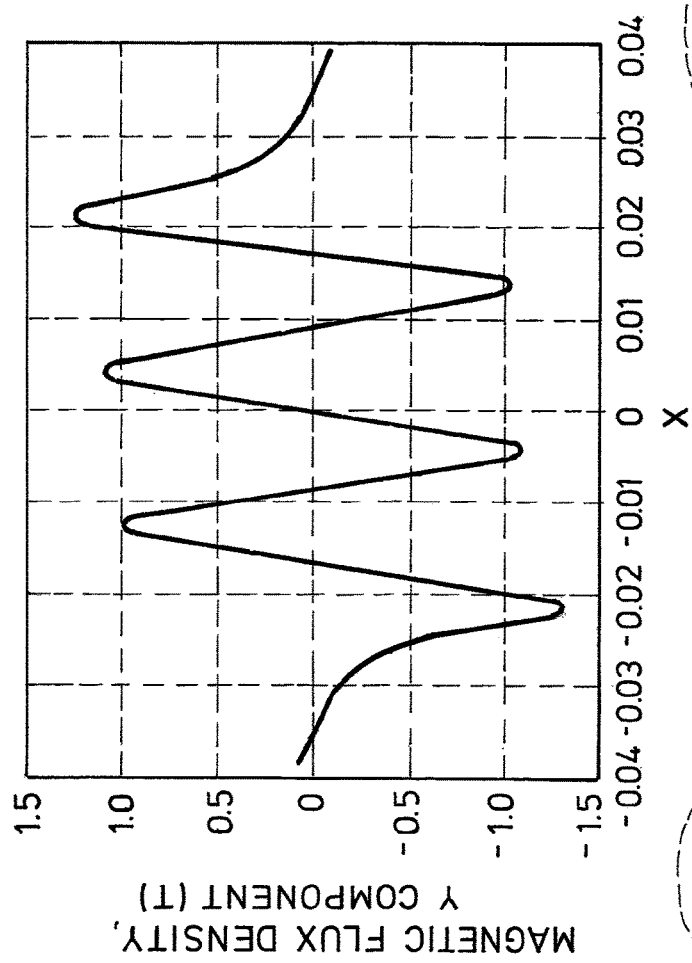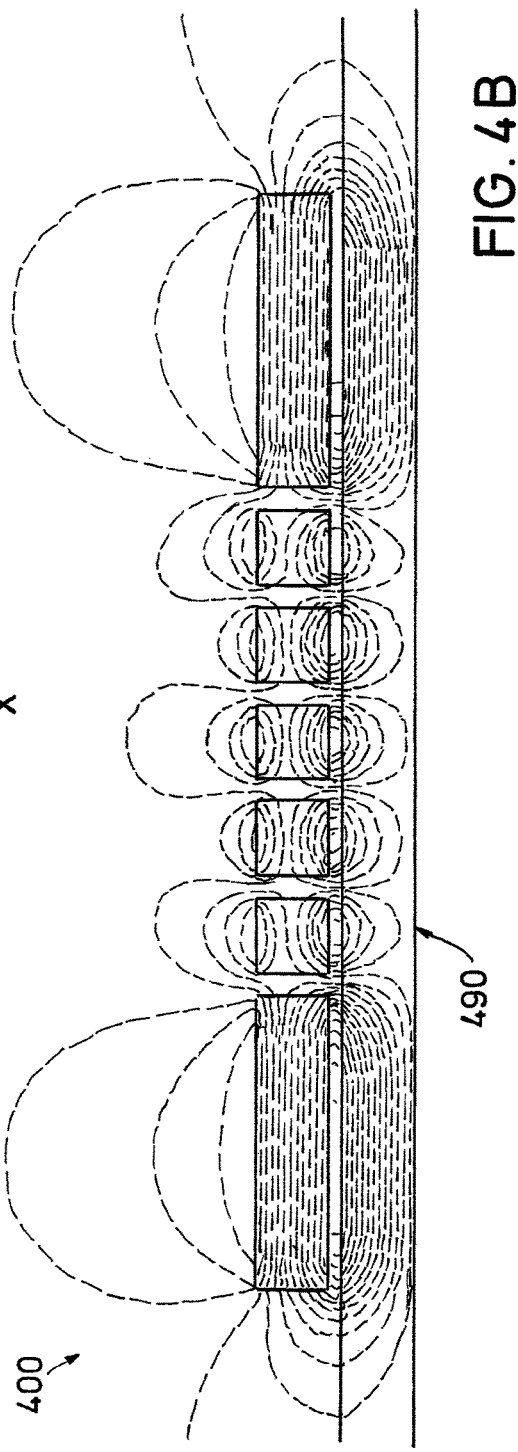

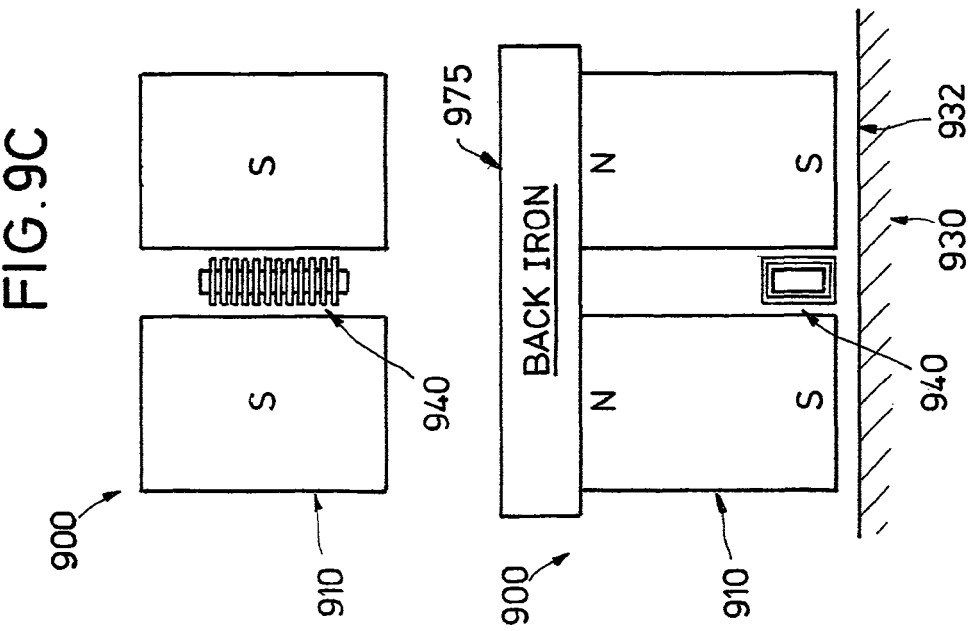
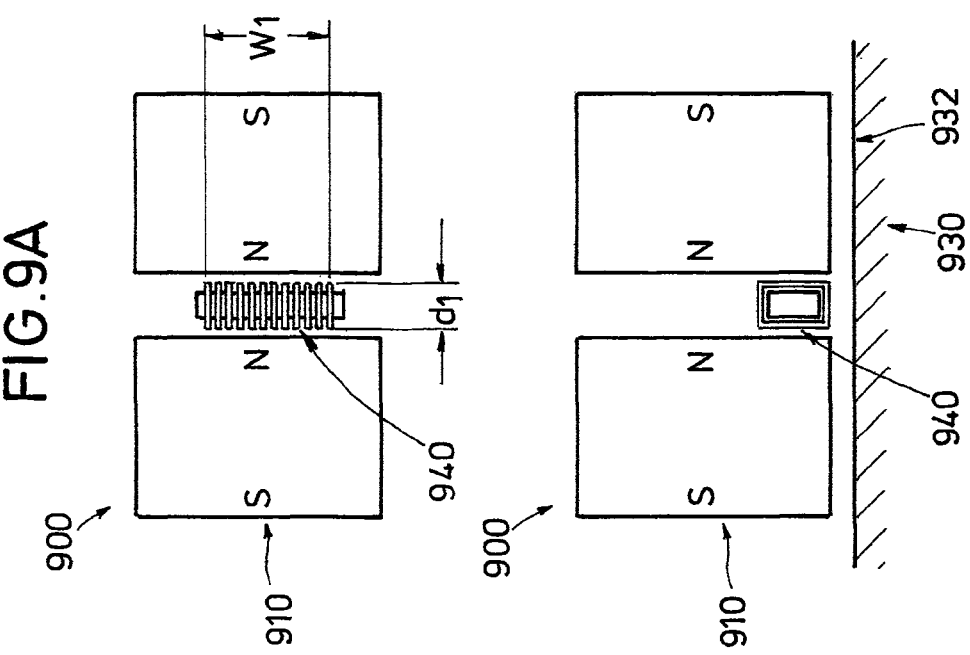

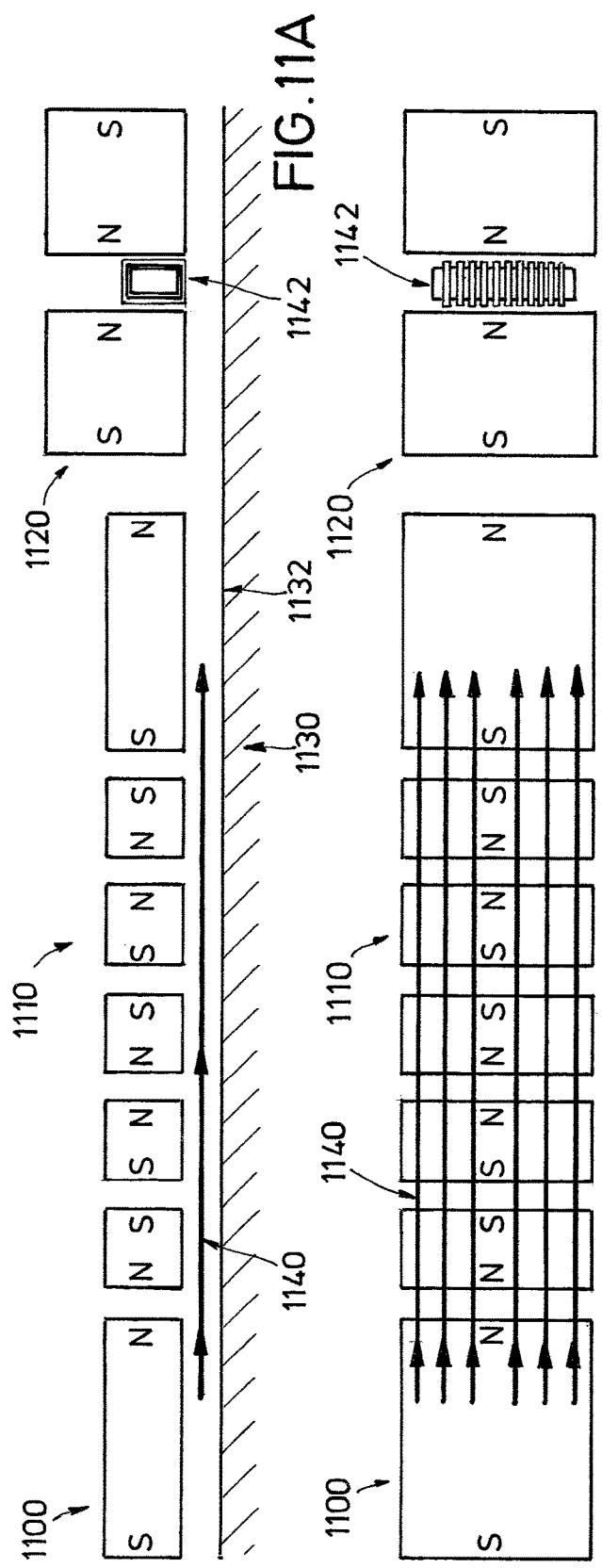
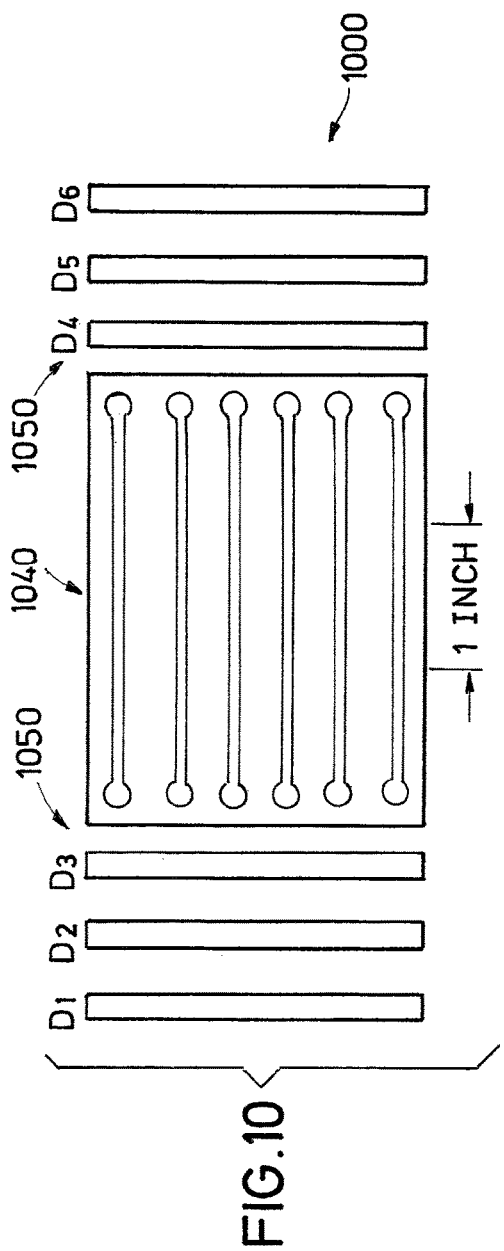

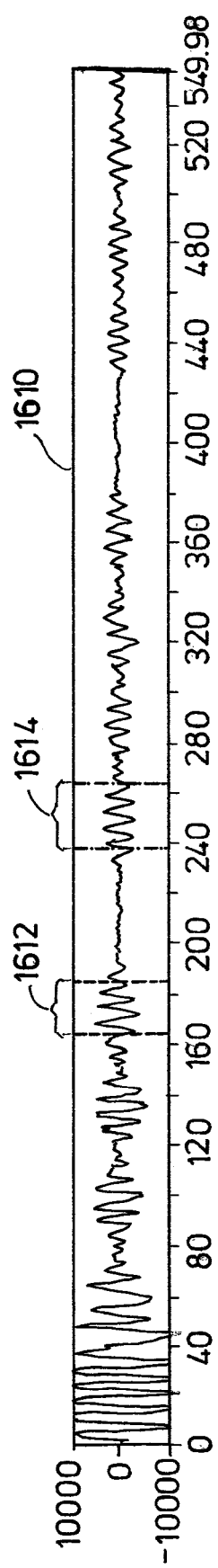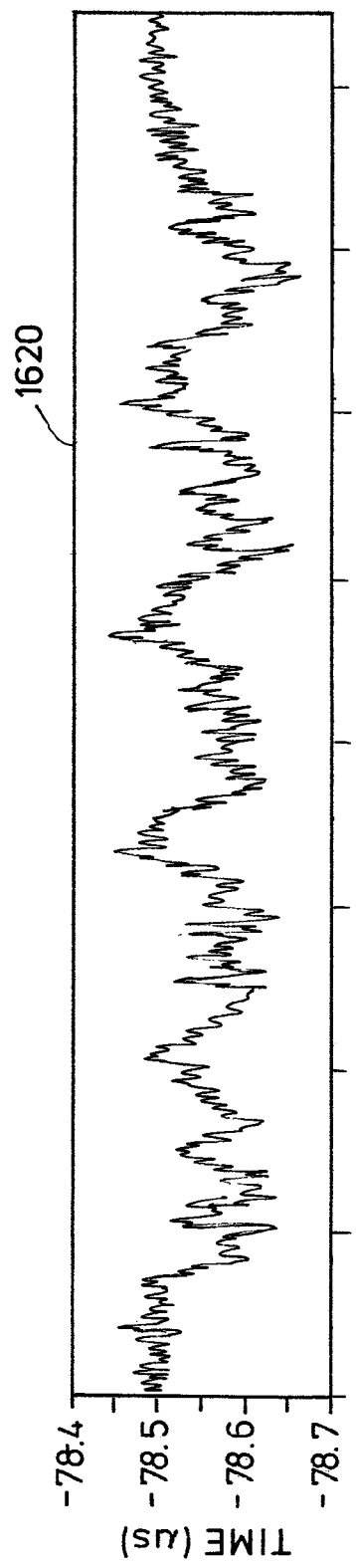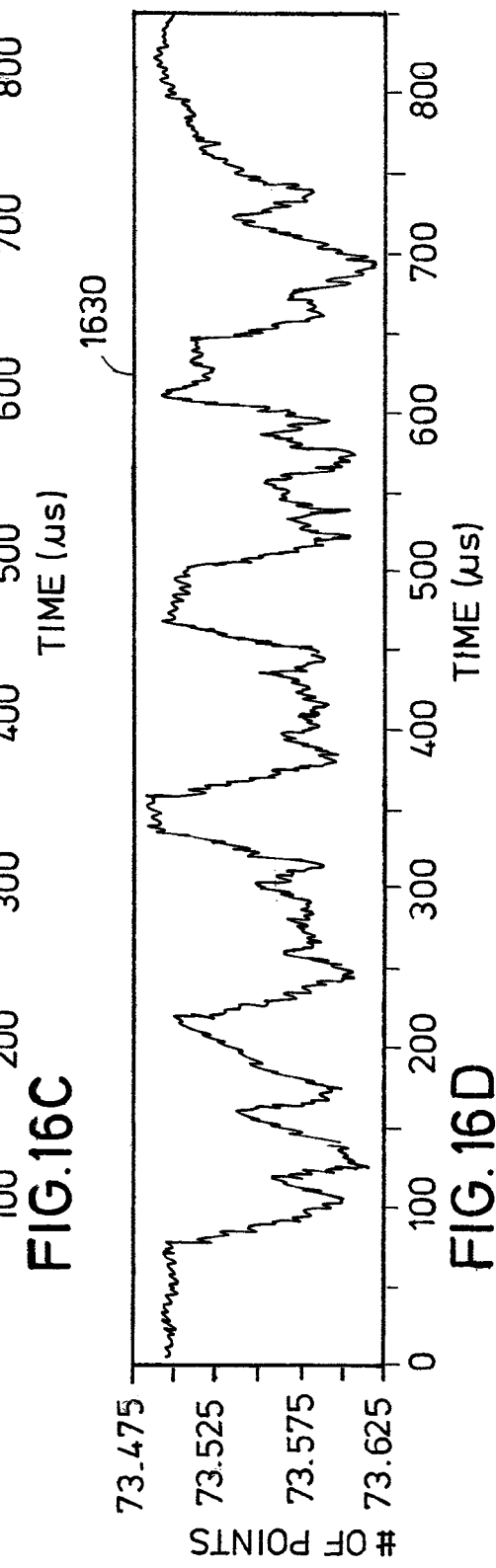

SYSTEMS AND METHODS FOR GENERATING ULTRASONIC WAVES, EXCITING SPECIAL CLASSES OF ULTRASONIC TRANSDUCERS AND ULTRASONIC DEVICES FOR ENGINEERING MEASUREMENTS

RELATED APPLICATION

The disclosure is related to, and claims priority from, U.S. Provisional Patent Application 62/619,491, filed on Jan. 19, 2018, the disclosure of which is incorporated herein by reference in its entirety.

BACKGROUND

1. Field

The present disclosure relates generally to devices of and methods for nondestructive testing and evaluation. More particularly, the present disclosure relates to ultrasonic nondestructive testing and evaluation and still more particularly relates to utilizing electromagnetic acoustic transducers for ultrasonic nondestructive testing and evaluation.

2. Description of the Related Art

Ultrasonic nondestructive testing (NDT) and ultrasonic nondestructive evaluation (NDE) are widely employed to locate material anomalies some of which may be detrimental to the safety and/or effective performance of bodies, assemblies and subsystems containing these material anomalies. Within the broad range of methods and techniques that are employed in ultrasonic NDT/NDE, a particular class of ultrasonic transducers called electromagnetic acoustic transducers (EMATs) frequently exhibit very useful and practical characteristics not available through the use of other types of ultrasonic transduction mechanisms. EMATs may be used to detect and characterize material anomalies such as cracks, pits and the like when the test object is at a significantly elevated temperature or moving at high speed with respect to the NDT/NDE system. Additionally, EMATs have certain advantages when being used to determine various physical properties of materials.

EMATs have several advantages for generating elastic displacements within a test object. These advantages include the ability to perform in the total absence of any physical medium between either the transmitting or receiving conductor sets and the test object. From these advantages flows the ability to use properly designed EMATs at elevated temperatures and at high relative speed between the EMAT assembly and the test object surface. EMATs are also more tolerant with respect to the cleanliness of the test object surface, which is a rigid requirement for traditional, non-EMAT ultrasonic NDT/NDE methods. Ultrasound generated by transient thermoelastic forces such as laser pulses do not always require very clean surfaces, however thermoelastic forces may depend strongly on surface conditions. Ultrasound generated by air coupled transducers may not require very clean surfaces. However, air coupled transducers have several limitations related to sensitivity and deployment factors.

SUMMARY

Conventional EMATs may have certain limited capabilities when used for NDT/NDE applications. Accordingly, there is a need for magnet arrangements that are able to generate many different useful elastic wave modes when compared with conventional magnet structure configurations. Also, there is a need for EMAT devices having improved magnetic and electronic circuit designs and methods for generating and utilizing various types of ultrasonic waves including the improved EMAT devices. Some EMAT embodiments presented in this disclosure have applications beyond their use in NDT/NDE systems. A class of EMATs which may be referred to as Like Pole Magnetic Structures (LPMS) can be configured to exhibit certain very useful characteristics. A part of this disclosure describes several new and practical forms of LPMS. These EMATs often have superior characteristics when compared to more conventional EMATs. Also, there is a need for ultrasonic NDT/NDE methods that have applications that go beyond merely detecting and quantifying material anomalies. Such ultrasonic NDT/NDE methods may allow measurement of various physical properties and characteristics of metallic or other engineering materials, such as measurement of plate thickness, plate thickness variation, plate width and plate width variation, calculation of elastic wave velocities and elastic moduli, and determining the temperature of a test object or a portion thereof.

One aspect of this disclosure presents various embodiments of electromagnetic acoustic transducer (EMAT) configurations for generating and receiving various types of elastic wave modes in magnetic and nonmagnetic materials. Large magnetic fields are desired in an active region of transmitting and receiving EMAT conductor sets. The current that runs through a transmitting conductor set is provided by electronics and circuits suitable to maximize induced currents responsible for generating the desired Lorentz force. Various magnet and conductor set configurations are used to generate various elastic wave modes within the test object. EMAT configurations presented and described in this disclosure exhibit enhanced generation and reception efficiency and are lighter in weight and smaller in physical size than more conventional EMAT configurations.

Another aspect of this disclosure relates to methods of deploying elastic wave generators and receivers for NDT/NDE inspection purposes. EMATs can be configured to address practical NDT/NDE measurement situations and engineering problems which may include their use in self-adjusting and high-speed measurement systems.

Yet another aspect of this disclosure relates to the use of certain configurations of a plurality of magnets. The magnets are arranged so that like magnetic poles may face each other. The like magnetic poles may be in close proximity to each other. Such a configuration is referred to as a like pole magnetic structure (LPMS). The LPMS may be configured in many different ways such as a primarily periodic arrangement, a primarily non-periodic arrangement, arrangements including multiple rows not necessarily aligned, and the like. Note should be taken that there is no requirement for any material to be set between or in close proximity to the like poles or any other part of the LPMS. Note should also be taken that additional advantages of LPMS may result from the choice of material placed between and properly positioned with respect to adjacent like poles. Additional note should be taken that there is no requirement that the like pole faces be set at any particular angle with respect to the magnetic axis of the individual magnets included in the LPMS.

Embodiments disclosed herein include an EMAT system for nondestructive testing and evaluation of a test object. The EMAT system includes a plurality of magnets and a conductor set. The plurality of magnets has a like pole arrangement. Each magnet is in close proximity to one another. The conductor set includes electrically conductive elements. A portion of the conductor set is positioned proximate to the plurality of magnets. The plurality of magnets and the conductor set are adapted to be positioned proximate to the test object. The EMAT system is configured to perform at least one of generating and receiving an elastic wave.

In some embodiments, the elastic wave includes a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, a Lamb-like wave, an interfacial wave, a pipe mode, and combinations thereof.

In some embodiments, the like pole arrangement includes the plurality of magnets being serially spaced. The plurality of magnets is adapted to generate magnetic field lines emanating from each magnet pole intersecting a surface of the test object substantially perpendicularly when the test object is positioned proximate to each magnet pole.

In some embodiments, the EMAT system further includes an EMAT driver. The EMAT driver is configured to provide current to the conductor set. In some embodiments, the EMAT driver utilizes impedance matching between the transmitting EMAT and the EMAT driver.

In some embodiments, the test object includes magnetic material. The EMAT system is configured to minimize generation and detection of magnetic noise from the test object.

In some embodiments, the EMAT system further includes a magnet separator. The magnet separator is configured to provide fixation of the like pole arrangement of the plurality of magnets.

Embodiments disclosed herein also include an EMAT based elastic wave measurement system for nondestructive testing and evaluation of a test object. The EMAT based elastic wave measurement system includes a receiving EMAT. The receiving EMAT is configured to receive an elastic wave when the receiving EMAT is positioned proximate to the test object.

In some embodiments, the elastic wave includes a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, a Lamb-like wave, an interfacial wave, a pipe mode, and combinations thereof.

In some embodiments, the receiving EMAT further includes a plurality of magnets and a conductor set. The plurality of magnets has a like pole arrangement. Each magnet is in close proximity to one another. The conductor set includes electrically conductive elements. A portion of the conductor set is positioned proximate to the plurality of magnets. The plurality of magnets and the conductor set are adapted to be positioned proximate to the test object. In some embodiments, the like pole arrangement includes the plurality of magnets being serially spaced. The plurality of magnets is adapted to generate magnetic field lines emanating from each magnet pole intersecting a surface of the test object substantially perpendicularly when the test object is positioned proximate to each magnet pole.

In some embodiments, the test object includes magnetic material. The receiving EMAT is configured to minimize generation and detection of magnetic noise from the test object.

In some embodiments, the EMAT based elastic wave measurement system further includes a transmitting EMAT. The transmitting EMAT is configured to generate the elastic wave when the transmitting EMAT is positioned proximate to the test object. In some embodiments, the transmitting EMAT further includes a plurality of magnets and a conductor set. The plurality of magnets has a like pole arrangement. Each magnet is in close proximity to one another. The conductor set includes electrically conductive elements. A portion of the conductor set is positioned proximate to the plurality of magnets. The plurality of magnets and the conductor set are adapted to be positioned proximate to the test object. In some embodiments, the like pole arrangement includes the plurality of magnets being serially spaced. The plurality of magnets is adapted to generate magnetic field lines emanating from each magnet pole intersecting a surface of the test object substantially perpendicularly when the test object is positioned proximate to each magnet pole. In some embodiments, the EMAT based elastic wave measurement system further includes an EMAT driver. In some embodiments, the EMAT driver utilizes impedance matching between the transmitting EMAT and the EMAT driver. The EMAT driver is configured to provide current to the transmitting EMAT. In some embodiments, the EMAT based elastic wave measurement system further includes a system controller, a high speed digital output, a receiver signal conditioning system, a signal digitizer, a data analysis and pre-processing system, and a user interface with processing system. The system controller includes software for system management. The high speed digital output is configured to receive input from the system controller and deliver digital output signals for generating a desired waveform via the EMAT driver and the transmitting EMAT. The receiver signal conditioning system is configured to receive input from the receiving EMAT and deliver a waveform input to the signal digitizer. The signal digitizer is configured to receive input from the system controller and deliver a digitized version of the waveform input to a data analysis and pre-processing system. The data analysis and pre-processing system is configured to extract predetermined information from the digitized version of the waveform input. The user interface with processing system includes a console for a measurement parameter input. The user interface with processing system is configured to display information received from the data analysis and pre-processing system and deliver the measurement parameter input to the system controller.

Embodiments disclosed herein also include an EMAT system for nondestructive testing and evaluation of a test object. The EMAT system includes a plurality of magnets, a first conductor set, a second conductor set, a first EMAT driver, and a second EMAT driver. The plurality of magnets has a like pole arrangement. Each magnet is in close proximity to one another. The first conductor set includes electrically conductive elements. A portion of the first conductor set is positioned proximate to the plurality of magnets. The second conductor set includes electrically conductive elements. A portion of the second conductor set is positioned proximate to the plurality of magnets. The first EMAT driver is configured to provide current to the first conductor set. The second EMAT driver is configured to provide current to the second conductor set. The plurality of magnets, the first conductor set, and the second conductor set are adapted to be positioned proximate to the test object. The EMAT system is configured to generate at least two elastic waves.

In some embodiments, the at least two elastic waves have different phases.

In some embodiments, the at least two elastic waves have different frequencies.

Embodiments disclosed herein also include a method of elastic wave measurement for nondestructive testing and evaluation of a test object. The method includes the steps of: positioning a first EMAT proximate the test object; generating an elastic wave such that the elastic wave propagates in or on the test object; detecting the elastic wave propagating in or on the test object via the first EMAT; and analyzing differences in elastic wave character between the elastic wave in the generating step and the elastic wave in the detecting step to evaluate the test object.

In some embodiments, the elastic wave includes a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, a Lamb-like wave, an interfacial wave, a pipe mode, and combinations thereof.

In some embodiments, the first EMAT includes a plurality of magnets and a conductor set. The plurality of magnets has a like pole arrangement. Each magnet is in close proximity to one another. The conductor set includes electrically conductive elements. A portion of the conductor set is positioned proximate to the plurality of magnets. The plurality of magnets and the conductor set are positioned proximate to the test object.

In some embodiments, the method further includes the step of positioning a second EMAT proximate the test object. The elastic wave is generated by the second EMAT in the generating step.

Embodiments disclosed herein also include a method of elastic wave measurement for nondestructive testing and evaluation of a test object. The method includes the steps of: positioning a first EMAT proximate the test object; generating an elastic wave via the first EMAT such that the elastic wave propagates in or on the test object; detecting the elastic wave propagating in and on the test object; and analyzing differences in elastic wave character between the elastic wave in the generating step and the elastic wave in the detecting step to evaluate the test object.

In some embodiments, the elastic wave includes a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, a Lamb-like wave, an interfacial wave, a pipe mode, and combinations thereof.

In some embodiments, the first EMAT includes a plurality of magnets and a conductor set. The plurality of magnets has a like pole arrangement. Each magnet is in close proximity to one another. The conductor set includes electrically conductive elements. A portion of the conductor set is positioned proximate to the plurality of magnets. The plurality of magnets and the conductor set are positioned proximate to the test object.

In some embodiments, the method further includes the step of positioning a second EMAT proximate the test object. The elastic wave is detected by the second EMAT in the detecting step.

Embodiments disclosed herein also include a method for nondestructive testing and evaluation of a test object. The method includes the step of determining a thickness of the test object. The determining step includes the steps of: generating a first set of elastic waves such that the first set of elastic waves propagates in or on the test object; detecting the first set of elastic waves propagating in or on the test object to extract a peak frequency; and obtaining the thickness of the test object by utilizing dispersion properties of the first set of elastic waves and the peak frequency.

In some embodiments, the first set of elastic waves includes a plurality of excitation frequencies.

In some embodiments, in the detecting step, a time domain spectrum is obtained and is converted to a frequency domain spectrum to extract the peak frequency.

In some embodiments, the determining step further includes the step of tuning the first set of elastic waves by obtaining and utilizing a group velocity of the first set of elastic waves.

In some embodiments, at least one of the generating step and the detecting step includes utilizing an EMAT.

In some embodiments, the method further includes the step of identifying a defect of the test object. The identifying step includes the steps of: generating a second set of elastic waves such that the second set of elastic waves propagates in or on the test object; detecting the second set of elastic waves propagating in or on the test object; and analyzing differences in elastic wave character between the second set of elastic waves in the generating the second set step and the second set of elastic waves in the detecting the second set step. The second set of elastic waves includes an excitation frequency determined from the thickness of the test object in the determining step. In some embodiments, the identifying step further includes the step of tuning the second set of elastic waves by obtaining and utilizing a group velocity of the second set of elastic waves.

BRIEF DESCRIPTION OF THE DRAWINGS

So that the manner in which the recited features, aspects and advantages of the disclosure, as well as others that will become apparent, are attained and can be understood in detail, a more particular description of certain embodiments briefly summarized above can be had by reference to the embodiments that are illustrated in the drawings that form a part of this specification. It is to be noted, however, that the appended drawings illustrate only exemplary embodiments and are, therefore, not to be considered limiting of the disclosure's scope, for the disclosure can admit to other equally effective embodiments.

FIGS. 4A-E show an LPMS EMAT configuration according to at least one embodiment of the present disclosure. FIG. 4A shows an embodiment where the LPMS includes seven magnets positioned in one possible serial manner with six sets of like magnetic poles facing and being in close proximity to each other and in close proximity to the test object, where the test object may, in some embodiments, include magnetic material such as mild steel.

FIG. 4B shows a schematic representation of a magnetic flux line distribution of the LPMS EMAT configuration similar to the one presented in FIG. 4A where the test object includes magnetic material. FIG. 4C shows a schematic representation of a magnetic flux line distribution of the LPMS EMAT configuration similar to the one presented in FIG. 4A where the test object includes nonmagnetic material. FIG. 4D shows a schematic representation of a magnetic flux line distribution of the LPMS EMAT configuration similar to the one presented in FIG. 4A using a nonmagnetic test object in conjunction with a flux trap. FIG. 4E shows a graph of the magnetic field component perpendicular to the test object at the test object surface and along a line at the geometric center of the LPMS EMAT configuration shown in FIG. 4A.

FIG. 9A shows a bottom view of an LPMS EMAT configuration according to at least one embodiment of the present disclosure. FIG. 9B shows a side view of an LPMS EMAT configuration according to at least one embodiment of the present disclosure. FIG. 9C shows a bottom view of an LPMS EMAT configuration according to at least one embodiment of the present disclosure. FIG. 9D shows a side view of an LPMS EMAT configuration according to at least one embodiment of the present disclosure.

FIG. 10 shows a bottom view of a T EMAT system illustrating the use of separate EMAT drivers according to at least one embodiment of the present disclosure.

FIG. 11A shows a side view of an LPMS EMAT-based elastic wave measurement system according to at least one embodiment of the present disclosure. FIG. 11B shows a bottom view of an LPMS EMAT-based elastic wave measurement system according to at least one embodiment of the present disclosure.

FIGS. 16B-F show enlarged views of the graphs displayed on the user interface in FIG. 16A. Results are obtained where the plate thickness, plate width, and the presence of naturally occurring material anomalies, are determined as the LPMS EMAT assembly is moved over the surface of a steel plate.

Figure 1:
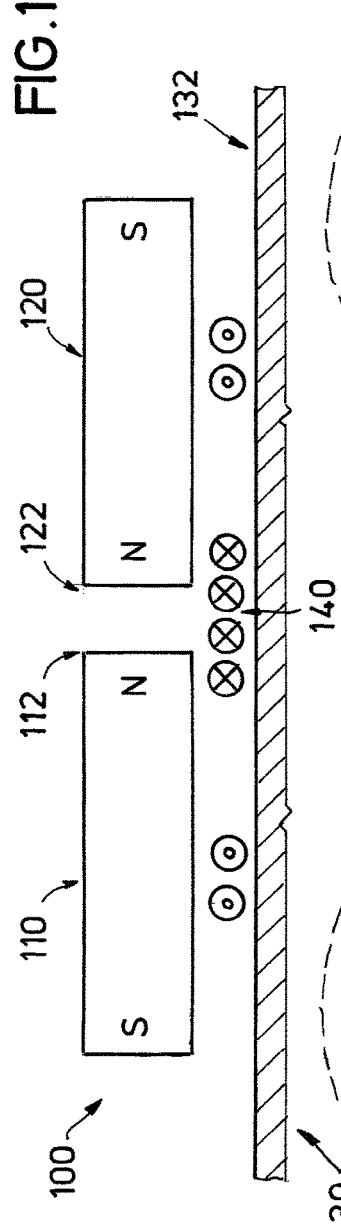
FIG. 1 shows a schematic representation of an LPMS EMAT configuration according to at least one embodiment of the present disclosure.

In the accompanying Figures, similar components or features, or both, may have a similar reference label.

DETAILED DESCRIPTION

Ultrasonic NDT/NDE encompasses many widely practiced and refined methods for measuring and quantifying many engineering aspects of a test object including its material properties, material anomalies, and defect structure. According to at least one embodiment, there are two basic classes of EMATs: the first is based upon the Lorentz force acting on induced currents in metals and the second is based upon magnetostriction. Although some embodiments in this disclosure focus specifically upon Lorentz force EMATs (LF EMATs), those skilled in the art may recognize that those embodiments may also relate to magnetostriction EMATs (MS EMATs). Therefore, as used herein, the embodiments related to LF EMATs also apply to MS EMATs. LF EMAT involves certain EMATs where the magnetic field responsible for generating the Lorentz force on the induced currents is the self-field generated by the current within the transmitting EMAT conductor set. Additionally, some embodiments that make specific reference to the use of EMATs may also be understood as making reference to the use of generating elastic, ultrasonic waves by whatever means. Therefore, as used herein, elastic waves and ultrasonic waves are to be used interchangeably. As used herein, conductor sets, coils, and wire coils are sometimes used interchangeably with conductor sets being less restrictive than coils which are a specific type of conductor set. As used herein, permanent magnets may be replaced by electromagnets, including pulsed electromagnets, or a combination of permanent magnets and electromagnets. As used herein, NDT/NDE refers to all measurement and inspection tasks using elastic waves such as measuring or monitoring various material characteristics and properties. As used herein, Lamb waves and Lamb-like waves are used interchangeably. As used herein, guided waves encompass several classes of wave modes that are less restrictive than Lamb waves.

According to at least one embodiment, an EMAT system is divided into two parts: the first part of the EMAT system, the transmitting section, is responsible for generating one or more specific elastic wave modes in a test object (hereinafter referred to as T EMAT) and the second part of the EMAT system, the receiving section, is responsible for converting elastic wave mode displacements into an electrical voltage that is processed by the EMAT receiving system instrumentation and software (hereinafter referred to as R EMAT). One skilled in the art may recognize that the T EMATs and R EMATs serve distinct and separate functions and, as such, optimizing the overall performance of an EMAT system generally requires special separate considerations to each of these sections. In some embodiments, these separate special considerations may apply to both LF and MS EMATs, considering that the separate functions of T and R EMATs may be particularly important in cases where the Lorentz force is responsible for generating elastic displacements. In some embodiments, the same permanent magnet and conductor set configuration for both T and R EMAT may be utilized in one EMAT system. In some embodiments, separate T and R conductor sets may be placed under the same magnet.

According to at least one embodiment, one major factor in determining the overall sensitivity of an EMAT system is the magnitude of the magnetic field experienced by: (i) currents induced in the metal surface of the test object at which elastic waves are generated by the T EMAT conductor set or (ii) the lattice displacements that are responsible for generating the external electromagnetic fields that are sensed by the R EMAT conductor set. Depending on the interplay between the magnetic field distribution and EMAT conductor set configuration, various types of elastic wave modes may be generated and their purity (i.e., the degree to which the actual displacements coincide with those predicted theoretically or calculated numerically) may be altered. In some embodiments, when conducting NDT/NDE, it is desirable to control the elastic wave mode that is generated as well as the mode purity. The mode purity relates to how closely the generated elastic wave mode approximates the ideal, calculated mode that one seeks to generate in order to accomplish the specific NDT/NDE objective. In evaluating the effectiveness of various EMAT designs, it is to be understood that the magnetic field in and near the EMAT active regions depends upon the dimensions of the permanent magnet (predominantly on the dimension in the direction of magnetization divided by some combination of the lateral dimensions) as well as upon the specific magnetic properties of the permanent magnet, its overall magnetic circuit, and on the magnetic properties of the test object.

According to at least one embodiment, an EMAT conductor set, either for generating or receiving elastic waves, may include an active region. An active region is where induced currents or the electromagnetic fields resulting from elastic displacements are preferentially allowed access to a portion of the test object surface or the R EMAT conductor set so as to generate or receive a beam of elastic waves having features that would not exist were it not for the deployment of special materials to create or define the active region. At the same time, some portions of the test object may be completely or partially shielded from induced currents to generate or receive elastic waves having the most desirable features. The magnetic field may be preferentially focused by the use of a pole cap to aid in the generation of an elastic wave beam that most closely approximates the ideal or desired beam. For example, an active region is a region of the T EMAT conductor set where the currents induced in the test object are solely or primarily responsible for generating the desired elastic wave mode. On the other hand, an active region is the region of the R EMAT conductor set where the desired elastic wave modes dominate in the generation of an external electromagnetic field whose presence is measured by the R EMAT conductor set. In some embodiments, the external electromagnetic fields are present regardless of the presence of conducting material in the vicinity of the R EMAT conductor set. The degree of shielding may determine what portions of the external electromagnetic fields result in a voltage being generated in the R EMAT conductor set.

According to at least one embodiment, the amplitude of the generated elastic wave mode by the T EMAT may be optimized by altering the magnitude of the T EMAT current induced in the test object by the T EMAT conductor set. In other embodiments, the amplitude may be optimized by altering the magnetic field experienced by the induced current within the active region of the T EMAT conductor set. In some embodiments, conducting material, magnetic focusing methods, and/or magnetic concentrating methods (such as using a pole cap or a flux trap) are used to maximize the Lorentz force within the active region of the conductor set and, conversely, to minimize the Lorentz force and hence unwanted elastic displacements outside the active region. In some embodiments, various magnet and conductor set configurations are used to generate one or more elastic wave modes within the test object. The conductor set may include conducting material having various widths and thicknesses, each of which may vary as needed throughout the conductor set. In some embodiments, the T EMAT conductor set and the R EMAT conductor set may be substantially similar. In other embodiments, the T EMAT conductor set and the R EMAT conductor set are vastly different.

According to at least one embodiment, the magnitude of the electrical signal produced by the R EMAT is determined by several factors such as the magnetic field that exists within the active region of the R EMAT conductor set and the length of the conductor within the active region of this conductor set. The performance of R EMATs may be optimized by providing a larger magnetic field within the active region of the R EMAT conductor set and creating conditions where it is relatively easy to minimize image fields generated by elastic wave displacements at or near the test object surface where the R EMAT conductor set is positioned, such that image fields can be generated in nearby conducting material such as the magnet and any supporting metal framework. In some embodiments, a longer R EMAT conductor set is used which may result in a larger voltage output from the R EMAT conductor set.

According to at least one embodiment, various like pole magnet structure (LPMS) EMAT configurations are suitable for use in resonant EMAT measurement systems based on the use of guided or bulk shear horizontal (SH) waves and other wave modes suitable for use in resonant EMAT applications. In some embodiments, various LPMS EMAT configurations generate SH waves over a very wide area using relatively small magnets. In some embodiments, various LPMS EMAT configurations are suitable for concentrating or projecting SH energy for detection of material anomalies or determining material properties in difficult-to-reach regions or at points distant to the SH LPMS.

According to at least one embodiment, LPMS EMAT configurations may have various spacing distances between the magnet faces. In some embodiments, widths (or other dimensions) of each magnet may also vary throughout the LPMS. In some embodiments, a change in magnet arrangement may result in an alternate beam shape, which may be useful for generating various SH waves and other bulk and guided waves.

Referring first to FIG. 1 shows a schematic representation of an LPMS EMAT configuration 100 according to at least one embodiment of the present disclosure. The two magnets 110, 120 face each other in close proximity wherein the two faces 112 and 122 have the same polarity, either N-N or S-S. Alternately, the two magnets 110, 120 may be positioned parallel against each other, where the two N pole regions and the two S pole regions are all adjacent to each other, respectively, in close proximity, such that the polarization direction of the two magnets are positioned substantially perpendicular to the test object 130. The like pole arrangement may cause repulsion between the two magnets 110, 120, however this may be overcome by using means to affix the position of the two magnets 110, 120. Located below the two magnets 110, 120 but above the test object 130 is a conductor set 140 which includes a pattern of conductive elements having an inductance and capable of producing an induced current in the test object surface or receiving the electromagnetic field generated by an elastic wave produced from an external source which could, if desired, be an EMAT. In some embodiments, this particular magnetic field and conductor set configuration is capable of generating or receiving normal beam shear horizontal (NBSH) elastic waves. In some embodiments, the conductor set 140 may have various configurations such as a single straight or curved wire, a wound coil, a meander coil (MC), a spiral coil, a double spiral coil, a double race track coil, a butterfly coil, a spiral pancake coil, or the like. In some embodiments, the pole faces, for example faces 112 and 122, need not have the shape shown or inferred, and the separation between faces 112 and 122 need not be constant. Similar considerations apply to other faces of the magnets. Optionally, a magnet separator of various designs may be incorporated in LPMS for purposes such as firm establishment of the possible varying separation of the individual magnets in the LPMS, ease of assembly, establishment of physical anchoring points for one or more conductor sets, and ease of controlling and shaping the magnetic field at the test object surface.

Figure 2A:
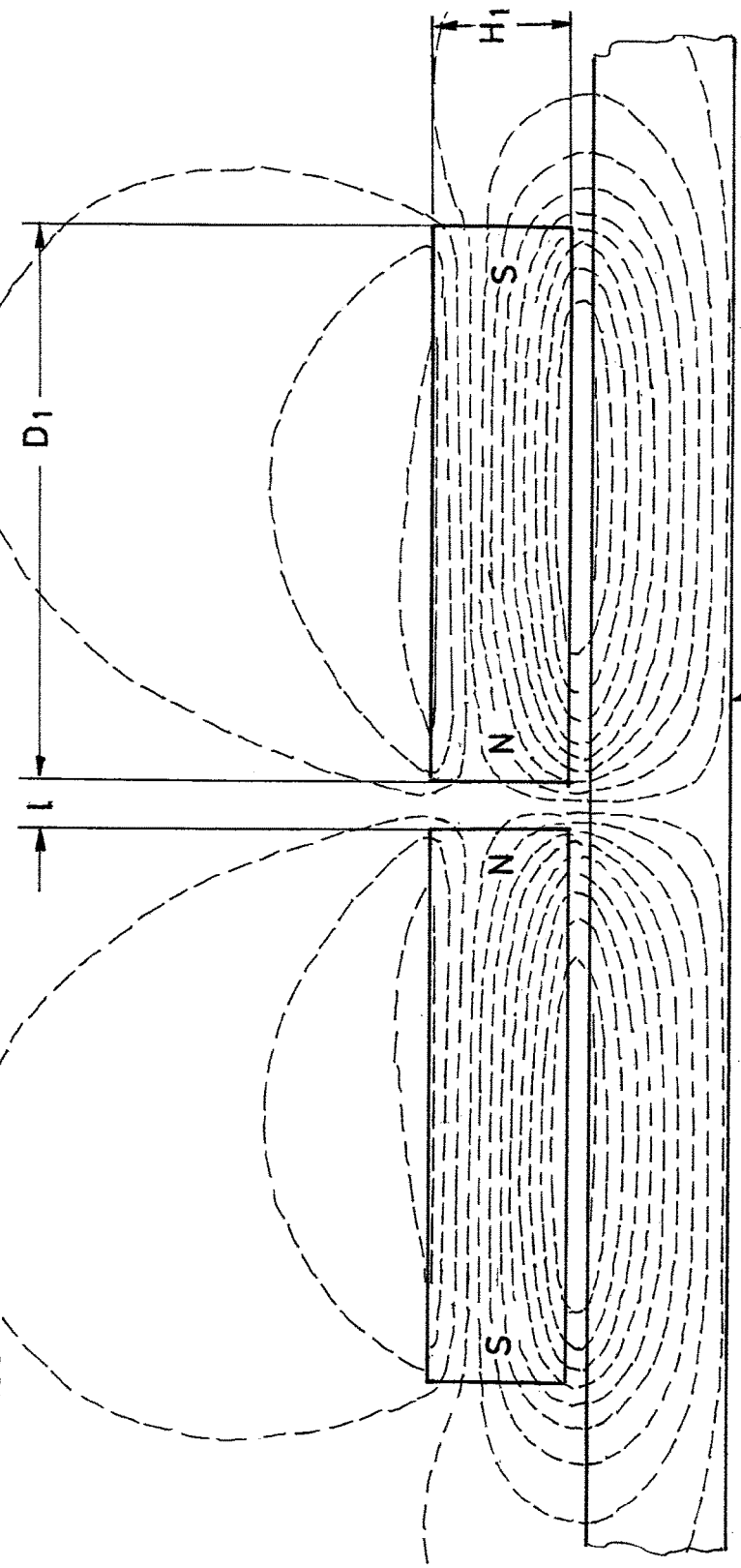
FIG. 2A shows a schematic representation of a magnetic flux line distribution of the LPMS EMAT configuration presented in FIG. 1 where the test object includes magnetic material.
Figure 2B:
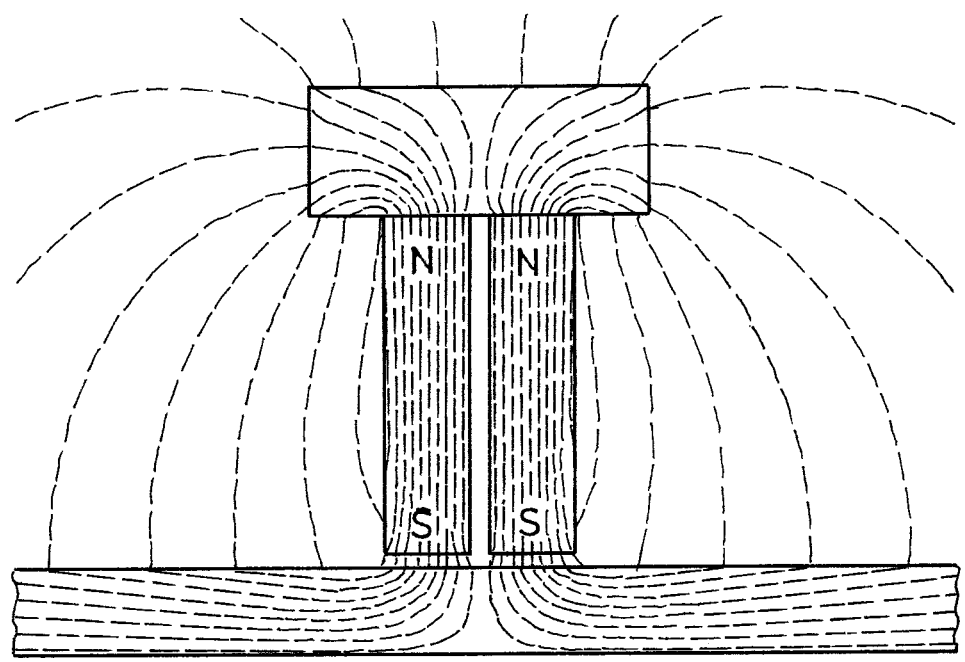
FIG. 2B shows a schematic representation of a magnetic flux line distribution of an LPMS EMAT configuration where the test object includes magnetic material.

Referring to FIG. 2A shows a schematic representation of a magnetic flux line distribution of the LPMS EMAT configuration 100 presented in FIG. 1 where the test object 130 includes magnetic material. FIG. 2B shows a schematic representation of a magnetic flux line distribution of an alternate LPMS EMAT configuration where the test object includes magnetic material. In FIG. 2A, the two magnets 110, 120 with like poles 112, 122 (shown as north poles) are facing each other and separated by a distance, 1, with the magnets 110, 120 positioned with their larger area bottom faces substantially parallel to and substantially adjacent to a test object 130 which includes magnetic material. FIG. 2B shows an alternate magnet arrangement where the two magnets are positioned substantially parallel to each other. One skilled in the art would recognize that the bottom faces need not be either larger or smaller in area than any of the other magnet faces. One skilled in the art will recognize that the long dimension of the magnets 110, 120, $D_1$, is not necessarily longer than the height, H1. That is, the dimension of the magnets in the direction parallel to the test object surface 132 need not bear any particular relationship to the dimension perpendicular to the test object surface 132. One skilled in the art would recognize that the appropriate dimensions of magnets 110 and 120 will be determined by factors such as the physical properties of the permanent magnet material, the beam dimensions of the desired elastic wave to be generated, and the like. The magnetic flux lines within the active region of the magnet structure (the region generally adjacent to the test object and more or less between the magnet like pole faces) are substantially perpendicular to the test object surface 132 so long as the test object 130 is in close proximity to the magnets 110, 120. In some embodiments, when an appropriate T EMAT conductor set 140 is placed in and/or near the active region of this magnet structure, an NBSH wave may be generated in the test object 130.

According to at least one embodiment, optimal performance, which can include elastic wave mode purity, of the LPMS EMAT configuration 100 depends on the degree of the magnetic flux lines being substantially perpendicular to the test object surface 132 in the vicinity of the like poles. In other embodiments, optimal performance depends on the density of magnetic flux lines located in the active region or regions. One skilled in the art will recognize that flux line distributions as shown herein depend on various dimensions of permanent magnets that are used, that strong repulsive magnetic forces may exist between the LPMS magnets 110, 120 and strong attractive magnetic forces may exist between magnets 110, 120 and a magnetic test object 130, that well established procedures and methods exist to manage these forces in a manner providing stable LPMS EMAT configurations 100, and that the LPMS EMAT configuration 100 may be moved with respect to the test object surface 132 whether it be magnetic or nonmagnetic. One skilled in the art would recognize that electromagnets or pulsed electromagnets may be used in one or more LPMS configurations. One skilled in the art would also recognize that various LPMS configurations may be deployed for reasons other than their use with EMAT configurations.

According to at least one embodiment, it is desirable to control the magnetic field acting upon return currents (i.e., induced currents generated on or near the surface of the test object 130 outside the active region), which are byproducts of the T EMAT conductor set 140. In some embodiments, an EMAT conductor set is designed so that one portion of the conductor set generates the desired wave mode and also so that the return current that is essential for establishing the induced currents within the active region of the EMAT conductor set 140 takes place within a magnetic field having a direction and magnitude that interferes as little as possible with the preferred elastic wave mode that is being generated. In some embodiments, there is included conducting material (such as a metal shield that is several skin-depths thick) in the vicinity of the T EMAT conductor set 140 so that induced currents from the T EMAT conductor set 140 have the smallest possible influence on elastic displacements generated by the return currents. In other embodiments, thin conducting shields may also be used to reduce or practically eliminate general electromagnetic pickup that can introduce unwanted electrical signals (pickup noise) in the R EMAT conductor set 140 used for receiving EMAT elastic wave signals. In some embodiments, thin conducting shields provide capacitive shielding (shielding from external electric fields) whereas thick conducting shields provide electromagnetic shielding (shielding from unwanted external time-varying magnetic fields).

Conventionally, a solid material is placed between the like poles 112, 122. This material may lend stability to the LPMS assembly of magnets. In cases where this material is magnetic, it may function as a physical medium to transfer magnetic flux from the like magnetic poles 112, 122, which are adjacent to and usually attached to this magnetic material, into the test object 130. Additionally, in cases where this material is magnetic, it aids in defining a specific magnetic footprint where the flux lines are more or less perpendicular to the surface of the test object 130, which, for example, is the magnetic field component responsible for generating the NBSH elastic wave mode. In some embodiments, arrangements of like poles including non-parallel like pole faces or like poles having magnetic material in the region between the like pole faces may be used to achieve the desired shape and/or intensity of the magnetic field component perpendicular to the test object surface 132 and within the active region. In cases where magnetic material such as iron or steel fills the region between the like pole faces, this magnetic material is conventionally referred to as a flux guide. Such flux guide may aid in the ease of assembly of like pole structures such as the fabrication of LPMS EMATs.

According to at least one embodiment, the LPMS EMAT configuration 100 may optionally use a magnet separator. The magnet separator can be of solid magnetic material. Advantageously, the magnet separator can be positioned adjacent to the like pole faces 112, 122 to provide ease of assembly and to achieve a desired shape, profile, and/or intensity of the magnetic field within the LPMS active region.

When the magnets positioned as shown in FIG. 1 have the correct combination of physical properties (such as high internal magnetic induction, high coercivity, and high magnetic field saturation) and dimensions, the maximum magnetic field in regions generally close to the test object 130 can exceed the maximum internal magnetic induction of the permanent magnets, in some embodiments, by a factor of about two or more. For a single permanent magnet not in the vicinity of a magnetic material, the maximum magnetic field in the vicinity of either the N or S pole of that magnet is, regardless of dimensions, less than the maximum internal magnetic field (usually less than about 0.6 of the maximum internal magnetic induction); and, when either pole 112, 122 of a permanent magnet is placed near a thick, large area magnetic metal, such as a block of ferritic steel or soft iron, the maximum magnetic field near the magnet pole 112, 122 in proximity to the favorable magnetic material may also be less than the maximum internal magnetic field. Even when magnetic flux focusing is employed, the maximum magnetic field in practical measurement systems at the test object surface 132 seldom exceeds the maximum internal field by more than about 50%. In addition, the use of magnetic flux focusing methods can place severe limitations on access to the test object surface 132 and to the placement of conductor sets 140 in the vicinity of the magnets that are part of the normal operation of T and/or R EMAT configurations. It should be noted that certain limitations on the arrangement of such relatively large physical magnets (and optional magnetic material) are factors considered in designing certain serial arrangement of magnets in conjunction with the arrangement of conductor sets provided throughout this disclosure. On the other hand, the LPMS EMAT configuration 100 and various combinations thereof in the present disclosure are capable to be designed and fabricated in a more flexible fashion in order to generate various types of practical elastic wave modes and generally to have greater sensitivity for many elastic wave measurements. In some embodiments, using a magnet separator having magnetic material, T EMAT and R EMAT configurations are capable to perform with greater sensitivity and to have smaller physical size, lesser weight, and fewer geometrical constraints than conventional configurations. In some embodiments, with an appropriately designed magnet separator having appropriate magnetic material, the smaller physical size, lesser weight, and/or fewer geometrical constraints of the LPMS EMAT configurations disclosed herein show uniform or non-uniform serially spaced magnetic structures capable of generating a variety of elastic wave modes. In some embodiments, a set of like pole faces 112, 122 need not have faces that are parallel to the same plane. In some embodiments, the optional magnet separator need not be of the same size. In some embodiments, the optional magnet separator need not be positioned substantially identically with respect to the test object surface 132.

Figure 3A:
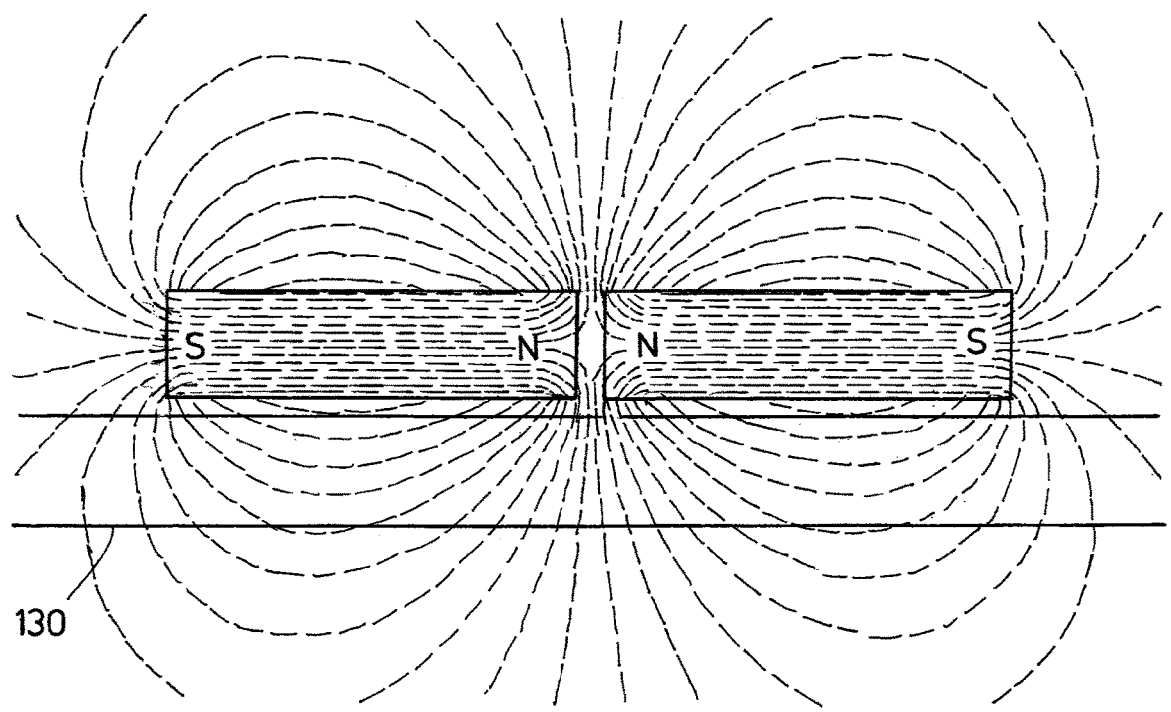
FIG. 3A shows a schematic representation of a magnetic flux line distribution of the LPMS EMAT configuration presented in FIG. 1 where the test object includes nonmagnetic material.
Figure 3B:
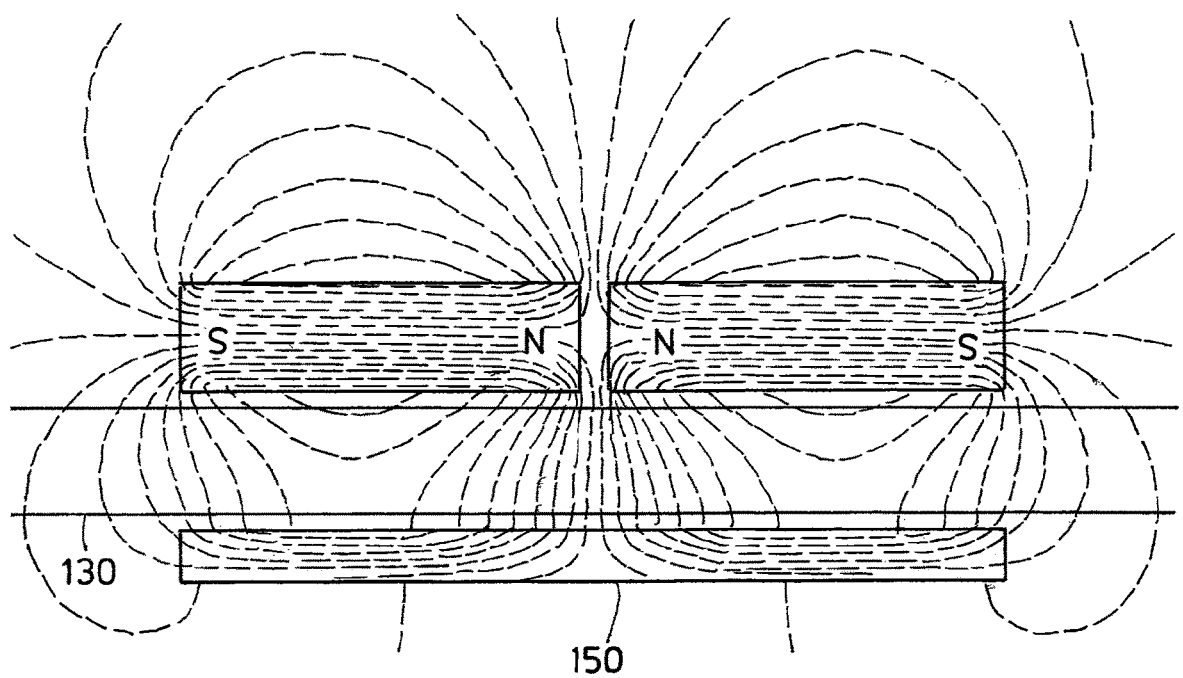
FIG. 3B shows a schematic representation of an enhanced magnetic flux line distribution having improved uniformity of a similar LPMS EMAT configuration presented in FIGS. 1 and 2A using a nonmagnetic test object in conjunction with a flux trap.

Still referring to FIG. 1, as previously shown in certain embodiments, the LPMS EMAT configuration 100 need not incorporate a magnetic material medium to aid in the transfer of magnetic flux from the like poles into the test object 130 with substantially normal incidence as shown in the flux line plots in FIGS. 2A and 3A-B. In alternate embodiments, the LPMS EMAT configuration 100 may incorporate a nonmagnetic material medium between the like poles 112, 122 because the nonmagnetic material does not substantially alter the magnetic field. In some embodiments, the medium includes nonmagnetic metals, plastics, ceramics, or the like.

Referring to FIG. 3A shows a schematic representation of a magnetic flux line distribution of the LPMS EMAT configuration 100 presented in FIG. 1 where the test object 130 includes nonmagnetic material. As shown, all other parameters being held constant, a nonmagnetic test object 130 does not substantially alter the magnetic field configuration generated by the LPMS EMAT configuration 100. In some embodiments, the nonmagnetic test object 130 may alter the magnitude of the magnetic field component normal to the test object surface 132. FIG. 3B shows a schematic representation of an enhanced magnetic flux line distribution having improved uniformity of a similar LPMS EMAT configuration 100 presented in FIG. 1 using a nonmagnetic test object 130 in conjunction with a flux trap 150 composed of a magnetic material that is external to the LPMS and the test object 130. As shown, to generate elastic waves in the nonmagnetic test object 130, the flux trap 150 may be placed at some distance beneath or in close proximity underneath the test object 130. In some embodiments, the flux trap 150 is in rolling contact with the test object surface 132. The flux trap 150 increases the efficiency of the magnetic flux return path. The presence of an additional magnetic material within the magnetic flux return path redirects magnetic flux that would otherwise return without passing through the test object 130 near the surface adjacent to the active region. In this manner, the EMAT conductor set 140 may experience a greater magnetic field than it would have in the absence of the flux trap 150, hence improving the performance of the overall EMAT system. In some embodiments, this LPMS EMAT configuration 100 may be used to generate NBSH waves in a magnetic or nonmagnetic test object 130. In other embodiments, an active region may be created such that primarily linearly polarized shear horizontal (SH) waves are generated. In yet other embodiments, a flux trap 150 may be used to improve the efficiency of the magnetic circuit when the test object 130 is relatively thin or weakly magnetic. A flux trap 150 may be used with certain EMATs that do not incorporate LPMS.

According to at least one embodiment, the LPMS EMAT configuration 100 may be used in conjunction with a coupling wedge and appropriate conductor sets to receive shear vertical (SV) and longitudinal waves (L-waves). In some embodiments, the coupling wedge is of plastic material. In some embodiments, the coupling wedge may be attached to the LPMS EMAT configuration 100 directly or built in the wedge. In some embodiments, the coupling fluid is used on the test object surface 132. In some embodiments, with appropriate conductor sets, such an LPMS EMAT configuration 100 would be sensitive to an incident shear (SV or SH) displacement from essentially any angle independent of whether that displacement is a result of an SV or L-wave generated by the coupling wedge or that displacement is one that resulted from mode conversion resulting from a L-wave or SV wave produced by elastic waves scattered from a defect such as a crack. In some embodiments, the elastic wave incident upon a coupling wedge that incorporates an LPMS or an R EMAT may originate from any source external to the coupling wedge. In some embodiments, such an LPMS EMAT configuration 100 is insensitive to a ringing effect produced within the coupling wedge. In some embodiments, such an LPMS EMAT configuration 100 is effective on relatively thick test objects 130. In some embodiments, using a piezoelectric transducer on a wedge to transmit elastic waves in conjunction with an EMAT to receive elastic waves enables the use for what may be a relatively larger wave amplitude generated by the piezo transducer. Using a wedge to transmit elastic waves and an EMAT to receive elastic waves also allows a piezo device to generate L-waves. Other T EMAT configurations may be used to generate and transmit SH waves. The R EMAT may be configured to be primarily sensitive to SH displacements or SV (out-of-plane) displacements.

According to at least one embodiment, the LPMS EMAT configuration 100 may be configured to use two or more conductor sets to generate or receive SH waves of different, and in some embodiments, orthogonal, polarization. In some embodiments, such an EMAT configuration 100 may be suitable for measuring crack depth by measuring phase difference, amplitude difference, or both between the two or more received signals. In some embodiments, the two or more conductor sets can be a part of the same LPMS. In other embodiments, two or more LPMSs can be used where each LPMS has a separate conductor set.

Figure 4A:
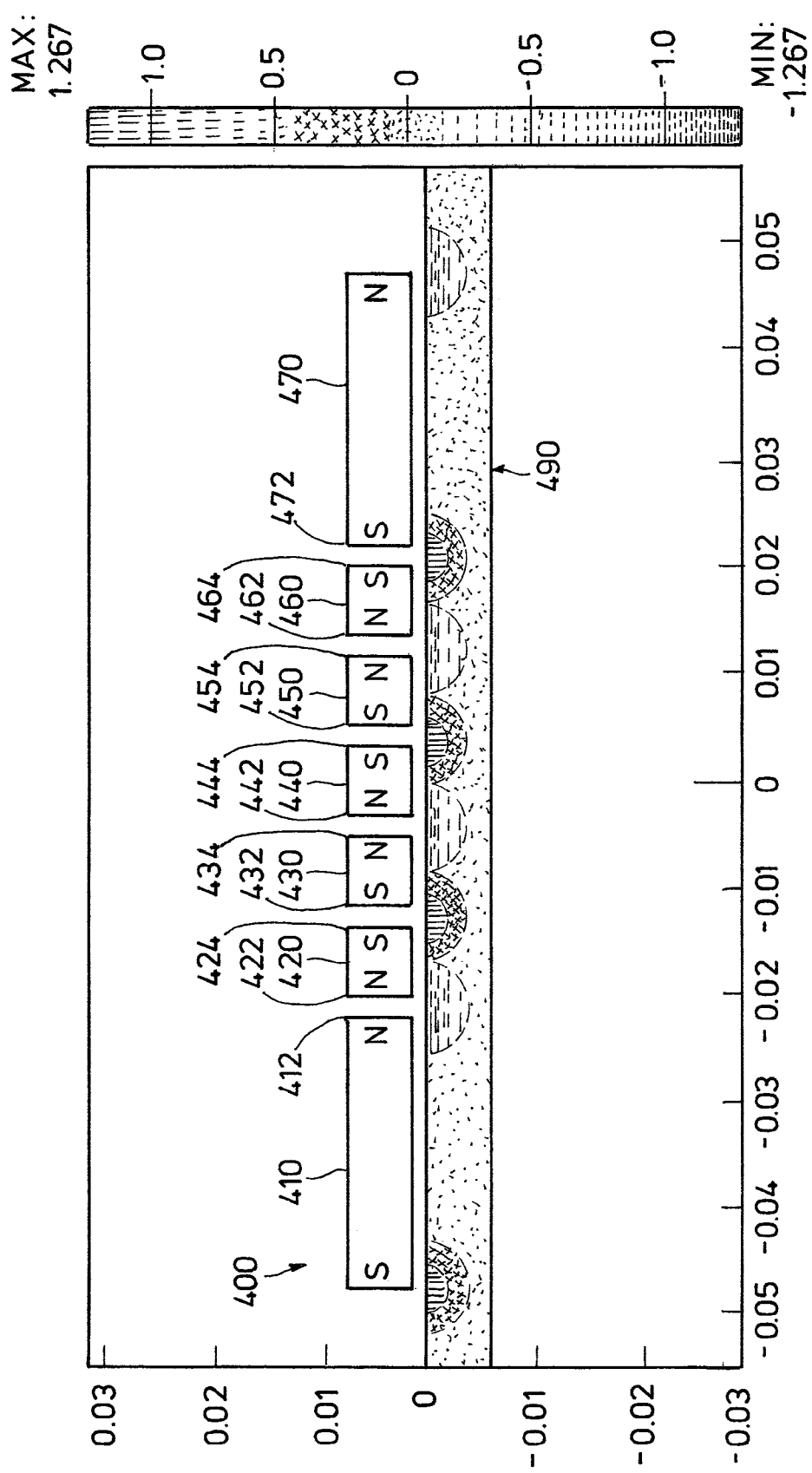
Figure 4C:
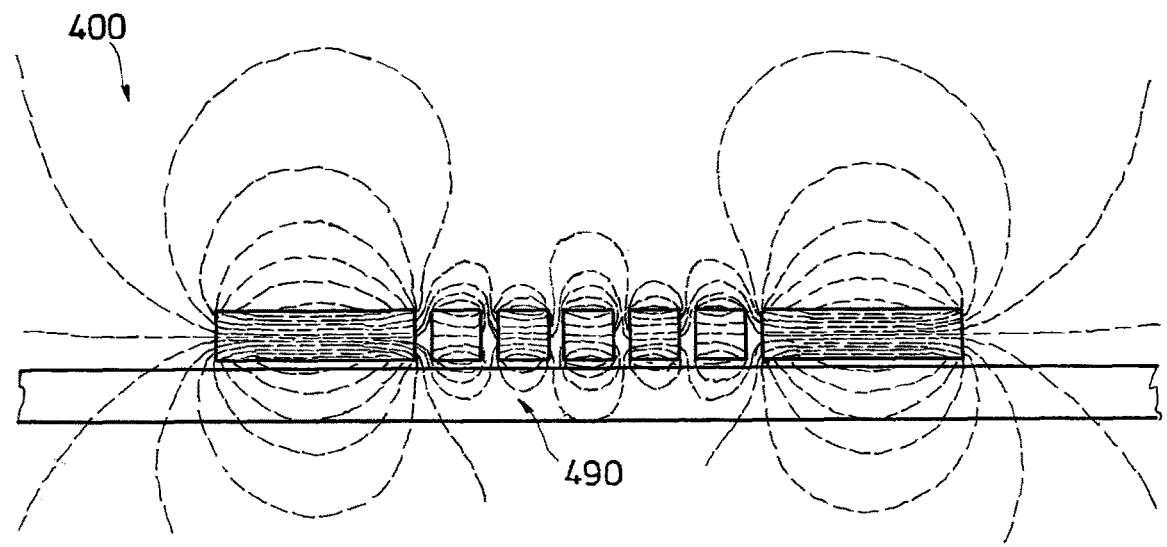
Figure 4D:
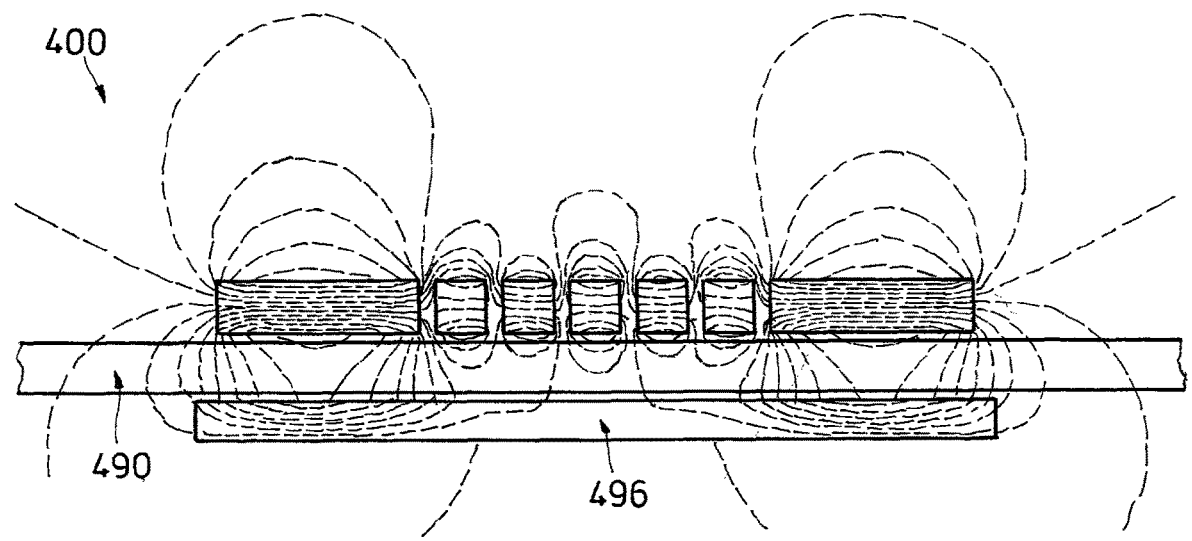

Referring now to FIGS. 4A-E show an LPMS EMAT configuration 400 according to at least one embodiment of the present disclosure. As described above, LPMS EMAT configurations 400 are robust and versatile for generating many different elastic wave modes in addition to the NBSH mode. The number and shape of the magnets used in a LPMS may depend on how an LPMS is used to construct an EMAT or an LPMS for any given purpose. FIG. 4A shows an embodiment where the LPMS includes seven magnets 410, 420, 430, 440, 450, 460, 470 positioned in a serial manner with six sets of like magnetic poles 412-422, 424-432, 434-442, 444-452, 454-462, and 464-472 facing and being in close proximity to one another and in close proximity to the test object 490, where the test object 490 may, in some embodiments, include magnetic material such as mild steel. Some embodiments of these linear, multi-like pole set structures might benefit from the LPMS EMAT features available when there is magnetic material adjacent to some or all of the multiple like pole sets. The magnetic field values throughout this LPMS when adjacent to a magnetic test object 490 are given by the scale illustrated on the right hand side of FIG. 4A. FIG. 4B shows a schematic representation of a magnetic flux line distribution of the LPMS EMAT configuration similar to the one presented in FIG. 4A where the test object 490 includes magnetic material. FIG. 4C shows a schematic representation of a magnetic flux line distribution of the LPMS EMAT configuration similar to the one presented in FIG. 4A where the test object 490 includes nonmagnetic material. FIG. 4D shows a schematic representation of a magnetic flux line distribution of the LPMS EMAT configuration similar to the one presented in FIG. 4A using a nonmagnetic test object 490 in conjunction with a flux trap 496. FIG. 4E shows a graph of the magnetic field component perpendicular to the test object at the test object surface and along a line at the geometric center of the LPMS EMAT configuration shown in FIG. 4A. One skilled in the art would recognize that various elastic wave energy concentrating methods may be employed in conjunction with the embodiments shown in the present disclosure. One skilled in the art would recognize that methods exist for using conductor sets designed to project an elastic wave beam preferentially in one direction. In some embodiments, various types of LPMS may be used in the construction of EMAT phased arrays. Some magnet structures may be more readily fabricated when the permanent magnet material is first shaped and then poled. In some embodiments, systems other than EMAT ultrasonic systems could also benefit from using the above LPMS embodiment.

Referring to FIG. 4A shows a schematic representation of an LPMS EMAT configuration 400 according to at least one embodiment of the present disclosure. Seven magnets 410, 420, 430, 440, 450, 460, 470 face each other in close proximity wherein pairs of two faces 412 and 422, 424 and 432, 434 and 442, 444 and 452, 454 and 462, and 464 and 472 have the same polarity, either N-N or S-S. Alternately, the magnets 410, 420, 430, 440, 450, 460, 470 may be positioned parallel against each other (such as shown for example in FIG. 2B), where the two N pole regions and the two S pole regions are all adjacent to each other, respectively, in close proximity, such that the polarization direction of the two magnets are positioned substantially perpendicular to the test object 490. The like pole arrangement may cause repulsion between the magnets 410, 420, 430, 440, 450, 460, 470, however this may be overcome by using means to affix the position of the magnets 410, 420, 430, 440, 450, 460, 470. Located below the magnets 410, 420, 430, 440, 450, 460, 470 but above the test object 490 can include a conductor set which includes a pattern of conductive elements having an inductance and capable of producing an induced current in the test object surface or receiving the electromagnetic field generated by an elastic wave produced from an external source which could, if desired, be an EMAT. In some embodiments, the pole faces, for example faces 412 and 422, 424 and 432, 434 and 442, 444 and 452, 454 and 462, and 464 and 472, need not have the shape shown or inferred, and the separation between faces 412 and 422, 424 and 432, 434 and 442, 444 and 452, 454 and 462, and 464 and 472 need not be constant. Similar considerations apply to other faces of the magnets. Optionally, a magnet separator of various designs may be incorporated in LPMS for purposes such as firm establishment of the possible varying separation of the individual magnets in the LPMS, ease of assembly, establishment of physical anchoring points for one or more conductor sets, and ease of controlling and shaping the magnetic field at the test object surface.

Referring to FIG. 4B shows a schematic representation of a magnetic flux line distribution of the LPMS EMAT configuration 400 presented in FIG. 4A where the test object 490 includes magnetic material. The two magnets such as 410, 420 with like poles 412, 422 (shown as north poles) are facing each other with the magnets such as 410, 420 positioned with their bottom faces substantially parallel to and substantially adjacent to a test object 490 which includes magnetic material. One skilled in the art would recognize that the bottom faces need not be either larger or smaller in area than any of the other magnet faces. One skilled in the art will recognize that the dimension of the magnets such as 410, 420 in the direction parallel to the test object surface 492 need not bear any particular relationship to the dimension perpendicular to the test object surface 492. One skilled in the art would recognize that the appropriate dimensions of magnets such as 410 and 420 will be determined by factors such as the physical properties of the permanent magnet material, the beam dimensions of the desired elastic wave to be generated, and the like. The magnetic flux lines within the active region of the magnet structure (the region generally adjacent to the test object and more or less between the magnet like pole faces) are substantially perpendicular to the test object surface 492 so long as the test object 490 is in close proximity to the above-mentioned magnets such as 410, 420. In some embodiments, when an appropriate T EMAT conductor set is placed in and/or near the active region of this magnet structure, an NBSH wave may be generated in the test object 190.

According to at least one embodiment, optimal performance, which can include elastic wave mode purity, of the LPMS EMAT configuration 400 depends on the degree of the magnetic flux lines being substantially perpendicular to the test object surface 492 in the vicinity of the like poles. In other embodiments, optimal performance depends on the density of magnetic flux lines located in the active region or regions. One skilled in the art will recognize that flux line distributions as shown herein depend on various dimensions of permanent magnets that are used, that strong repulsive magnetic forces may exist between the LPMS magnets such as 410, 420 and strong attractive magnetic forces may exist between magnets 410, 420 and a magnetic test object 490, that well established procedures and methods exist to manage these forces in a manner providing stable LPMS EMAT configurations 400, and that the LPMS EMAT configuration 400 may be moved with respect to the test object surface 492 whether it be magnetic or nonmagnetic. One skilled in the art would recognize that electromagnets or pulsed electromagnets may be used in one or more LPMS configurations. One skilled in the art would also recognize that various LPMS configurations may be deployed for reasons other than their use with EMAT configurations.

According to at least one embodiment, it is desirable to control the magnetic field acting upon return currents (i.e., induced currents generated on or near the surface of the test object 490 outside the active region), which are byproducts of the T EMAT conductor set. In some embodiments, an EMAT conductor set is designed so that one portion of the conductor set generates the desired wave mode and also so that the return current that is essential for establishing the induced currents within the active region of the EMAT conductor set takes place within a magnetic field having a direction and magnitude that interferes as little as possible with the preferred elastic wave mode that is being generated. In some embodiments, there is included conducting material (such as a metal shield that is several skin-depths thick) in the vicinity of the T EMAT conductor set so that induced currents from the T EMAT conductor set have the smallest possible influence on elastic displacements generated by the return currents. In other embodiments, thin conducting shields may also be used to reduce or practically eliminate general electromagnetic pickup that can introduce unwanted electrical signals (pickup noise) in the R EMAT conductor set used for receiving EMAT elastic wave signals. In some embodiments, thin conducting shields provide capacitive shielding (shielding from external electric fields) whereas thick conducting shields provide electromagnetic shielding (shielding from unwanted external time-varying magnetic fields).

Conventionally, a solid material is placed between the like poles such as 412, 422. This material may lend stability to the LPMS assembly of magnets. In cases where this material is magnetic, it may function as a physical medium to transfer magnetic flux from the like magnetic poles such as 412, 422, which are adjacent to and usually attached to this magnetic material, into the test object 490. Additionally, in cases where this material is magnetic, it aids in defining a specific magnetic footprint where the flux lines are more or less perpendicular to the surface of the test object 490, which, for example, is the magnetic field component responsible for generating the NBSH elastic wave mode. In some embodiments, arrangements of like poles including non-parallel like pole faces or like poles having magnetic material in the region between the like pole faces may be used to achieve the desired shape and/or intensity of the magnetic field component perpendicular to the test object surface 492 and within the active region. In cases where magnetic material such as iron or steel fills the region between the like pole faces, this magnetic material is conventionally referred to as a flux guide. Such flux guide may aid in the ease of assembly of like pole structures such as the fabrication of LPMS EMATs.

According to at least one embodiment, the LPMS EMAT configuration 400 may optionally use a magnet separator. The magnet separator can be of solid magnetic material. Advantageously, the magnet separator can be positioned adjacent to the like pole faces such as 412, 422 to provide ease of assembly and to achieve a desired shape, profile, and/or intensity of the magnetic field within the LPMS active region. Additionally, the magnet separator may include combinations of materials that provide performance advantages over the use of a single material, magnetic or otherwise, for the magnet separator.

When the magnets positioned as shown in FIG. 4A have the correct combination of physical properties (such as high internal magnetic induction, high coercivity, and high magnetic field saturation) and dimensions, the maximum magnetic field in regions generally close to the test object 490 can exceed the maximum internal magnetic induction of the permanent magnets, in some embodiments, by a factor of about two or more. For a single permanent magnet not in the vicinity of a magnetic material, the maximum magnetic field in the vicinity of either the N or S pole of that magnet is, regardless of dimensions, less than the maximum internal magnetic field (usually less than about 0.6 of the maximum internal magnetic induction); and, when either pole such as 412, 422 of a permanent magnet is placed near a thick, large area magnetic metal, such as a block of ferritic steel or soft iron, the maximum magnetic field near the magnet pole such as 412, 422 in proximity to the favorable magnetic material may also be less than the maximum internal magnetic field. Even when magnetic flux focusing is employed, the maximum magnetic field in practical measurement systems at the test object surface 492 seldom exceeds the maximum internal field by more than about 50%. In addition, the use of magnetic flux focusing methods can place severe limitations on access to the test object surface 492 and to the placement of conductor sets in the vicinity of the magnets that are part of the normal operation of T and/or R EMAT configurations. It should be noted that certain limitations on the arrangement of such relatively large physical magnets (and optional magnetic material) are factors considered in designing certain serial arrangement of magnets in conjunction with the arrangement of conductor sets provided throughout this disclosure. On the other hand, the LPMS EMAT configuration 400 and various combinations thereof in the present disclosure are capable to be designed and fabricated in a more flexible fashion in order to generate various types of practical elastic wave modes and generally to have greater sensitivity for many elastic wave measurements. In some embodiments, using a magnet separator having magnetic material, T EMAT and R EMAT configurations are capable to perform with greater sensitivity and to have smaller physical size, lesser weight, and fewer geometrical constraints than conventional configurations. In some embodiments, with an appropriately designed magnet separator having appropriate magnetic material, the smaller physical size, lesser weight, and/or fewer geometrical constraints of the LPMS EMAT configurations disclosed herein show uniform or non-uniform serially spaced magnetic structures capable of generating a variety of elastic wave modes. In some embodiments, a set of like pole faces such as 412, 422 need not have faces that are parallel to the same plane. In some embodiments, the optional magnet separator need not be of the same size. In some embodiments, the optional magnet separator need not be positioned substantially identically with respect to the test object surface 492.

Still referring to FIG. 4A, as previously shown in certain embodiments, the LPMS EMAT configuration 400 need not incorporate a magnetic material medium to aid in the transfer of magnetic flux from the like poles into the test object 490 with substantially normal incidence as shown in the flux line plots in FIGS. 4B-D. In alternate embodiments, the LPMS EMAT configuration 400 may incorporate a nonmagnetic material medium between the like poles such as 412, 422 because the nonmagnetic material does not substantially alter the magnetic field. In some embodiments, the medium includes nonmagnetic metals, plastics, ceramics, or the like.

Referring to FIG. 4C shows a schematic representation of a magnetic flux line distribution of the LPMS EMAT configuration 100 presented in FIG. 4A where the test object 490 includes nonmagnetic material. As shown, all other parameters being held constant, a nonmagnetic test object 490 does not substantially alter the magnetic field configuration generated by the LPMS EMAT configuration 400. In some embodiments, the nonmagnetic test object 490 may alter the magnitude of the magnetic field component normal to the test object surface 492. FIG. 4D shows a schematic representation of an enhanced magnetic flux line distribution having improved uniformity of a similar LPMS EMAT configuration 400 presented in FIG. 4A using a nonmagnetic test object 490 in conjunction with a flux trap 496 composed of a magnetic material that is external to the LPMS and the test object 490. As shown, to generate elastic waves in the nonmagnetic test object 490, the flux trap 496 may be placed at some distance beneath or in close proximity underneath the test object 490. In some embodiments, the flux trap 496 is in rolling contact with the test object surface 492. The flux trap 496 increases the efficiency of the magnetic flux return path. The presence of an additional magnetic material within the magnetic flux return path redirects magnetic flux that would otherwise return without passing through the test object 490 near the surface adjacent to the active region. In this manner, the EMAT conductor set may experience a greater magnetic field than it would have in the absence of the flux trap 496, hence improving the performance of the overall EMAT system. In some embodiments, this LPMS EMAT configuration 400 may be used to generate NBSH waves in a magnetic or nonmagnetic test object 490. In other embodiments, an active region may be created such that primarily linearly polarized SH waves are generated. In yet other embodiments, a flux trap 496 may be used to improve the efficiency of the magnetic circuit when the test object 490 is relatively thin or weakly magnetic. A flux trap 496 may be used with certain EMATs that do not incorporate LPMS.

According to at least one embodiment, the LPMS EMAT configuration 400 may be used in conjunction with a coupling wedge and appropriate conductor sets to receive SV and L-waves. In some embodiments, the coupling wedge is of plastic material. In some embodiments, the coupling wedge may be attached to the LPMS EMAT configuration 400 directly or built in the wedge. In some embodiments, the coupling fluid is used on the test object surface 492. In some embodiments, with appropriate conductor sets, such an LPMS EMAT configuration 400 would be sensitive to an incident shear (SV or SH) displacement from essentially any angle independent of whether that displacement is a result of an SV or L-wave generated by the coupling wedge or that displacement is one that resulted from mode conversion resulting from a L-wave or SV wave produced by elastic waves scattered from a defect such as a crack. In some embodiments, the elastic wave incident upon a coupling wedge that incorporates an LPMS or an R EMAT may originate from any source external to the coupling wedge. In some embodiments, such an LPMS EMAT configuration 400 is insensitive to a ringing effect produced within the coupling wedge. In some embodiments, such an LPMS EMAT configuration 400 is effective on relatively thick test objects 490. In some embodiments, using a piezoelectric transducer on a wedge to transmit elastic waves in conjunction with an EMAT to receive elastic waves enables the use for what may be a relatively larger wave amplitude generated by the piezo transducer. Using a wedge to transmit elastic waves and an EMAT to receive elastic waves also allows a piezo device to generate L-waves. Other T EMAT configurations may be used to generate and transmit SH waves. The R EMAT may be configured to be primarily sensitive to SH displacements or SV (out-of-plane) displacements.

According to at least one embodiment, the LPMS EMAT configuration 400 may be configured to use two or more conductor sets to generate or receive SH waves of different, and in some embodiments, orthogonal, polarization. In some embodiments, such an EMAT configuration 400 may be suitable for measuring crack depth by measuring phase difference, amplitude difference, or both between the two or more received signals. In some embodiments, the two or more conductor sets can be a part of the same LPMS. In other embodiments, two or more LPMSs can be used where each LPMS has a separate conductor set.

Referring back to FIG. 4A, one skilled in the art would recognize that the magnetic structures provided herein may benefit from magnetic material placed adjacent to the like pole faces such as 412, 422 and in close proximity to the test object 490. Additionally, one skilled in the art would recognize that elastic wave beams generated by various LPMS configurations may be shaped by altering the strength of the normal component of the magnetic field by using different magnet separators throughout the LPMS or by changing the dimensions of the magnets 410, 420, 430, 440, 450, 460, 470 throughout the LPMS.

Figure 5A:
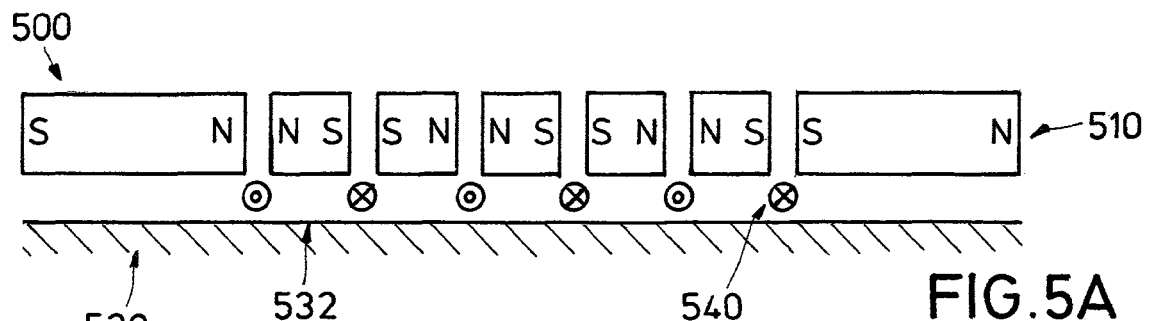
FIG. 5A shows a side view of an LPMS EMAT configuration according to at least one embodiment of the present disclosure where the LPMS is similar to the one shown in FIG. 4A.
Figure 5B:
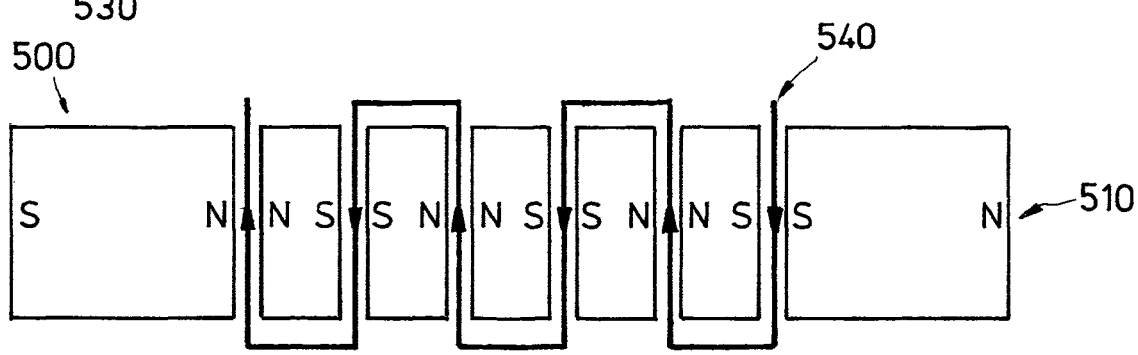
FIG. 5B shows a bottom view of an LPMS EMAT configuration according to at least one embodiment of the present disclosure where the LPMS is similar to the one shown in FIG. 4A.

FIG. 5A shows a side view of an LPMS EMAT configuration 500 according to at least one embodiment of the present disclosure where the LPMS 510 is similar to the one shown in FIG. 4A. FIG. 5B shows a bottom view of an LPMS EMAT configuration 500 according to at least one embodiment of the present disclosure where the LPMS 510 is similar to the one shown in FIG. 4A. In some embodiments, an implementation of this specific type of LPMS 510 with this specific type of conductor set 540 pattern is capable of generating NBSH waves when used as a T EMAT. In other embodiments, an implementation of this specific type of LPMS 510 with this specific type of conductor set 540 pattern is capable of receiving NBSH waves when used as an R EMAT. For transmitting NBSH waves, the Lorentz force of the induced current is perpendicular to the induced current and parallel to the longer dimension (horizontal dimension shown in FIGS. 5A-B) of the LPMS 510 and, at any instant in time, is always in the same direction. The arrows indicate the direction of transmitter current in the conductor set at any given time. In some embodiments, magnet dimensions may change throughout the LPMS so as to achieve desirable operating characteristics.

Figure 6A:
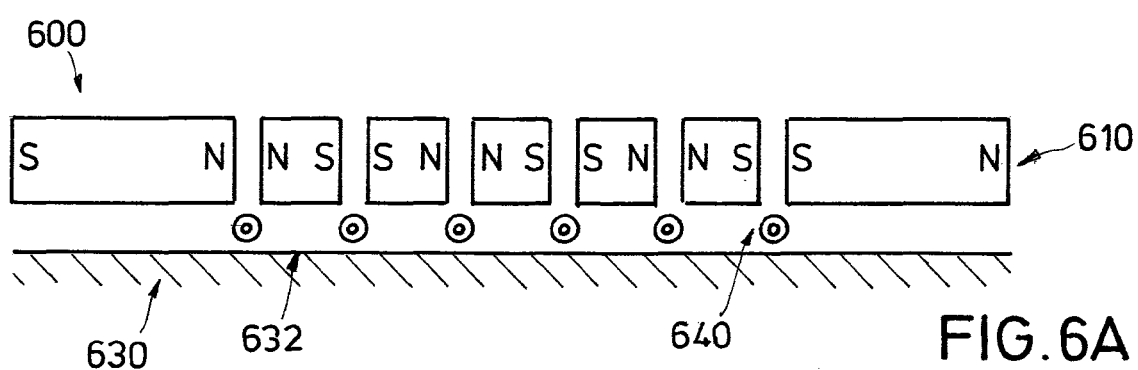
FIG. 6A shows a side view of an LPMS EMAT configuration according to at least one embodiment of the present disclosure where the LPMS is similar to the one shown in FIG. 4A.
Figure 6B:
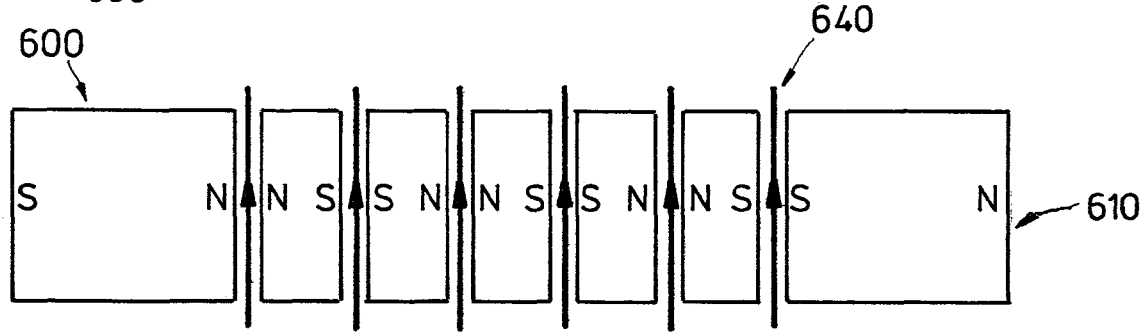
FIG. 6B shows a bottom view of an LPMS EMAT configuration according to at least one embodiment of the present disclosure where the LPMS is similar to the one shown in FIG. 4A.

FIG. 6A shows a side view of an LPMS EMAT configuration 600 according to at least one embodiment of the present disclosure where the LPMS 610 is similar to the one shown in FIG. 4A. FIG. 6B shows a bottom view of an LPMS EMAT configuration 600 according to at least one embodiment of the present disclosure where the LPMS 610 is similar to the one shown in FIG. 4A. In some embodiments, an implementation of this specific type of LPMS 610 with this specific type of conductor set 640 pattern, with appropriate current sources for each conductor set 640, is capable of functioning as a MC EMAT. In some embodiments, an implementation of this specific type of LPMS 610 with this specific type of conductor set 640 pattern is capable of generating angle beam bulk SV waves and angle beam bulk L-waves when used as a T EMAT. In some embodiments, an implementation of this specific type of LPMS 610 with this specific type of conductor set 640 pattern is capable of generating Lamb or Lamb-like guided waves when used as a T EMAT. In other embodiments, an implementation of this specific type of LPMS 610 with this specific type of conductor set 640 pattern is capable of receiving angle beam bulk SV waves and angle beam bulk L-waves when used as an R EMAT. In other embodiments, an implementation of this specific type of LPMS 610 with this specific type of conductor set 640 pattern is capable of receiving Lamb or Lamb-like guided waves when used as an R EMAT. The conductor set 640 shown in FIGS. 6A-B is capable of generating the required induced surface current in the test object 630 when used as a T EMAT as well as receiving resulting displacements when used as an R EMAT. The arrows indicate the direction of current in the T EMAT conductor set or voltage in the R EMAT conductor set at any given time. In some embodiments, magnet dimensions may change throughout the LPMS so as to achieve desirable operating characteristics.

According to at least one embodiment, at appropriately chosen frequencies, SV waves and L-waves propagate at an angle with respect to the test object surface 632. The SV waves and L-waves have angles determined by factors such as the physical characteristics and parameters of the LPMS 610, the EMAT conductor set 640 configuration, and the frequency of the T EMAT excitation current through that portion of the EMAT conductor set 640 that is in proximity to the LPMS 610. According to at least one embodiment, Lamb or Lamb-like waves propagate parallel to the test object surface 632. The Lamb or Lame-like waves have a wavelength and other characteristics determined by factors such as the physical characteristics and parameters of the LPMS 610, the EMAT conductor set 640 configuration, the frequency of the T EMAT excitation current through that portion of the EMAT conductor set 640 that is in proximity to the LPMS 610, and the thickness of the test object 630.

According to at least one embodiment, at appropriately chosen frequencies, surface waves such as Rayleigh waves may be generated to travel on the test object surface 632. The surface waves have a wavelength and other characteristics determined by factors such as the physical characteristics and parameters of the LPMS 610, the EMAT conductor set 640 configuration, and the frequency of the T EMAT excitation current through that portion of the EMAT conductor set 640 that is in proximity to the LPMS 610. According to at least one embodiment, these surface waves propagate parallel to the test object surface 632 and the wave displacements are confined to a region near the test object surface 632.

Figure 7A:
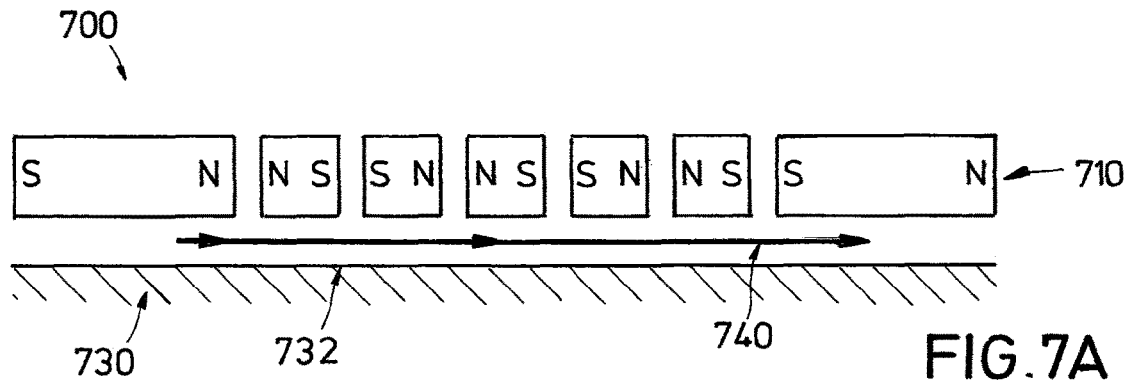
FIG. 7A shows a side view of an LPMS EMAT configuration according to at least one embodiment of the present disclosure where the LPMS is similar to the one shown in FIG. 4A.
Figure 7B:
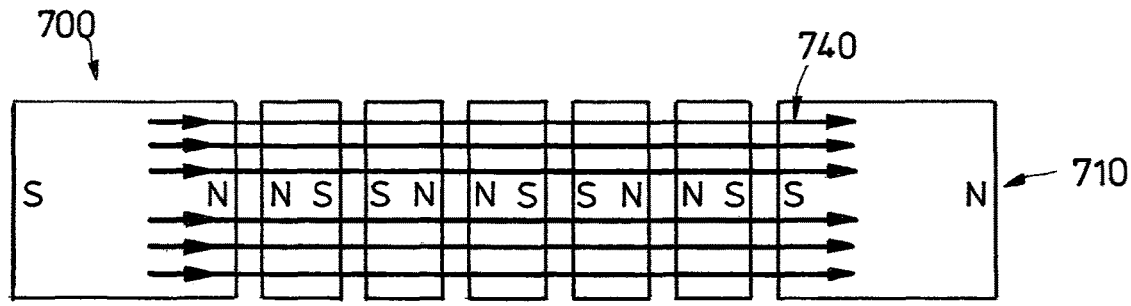
FIG. 7B shows a bottom view of an LPMS EMAT configuration according to at least one embodiment of the present disclosure where the LPMS is similar to the one shown in FIG. 4A.

FIG. 7A shows a side view of an LPMS EMAT configuration 700 according to at least one embodiment of the present disclosure where the LPMS 710 is similar to the one shown in FIG. 4A. FIG. 7B shows a bottom view of an LPMS EMAT configuration 700 according to at least one embodiment of the present disclosure where the LPMS 710 is similar to the one shown in FIG. 4A. In some embodiments, an implementation of this specific type of LPMS 710 with this specific type of conductor set 740 pattern is capable of generating SH plate or SH-guided waves when used as a T EMAT. In some embodiments, an implementation of this specific type of LPMS 710 with this specific type of conductor set 740 pattern is capable of generating angle beam SH waves when used as a T EMAT. In other embodiments, an implementation of this specific type of LPMS 710 with this specific type of conductor set 740 pattern is capable of receiving SH plate or SH-guided waves when used as an R EMAT. In other embodiments, an implementation of this specific type of LPMS 710 with this specific type of conductor set 740 pattern is capable of receiving angle beam SH waves when used as an R EMAT. The conductor set 740 shown in FIGS. 7A-B is capable of inducing the required current in the test object 730 when used as a T EMAT as well as receiving a resulting voltage when used as an R EMAT. The arrows indicate the direction of current in the T EMAT conductor set 740 at any given time. In some embodiments, this LPMS EMAT configuration 700 has about 1.4 to about three or more times sensitivity than conventional EMAT means to generate or receive SH plate or SH-guided waves or angle beam SH waves. In some embodiments, magnet dimensions may change throughout the LPMS so as to achieve desirable operating characteristics.

According to at least one embodiment, SH plate or SH-guided waves propagate parallel to the test object surface 732 with the shear wave polarization parallel to the test object surface 732 and have a wavelength determined by the LPMS 710 physical characteristics. According to at least one embodiment, angle beam SH waves propagate at an angle to the test object surface 732 with the angle being determined by factors such as the LPMS 710 physical characteristics and the frequency of the current through the T EMAT conductor set 740 in proximity to the LPMS.

According to at least one embodiment, the velocity of SH waves depends on the presence of internal and applied stresses. The velocity is largely affected when the applied stresses are parallel to the lattice motion of the SH waves. Thus, the LPMS EMAT configuration 700 may be configured to generate SH waves having a velocity that depends on residual or applied stress. One skilled in the art would recognize combinations of SH wave and other elastic wave velocities may be used to deduce stress and/or changes in stress within a test object 730.

Figure 8:
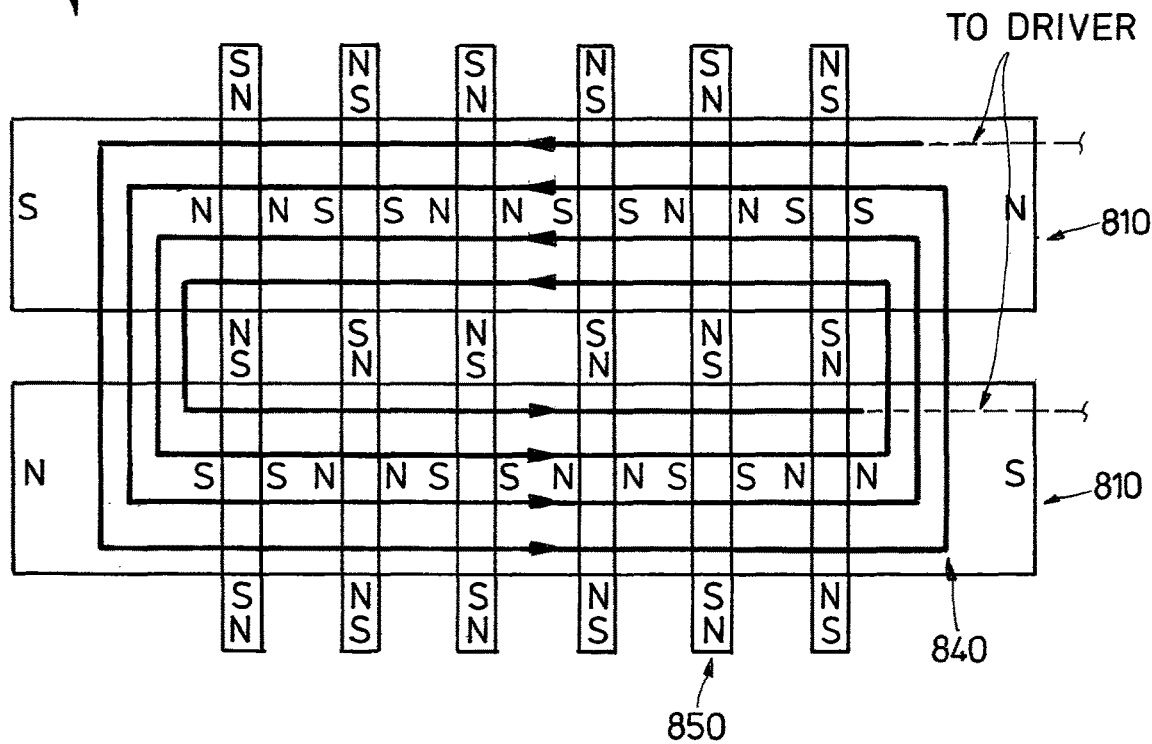
FIG. 8 shows a bottom view of an LPMS EMAT configuration according to at least one embodiment of the present disclosure.

Referring to FIG. 8 shows a bottom view of an LPMS EMAT configuration 800 according to at least one embodiment of the present disclosure. Two series of LPMS 810, each similar to the LPMS shown in FIG. 4A, are positioned in parallel but in opposite polarity. Side magnets such as 850 may be positioned to further shape and/or enhance the magnetic field in specific regions in proximity to the test object 830. The conductor set 840 pattern is similar to the pattern shown in FIGS. 7A-B, in view of one series of LPMS 810. In some embodiments, side magnets 850 may also be placed on the top/upper part of the LPMS magnets 810 in some or all of the locations indicated in FIG. 8. Generally, the magnetic field is forced towards the bottom portion of the LPMS EMAT configuration 800 such that EMAT sensitivity can be enhanced and/or modes having greater purity can be generated. In some embodiments, an implementation of this specific type of LPMS 810 with this specific type of conductor set 840 pattern is capable of generating SH plate or SH-guided waves when used as a T EMAT. In some embodiments, an implementation of this specific type of LPMS 810 with this specific type of conductor set 840 pattern is capable of generating angle beam SH waves when used as a T EMAT. In other embodiments, an implementation of this specific type of LPMS 810 with this specific type of conductor set 840 pattern is capable of receiving SH plate or SH-guided waves when used as an R EMAT. In other embodiments, an implementation of this specific type of LPMS 810 with this specific type of conductor set 840 pattern is capable of receiving angle beam SH waves when used as an R EMAT. In some embodiments, magnet dimensions may change throughout the LPMS so as to achieve desirable operating characteristics. The conductor set 840 shown in FIG. 8 is capable of generating the required induced current for operation as a T EMAT as well as receiving resulting displacements when used as an R EMAT. The arrows indicate the direction of T EMAT current in the conductor set or R EMAT voltage applied to the conductor set at any given time.

FIG. 9A shows a bottom view of an LPMS EMAT configuration 900 according to at least one embodiment of the present disclosure. FIG. 9B shows a side view of an LPMS EMAT configuration 900 according to at least one embodiment of the present disclosure. FIG. 9C shows a bottom view of an LPMS EMAT configuration 900 according to at least one embodiment of the present disclosure. FIG. 9D shows a side view of an LPMS EMAT configuration 900 according to at least one embodiment of the present disclosure. It should be noted that the magnetic forces on magnetic domains in the test object 930 are different in the two cases illustrated by FIGS. 9A-B and 9C-D. In some embodiments, the LPMS EMAT configurations 900 in FIGS. 9A-D may function as receivers. In some embodiments, the receiver conductor set 940 is a solenoid having dimensions of $d_1$ and $w_1$. Dimension $w_1$ need not be greater than $d_1$. Large area permanent magnets can be used in these R EMATs to provide a bias magnetic field that generates the magnetic force required for orientation of magnetic domains when the R EMAT is being moved with respect to the test surface 930. The magnetic force is provided in advance of the orientation or reorientation of these domains such that magnetic domain flipping noise is introduced into the R EMAT conductor set 940. In some embodiments, an implementation of this specific type of LPMS 910 with other types of receiver conductor sets 940 is capable of receiving various types of elastic waves, not only NBSH waves but also other elastic waves such as angle beam SH waves, SH-guided waves, angle beam SV waves, angle beam L-waves, Lamb and Lamb-like guided waves, surface waves, and interfacial waves (i.e., waves propagating at the interface between two materials) when used as an R EMAT. In some embodiments, magnet dimensions may change throughout the LPMS so as to achieve desirable operating characteristics.

Often times, using a conventional SH R EMAT for sensing SH waves creates a potentially large background noise related to magnetic domain reorientation as the conventional SH R EMAT is moved over the surface of a magnetic metal. According to at least one embodiment, the background noise may be reduced dramatically or eliminated when using a line type SH R EMAT configuration 900 as shown in FIGS. 9A-B. As used herein, line type refers to a receiver having a narrow dimension, such as $d_1$, in the direction of wave propagation. In another embodiment shown in FIGS. 9C-D, the receiver conductor set 940 is placed between like poles of the magnet structure in FIGS. 9C-D. As shown, the magnet poles are facing the back iron 975 surface and the test object surface 932. Magnets having large surface area adjacent to the test object surface provide a relatively constant magnetic field direction as this magnet structure is moved with respect to and parallel to the surface of a magnetic metal. The size and shape of the magnet and magnet pole near the magnetic metal surface that will minimize noise pickup due to the motion of this magnet and conductor set depends upon how rapidly the magnetic domains orient as this magnet structure is moved with respect to the magnetic surface. The back iron 975 shown in FIG. 9D is placed on top of the magnet pair to fix their relative position and to improve the efficiency of the magnetic circuit.

Still referring to FIGS. 9A-D, noise may be reduced, in some embodiments, dramatically, in such R EMAT configurations 900 when magnetic materials are incorporated. In conventional R EMAT systems, electrical noise may develop when the system is being used with magnetic materials that are moving relative to the R EMAT. The noise is due to the reorientation of magnetic domains under conditions of changing magnetization. Noise may occur when the test object 930 is magnetized, when the leading edge of R EMAT magnets magnetize the test object 930, or when the magnetic domains are "released" by the magnets at the trailing edge of an R EMAT magnets. The reorientation of magnetic domains produces a changing, time varying electromagnetic signal external to the test object that may be detected as a voltage change in the R EMAT conductor set 940. The magnitude of this magnetic domain noise may change at a rate related to the rate at which magnetic domains change orientation. This, in turn, is influenced by the relative speed of the test object 930 with respect to the R EMAT magnet structure 910 and various physical properties of the test object 930 such as internal stresses and grain boundaries.

According to at least one embodiment, to minimize these unwanted electrical signals, the domain reorientation may take place in a region where the influence of this reorientation on the external voltage sensed by the R EMAT conductor set 940 is reduced. FIGS. 9A-D show embodiments where the influence of magnetic domain reorientation may be reduced. According to at least one embodiment, a magnet having large surface area is placed over or encloses a small receiving conductor set 940. The orientation of the conductors within this conductor set 940 may be altered to optimize the detection of the elastic wave mode or modes where these elastic wave mode or modes carry the information one seeks to extract from the measurements being performed. The magnetic domain reorientation may take place on the leading and trailing edges of the large biasing magnet. In some embodiments, the physical size of the biasing magnet, particularly the magnet surface area adjacent to the test object 930 and the magnet length in the direction in which the measurement system is being moved, may be altered based upon the mechanical and magnetic properties of the test object 930 and the rate of relative motion between the R EMAT configuration 900 and the test object 930. The use of a biasing magnet of large surface area adjacent to the test object 930 and a relatively smaller R EMAT conductor set 940 is a factor when receiving SH waves or SH displacements or any other waves or displacements in magnetic materials and also is a factor when it is used to reduce magnetic domain noise for measuring other displacements.

It is to be noted that various forms of LPMS EMAT configurations (including but not limited to embodiments shown in FIGS. 1-9) may be used for T EMAT and R EMAT assemblies. In particular, the size, shape, and configuration of the magnets as well as the configuration of the conductor set or sets may substantially vary depending on the functionality of the EMAT (transmitting or receiving) and the type of waves to be generated or received. These variations may be within a particular configuration or from one configuration to another. In some embodiments, multiple conductor sets may be incorporated to an LPMS EMAT configuration. Multiple EMAT drivers may be used to drive individual conductor sets. Each EMAT driver may provide a current having a different frequency, a different amplitude, or other characteristics to achieve a measurement objective.

Referring to FIG. 10 shows a bottom view of a T EMAT system 1000 illustrating the use of separate EMAT drivers 1050 according to at least one embodiment of the present disclosure. EMAT drivers 1050 are electronic devices used to provide current to a T EMAT conductor set 1040. In some embodiments, EMAT drivers 1050 provide current to individual conductors or a collection of conductors. In some embodiments, EMAT drivers 1050 utilize impedance matching between the EMAT driver 1050 and the conductor set 1040. In other embodiments, EMAT drivers 1050 need not utilize impedance matching. The deployment of individual, low-cost, and often physically small EMAT drivers 1050 may add considerable sensitivity and/or deployment advantages to an EMAT system 1000. Such drivers can also result in an EMAT system that operates with much lower internal and external voltage sources and hence can provide added EMAT system safety features. Generally, each EMAT driver board 1050, shown as $D_1$-$D_6$, is connected by a short cable, having a characteristic impedance much lower than that conventionally employed in standard laboratory and field measurement systems, to one or more elements in the T EMAT conductor set 1040. Generally, the EMAT driver 1050 and its connections to the T EMAT conductor set 1040 is configured to maximize the T EMAT current in the T EMAT conductor set 1040 given that all other system parameters remain constant. In other embodiments, individual receiver conductors may be connected in a manner that maximizes the overall system sensitivity by utilizing methods of impedance matching. Preamplifier circuits may be used for added flexibility and improved system performance in an EMAT system 1000. Depending on the magnet configuration used in the T EMAT 1000, it may be necessary to consider the magnetic field that may be present at the active elements in the EMAT driver boards 1050 because the characteristics of many active elements are influenced to some extent by the magnetic field. LPMS EMATs have added benefits in this regard since they can be configured to have smaller magnetic fields in regions where driver boards 1050 might optimally be placed.

As mentioned above, the sensitivity of an EMAT measurement system may improve by increasing the current density generated by the T EMAT conductor set 1040 on the test object surface 1032. Conductor sets 1040 may present a relatively high load impedance to the EMAT driver 1050 circuit (collectively, the combination of electronics and other circuit elements such as impedance matching devices that facilitate the generation and optimization of the T EMAT current pulses). Conventionally, the T EMAT conductor set 1040 is connected to an EMAT driver 1050 that is capable of delivering several hundreds to a few thousand volts to the T EMAT conductor set 1040. This higher voltage requirement is related to the inherently higher load inductance (or impedance) associated with many of the conventional T EMAT conductor sets 1040 and associated driver load circuitry. For example, one commercial EMAT system uses an output voltage of 1,000 $V_{pp}$ (volts peak-to-peak) in order to generate a current of 50 $A_{pp}$ (Amperes peak-to-peak) in a T EMAT conductor set 1040 having 20 turns in an active region that is 15 mm wide and 15 mm long. Another example of a commonly used commercial EMAT driver 1050 provides an output voltage up to 1,500 $V_{pp}$ and a peak output power of around 10 kW to an appropriately impedance matched load.

One important aspect of connecting an EMAT driver 1050 to a T EMAT conductor set 1040 relates to impedance matching to maximize power transfer from one circuit or device to another. For certain EMAT systems 1000, one wishes to maximize the induced current generated by the T EMAT conductor set 1040. For a reactive load, this may not necessarily relate to maximizing the power transfer to the T EMAT conductor set 1040.

The overall transmit sensitivity of a T EMAT 1000 corresponds to the number of Ampere-turns/meter in the T EMAT conductor set 1040. For example, 1,000 Ampere-turns/15 mm relates to 50 A times 20 turns in the above-mentioned T EMAT conductor set 1040 that is 15 mm wide. Assuming other factors such as conductor set lift off and the magnitude of the magnetic field in the vicinity of the T EMAT conductor set 1040 being equal, the EMAT system 1000 sensitivity would remain constant if 100 A of current passed through a 10-turn conductor set or 200 A of current passed through a 5-turn conductor set, for the same T EMAT width of 15 mm.

According to at least one embodiment, implementing various LPMS EMAT configurations 100, 400, 500, 600, 700, 800, 900, 1000 shown in various embodiments of the present disclosure with high current driver 1050 and associated circuits shown in FIG. 10 may enable the T EMAT conductor set 1040 to carry a current over about 500 $A_{pp}$. In other embodiments, the T EMAT conductor set 1040 may carry a current over about 2,000 $A_{pp}$. In alternate embodiments, there is an overall improvement in sensitivity of about 20 dB. Such EMAT system may, for example, have greater sensitivity to detecting material anomalies, be capable of making measurements at higher relative speed between the EMAT system and the test object, be capable of making measurements at larger lift off distance and be capable of sensing the presence of material anomalies at greater distances from the T and R EMATs. Advantageously, the embodiments and the deployment thereof illustrated in FIG. 10 can be used not only with LPMS EMATs, but also with conventional T EMATs and their deployment.

As mentioned previously, one factor that may limit the current that passes through a conductor set 1040 is circuit impedance. A portion of the circuit impedance is in the cable that connects the EMAT driver 1050 to the T EMAT conductor set 1040. The T EMAT conductor set 1040 impedance may be divided into two portions: the circuit impedance associated with the conductor set active region and the remainder of the conductor set impedance including the above referenced cable. Preferably, it is to reduce all contributions to the circuit impedance to the lowest practical/possible value. The circuit impedance associated with the conductor set active region is usually an essential feature of the conductor set that is determined at least in part by the elastic wave mode or modes and the elastic wave beam area and intensity that one wishes to generate with the T EMAT 1000 (this impedance can be minimized but may not be eliminated). A low circuit resistance is normally a byproduct of minimizing the circuit inductance; one skilled in the art would recognize that reducing the T EMAT 1000 inductance generally leads to reducing the circuit impedance.

According to at least one embodiment, the portion of the circuit inductance that resides in the connection between the EMAT driver 1050 and the T EMAT 1000 may be minimized by some combination of using a low-inductance cable and making this cable short by placing the EMAT driver 1050 in close proximity to or even directly on the T EMAT 1000 assembly. Referring back to FIG. 10 shows a schematic representation of six individual high current EMAT drivers 1050 placed near a T EMAT conductor set 1040. In some embodiments, the output portions of these EMAT drivers 1050 are placed within about 10 cm of the individual elements of the T EMAT conductor set 1040. In some embodiments, a MOSFET (such as part number IPT020N10N3 with specifications of max drain voltage=100 V, max pulsed drain current=1200 A, and an input capacitance of approximately 20 nF, Infineon Technologies AG, Germany) may be configured on an about 6×8 cm circuit board and be mounted, for example, three on each side of the T EMAT magnet assembly (or three at each end of the T EMAT assembly) so as to drive six individual T EMAT conductors 1040 having peak currents in excess of about 1,000 A in each conductive element using a standard half-bridge or other convenient EMAT driver topology. In other embodiments, a full bridge or so-called H-bridge driver topology may be used. In some embodiments, for example, a circuit may provide a current up to about 1,000 $A_p$ (Amperes peak) in an about 4 to about 8-cycle, about 100 to about 300 kHz tone burst at a pulse repetition frequency of up to about 300 Hz. Such performance characteristics are suitable for EMAT applications having high sensitivity to material anomalies or the ability to detect the presence of significant material anomalies at a large distance from the T and R EMAT assemblies. In other embodiments, tone bursts up to about 600 kHz are produced. In other embodiments, tone bursts up to about 1.5 MHz are produced. In other embodiments, tone bursts over about 1.5 MHz are produced. In some embodiments, tone bursts having up to 20 or more cycles may be used. In some embodiments, pulse repetition frequencies over 300 Hz may be used.

According to at least one embodiment, a low-inductance cable is used when the output portion of the EMAT driver 1050 electronics is positioned at some distance from the T EMAT conductor set 1040. For example, either a low inductance coaxial cable, a low inductance twisted pair or parallel strip transmission lines, in each case having a characteristic impedance of about 1 Ohm, about 5 Ohm, or about 20 Ohm may be used. In some embodiments, the inductance per unit length of this cable is several factors smaller than that of standard 50 Ohm transmission lines, twisted pairs or coaxial cables. Although cable capacitance may increase, this load capacitance is seldom a limiting factor for an EMAT driver 1050 connected to a conductor set 1040. In some embodiments, inductance of each conductor subset is set to about equal for conductor sets driven by multiple T EMAT current sources (T EMAT drivers 1050), such as shown in FIG. 10. The current magnitude and waveform are substantially the same for each of the conductor subsets that are included in the conductor set for any particular T EMAT configuration. Various shapes and dimensions of each element of the conductor set may be but need not be identical. In some embodiments, low impedance transmission lines are used between the T EMAT current sources and the conductor sets or subsets, where the T EMAT current sources may be more than about 10 cm or more than about 30 cm away from the conductor set or subsets.

FIG. 11A shows a side view of an LPMS EMAT-based elastic wave measurement system 1100 according to at least one embodiment of the present disclosure. FIG. 11B shows a bottom view of an LPMS EMAT-based elastic wave measurement system 1100 according to at least one embodiment of the present disclosure. An embodiment of the T EMAT configuration 1110 can include the LPMS EMAT configurations previously shown in FIGS. 6A-B and 7A-B. An embodiment of the R EMAT configuration 1120 can include the LPMS EMAT configurations previously shown in FIGS. 6A-B, 7A-B and 9A-B. In some embodiments, as shown in FIGS. 7A-B, the T EMAT configuration 1110 is capable of transmitting certain elastic waves such as SH plate, SH-guided waves, and angle beam SH waves. The elastic waves may have a polarization substantially parallel to the test object surface 1132 and substantially perpendicular to the propagation direction. One skilled in the art would recognize that other T EMAT configurations disclosed herein can be used to generate other type of waves, such as bulk modes of SV waves, bulk modes of L-waves and guided modes of Lamb and Lamb-like waves, depending on the conductor set. In some embodiments, as shown in FIGS. 9A-B, the R EMAT configuration 1120 is capable of receiving certain elastic waves such as with other types of receiver conductor sets 1142 is capable of receiving various types of elastic waves, such as SH plate, SH-guided waves, and angle beam SH waves generated by the T EMAT configuration 1110. One skilled in the art would recognize that other R EMAT configurations disclosed herein can be used to receive other type of waves, such as NBSH waves, angle beam SH waves, SH-guided waves, SV waves, Lamb and Lamb-like guided waves, surface waves, and interfacial waves, depending on the conductor set. In some embodiments, the R EMAT configuration 1120 is capable of minimizing the generation and detection of magnetic noise when being used with magnetic material moving with respect to the receiver.

Still referring to FIGS. 11A-B shows an LPMS EMAT based elastic wave measurement system 1100 that may dramatically reduce the noise in R EMATs 1120 when used with some magnetic materials. In conventional R EMAT systems, electrical noise may develop when the system is being used with some magnetic materials that are moving relative to the R EMAT 1120. The noise is due primarily to the reorientation of magnetic domains under conditions of changing external magnetization. Noise may occur when the test object 1130 is magnetized, when the leading edge of an R EMAT 1120 magnet magnetizes the test object 1130, or when the magnetic domains are released by the magnet at the trailing edge of an R EMAT 1120 magnet. For example, the magnetic domain structure beneath the conventional R EMAT 1120 may be an alternating north-south magnetic pole orientation. When this R EMAT 1120 moves just a short distance, such as a fraction of the EMAT wavelength, the magnetic domain orientation within the test object 1130 may change very significantly. After moving a half-wavelength, the magnetic domains may be almost completely inverted with respect to an earlier orientation. The reorientation of magnetic domains produces a magnetic signal external to the test object that is usually detected as a voltage change in the R EMAT conductor set 1142. The magnitude of this magnetic domain noise may change at a rate related to the rate at which magnetic domains change orientation. This, in turn, is influenced by the relative speed of the test object 1130 with respect to the R EMAT 1120 magnet structure and various physical properties of the test object 1130 such as internal stresses and grain boundaries.

According to at least one embodiment, to minimize these unwanted electrical signals, the domain reorientation may take place in a region where the influence of this reorientation on the external voltage sensed by the R EMAT conductor set 1142 is much reduced. FIGS. 9A-D and 11A-B show embodiments where the influence of magnetic domain reorientation is reduced. According to at least one embodiment, a magnet having large surface area is placed over or around a relatively small (such as less than about one-half wavelength in the wave propagation direction) receiver conductor set 1142. The orientation of the conductors within this receiver conductor set 1142 may be altered to optimize the detection of the elastic wave mode or modes where these elastic wave mode or modes carry the information one seeks to extract from the measurements being performed. As shown in FIGS. 9A-D and 11A-B, the magnetic domain reorientation takes place on the leading and trailing edges of the larger biasing magnet. In some embodiments, the physical size of the biasing magnet, particularly the magnet surface area adjacent to the test object 1130 and the magnet length in the direction in which the measurement system is being moved, may be altered based upon the mechanical and magnetic properties of the test object 1130 and the rate of relative motion between the R EMAT 1120 and the test object 1130. The use of a biasing magnet of large surface area adjacent to the test object 1130 and a relatively smaller R EMAT conductor set 1142 is a factor when receiving SH waves or SH displacements in magnetic materials and also is a factor when it is used to reduce magnetic domain noise for measuring other displacements. It should be noted that any LPMS moving in the vicinity of or on the surface of a moving magnetic material (such as the test object 1130) has the potential to generate magnetic domain noise. This includes an LPMS such as illustrated in FIGS. 5A-B and 6A-B that may be used to generate Lamb and Lamb-like waves, angle beam SV waves, surface waves, interfacial waves, and the like.

In some embodiments, multiple conductor sets may be incorporated to an LPMS EMAT configuration. Multiple EMAT drivers may be used to drive individual conductor sets. Each EMAT driver may provide a current having a different frequency, a different amplitude, or other characteristics to achieve a measurement objective. For example, FIG. 11B shows six conductors 1140 which may be energized by two or more different EMAT drivers where each driver can provide a current having a different frequency, a different amplitude, or other characteristics to achieve a measurement objective. This way, simultaneous (as opposed to rapid but sequential) excitation of two or more different wave modes can be achieved while maintaining all the inherent advantages of such a combination. Further, such an approach makes possible the simultaneous generation of two or more elastic wave modes. For example, two or more different SH guided waves can be simultaneously generated. In some embodiments, two or more different angle beam SH waves can be simultaneously generated. In other embodiments, one or more SH guided waves and one or more angle beam SH waves can be simultaneously generated. Further, multiple EMAT drivers combined with multiple conductor sets can be used to simultaneously generate two or more of the same elastic wave modes. For example, two or more of the same elastic wave modes can be simultaneously generated where the two or more of the same elastic wave modes differ in phase. In some embodiments, two or more of the same elastic wave modes can be simultaneously generated where the two or more of the same elastic wave modes differ in frequency. In other embodiments, two or more of the same elastic wave modes can be simultaneously generated where the two or more of the same elastic wave modes differ in amplitude.

In some embodiments, the R EMAT conductor set 1142 is configured with a greater conductor set length than the T EMAT conductor set 1140 in order to enhance the signal-to-noise ratio (SNR) of the LPMS EMAT-based elastic wave measurement system 1100. In some embodiments, the magnet structure in the R EMAT 1120 may be different from the magnet structure in the T EMAT 1110. In some embodiments, the T EMAT conductor set 1140 is configured to minimize the generation of unwanted elastic modes. In some embodiments, the R EMAT conductor set 1142 is configured to minimize the reception of unwanted elastic modes. In some embodiments, the LPMS and conductor set of the R EMAT 1120 is generally similar to those of the T EMAT 1110. In other embodiments, the LPMS and conductor set of the R EMAT 1120 may be generally very different from those of the T EMAT 1110.

In some embodiments, any individual LPMS may be configured to generate more than one elastic wave or elastic wave mode. For example, an LPMS may be configured to generate an angle beam SH wave and an NBSH wave. An LPMS may be configured to generate an SH guided wave and a Lamb or Lamb-like guided wave. The LPMS may include two or more conductor sets arranged and deployed in each case to generate the desired modes.

In some embodiments, the like pole arrangement includes the plurality of magnets being serially spaced such that magnetic field lines emanating from each magnet pole intersect a surface of the test object proximate to each magnet pole substantially perpendicularly. The serial spacing may include multiple individual like pole sets that are not necessarily composed of magnets having the same shape or size or being made of the same material. Such deployments may be useful when the desired objective is to provide a desired shape to the elastic wave beam, to concentrate the beam energy in a particular region, or to achieve some other objective.

Figure 12A:
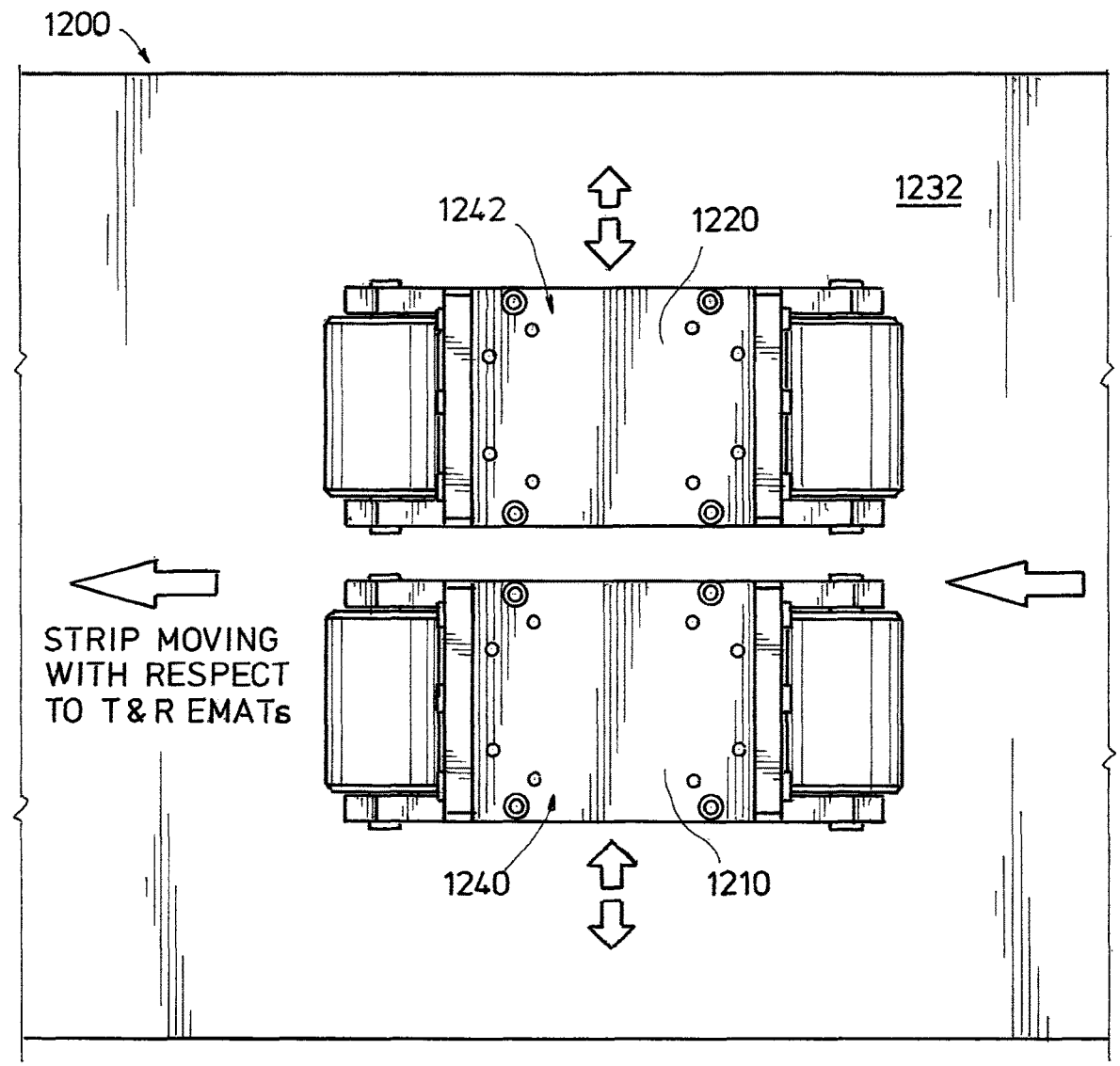
FIG. 12A shows a top view of an EMAT-based elastic wave measurement system suitable for inspection of a planar object according to at least one embodiment of the present disclosure.
Figure 12B:
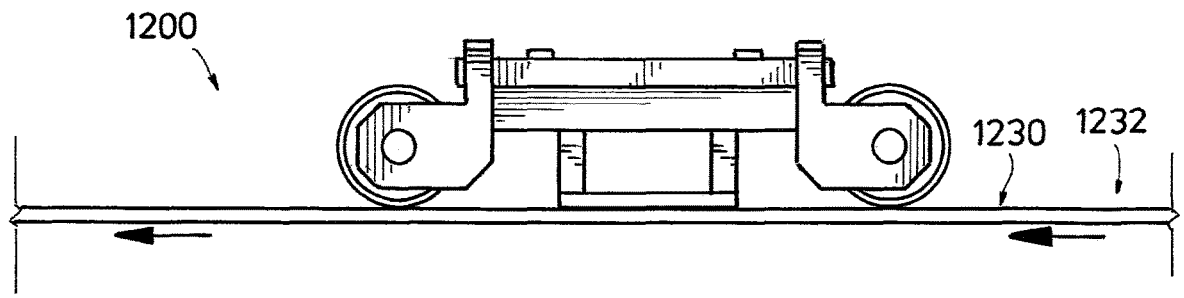
FIG. 12B shows a side view of an EMAT-based elastic wave measurement system suitable for inspection of a planar object according to at least one embodiment of the present disclosure.

FIG. 12A shows a top view of an EMAT-based elastic wave measurement system 1200 suitable for inspection of a planar object according to at least one embodiment of the present disclosure. FIG. 12B shows a side view of an EMAT-based elastic wave measurement system 1200 suitable for inspection of a planar object according to at least one embodiment of the present disclosure. FIGS. 12A-B applies to the use of any EMAT, conventional or LPMS, being used for measurements on the test object as described in the present disclosure. Other transducers, such as piezoelectric transducers contained within so-called wheels, piezoelectric transducers incorporated into so-called bubbler systems, piezoelectric transducers used with dry couplants, and transducers to generate elastic waves in materials via air coupling mechanisms, used in guided wave NDT/NDE can be used in lieu of the EMATs shown in FIGS. 12A-B. As shown in FIGS. 12A-B, a plate 1230 is moving past a set of EMATs 1210, 1220. The vertical arrows on the plate indicate the general direction for guided wave propagation. The horizontal arrows show the test object 1230 (the plate) moving with respect to the T and R EMAT set 1210, 1220. Optionally, the EMAT based elastic wave measurement system 1200 includes the T and R EMAT conductor sets 1240, 1242 to be under the same magnet or one above the other. As shown in FIGS. 12A-B, the T and R EMATs 1210, 1220 are positioned such that measurement is carried out on the test object 1230. In some embodiments, the T and R EMATs 1210, 1220 include conventional EMAT systems. In other embodiments, the T and R EMATs 1210, 1220 include LPMS EMAT systems 100, 400, 500, 600, 700, 800, 900, 1000, 1100. In some embodiments, separate T and R EMAT conductor sets 1240, 1242 positioned in separate magnet assemblies may be placed over the test object. In other embodiments, the magnets included in the LPMS need not be of a spatially uniform configuration such as shown for example in FIGS. 7A-B. The magnets may have varying height, width, and magnet pole separation. In yet other embodiments, the conductor set need not be confined to the region between or in the vicinity of the like poles such as illustrated for example in FIG. 5A-B or 6A-B. The conductor set may, for example, have some conductors placed midway between the opposite poles of a particular magnet within the LPMS. In another embodiment, the T EMAT elastic wave beam need not travel approximately perpendicular to an edge so long as the R EMAT is positioned appropriately to measure those properties of the elastic wave that contain the desired information. The EMAT assemblies 1210, 1220 may be positioned over a long, narrow plate test object 1230 such that the plate 1230 may move in rolling contact with the EMAT assembly 1210, 1220. Additionally, air-bearings can replace the rolling contact. The T EMAT assemblies 1210 may generate Lamb, Lamb-like, SH guided elastic waves, or any other (guided) wave modes that can propagate back and forth across the narrow dimension of the test object with the elastic wave direction being substantially perpendicular to the substantially flat edges of the test object 1230. This creates a condition where the elastic wave propagates across the width of the test object 1230. When energy losses occurring as the elastic wave propagates are kept sufficiently small and the wave mode dispersion is kept sufficiently low, the elastic wave may reverberate several times back and forth across the plate width. When the elastic wave makes more than the equivalent of about one full round-trip path across the plate, in excess of about 100% of the plate volume over the width of the elastic wave beam along the beam path, the propagation characteristics of the elastic wave may change. In some embodiments, depending on the placement of the T and R EMATs 1210, 1220, less than substantially one full round-trip may be required. Although not to be bound by any theory, because the elastic wave propagation velocity may amount to a few thousands of meters per second (m/s) and the moving plate speed may amount to less than a few m/s, one complete round-trip across the plate 1230 essentially may provide an approximately instantaneous snapshot of the internal properties and characteristics along the elastic wave path within the test object. For example, the round-trip travel time for a plate 1230 one meter wide is approximately one millisecond (ms); during this time, the plate moves one millimeter (mm) when the plate speed is one m/s. In some embodiments, software that controls the signals sent to the T EMAT 1210 drive electronics may produce anew elastic wave pulse traveling across the plate at time intervals that permit the characteristics of the entire plate volume to be sampled one or more times as the moving plate passes through the elastic wave beam which may be about 20 to over about 100 mm wide. In some embodiments, the elastic wave generated by the T EMAT 1210 does not propagate approximately perpendicular to the long dimension of the plate. The R EMAT 1220 may be positioned to intersect the T EMAT beam directly or to intersect the T EMAT beam after reflection from one of the edges of the test object or from a material anomaly within the test object. In some embodiments, surface waves deployed in a manner similar to that described in this disclosure may be used to interrogate the plate surface 1232 on which the surface waves are generated and received. Multiple T EMATs or R EMATs may be deployed as appropriate across the width of the test object and such multiple deployment need not be at the same axial positions along the plate 1230.

Figure 12C:
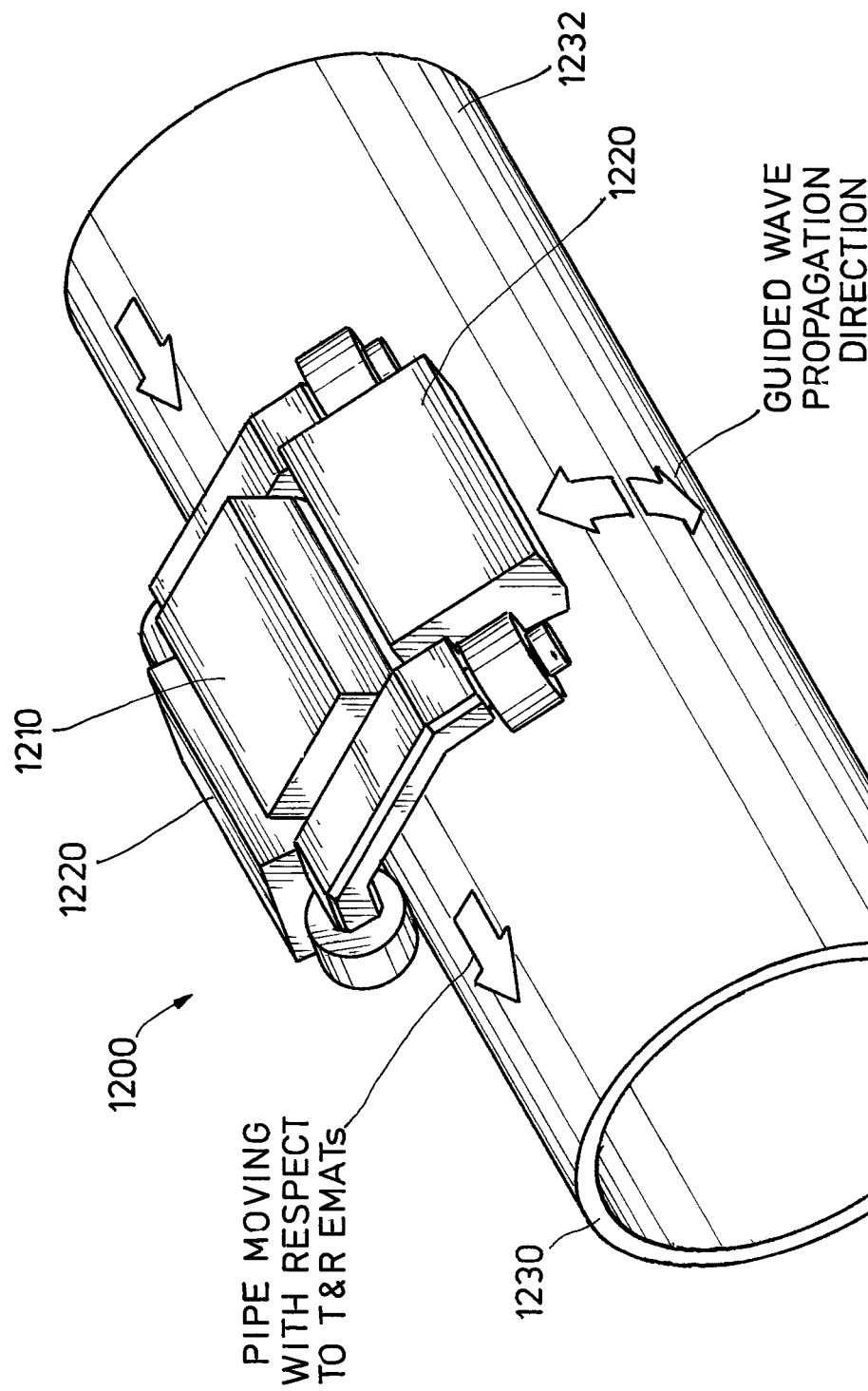
FIG. 12C shows a perspective view of an assembly of an LPMS EMAT-based elastic wave measurement system suitable for inspection of a cylindrical object according to at least one embodiment of the present disclosure.

Referring to FIG. 12C shows a perspective view of an assembly of an LPMS EMAT-based elastic wave measurement system 1200 suitable for inspection of a cylindrical object according to at least one embodiment of the present disclosure. FIG. 12C applies to the use of any EMAT, conventional or LPMS, being used for measurements on the test object as described in the present disclosure. Other transducers, such as piezoelectric transducers contained within so-called wheels, piezoelectric transducers incorporated into so-called bubbler systems, piezoelectric transducers used with dry couplants, and transducers to generate elastic waves in materials via air coupling mechanisms, used in guided wave NDT/NDE can be used in lieu of the EMATs shown in FIG. 12C. As shown in FIG. 12C, the EMAT-based elastic wave measurement system 1200 is deployed to perform the inspection of a cylindrical object such as pipes to extract information such as average pipe wall thickness, pipe circumference, or some related dimension, material anomalies within the pipe wall, and other features that may be extracted using a variety of elastic waves that are generated by the T EMAT and received by the R EMATs. As shown, a pipe 1230 is moving past a set of EMATs including one T EMAT 1210 and two R EMATs 1220. The arrows in the circumferential direction of the pipe indicate the general direction for guided wave propagation. The arrows in the longitudinal direction of the pipe show the cylindrical test object 1230 (the pipe) moving with respect to the T and R EMAT set 1210, 1220. Optionally, the EMAT based elastic wave measurement system 1200 includes the T and R EMAT conductor sets 1240, 1242 to be under the same magnet or one above the other. As shown in FIG. 12C, the T and two R EMATs 1210, 1220 are positioned such that measurement is carried out on the cylindrical test object 1230. In some embodiments, the T and R EMATs such as 1210, 1220 include conventional EMAT systems. In other embodiments, the T and R EMATs such as 1210, 1220 include LPMS EMAT systems 100, 400, 500, 600, 700, 800, 900, 1000, 1100. In some embodiments, separate T and R EMAT conductor sets 1240, 1242 positioned in separate magnet assemblies may be placed over the cylindrical test object. In other embodiments, the magnets included in the LPMS need not be of a spatially uniform configuration such as shown for example in FIGS. 7A-B. The magnets may have varying height, width, and magnet pole separation. Optionally, the magnets may utilize different magnet separator sizes. In yet other embodiments, the conductor set need not be confined to the region between or in the vicinity of the like poles such as illustrated for example in FIGS. 5A-B. The conductor set may, for example, have some conductors placed midway between the opposite poles of a particular magnet within the LPMS. In another embodiment, the T EMAT elastic wave beam need not travel approximately circumferentially so long as the R EMAT is positioned appropriately to measure those properties of the elastic wave that contain the desired information. The EMAT assemblies 1210, 1220 may be positioned over a pipe test object 1230 such that the pipe 1230 may move relative to and in rolling contact with the EMAT assembly 1210, 1220. Additionally, air-bearings and related mechanisms can replace the rolling contact. The T EMAT assemblies 1210 may generate Lamb, Lamb-like, surface, SH guided elastic waves, and the like that can propagate back and forth around the circumference of the cylindrical test object with the elastic wave direction being substantially perpendicular to the longitudinal direction of the cylindrical test object 1230. In some embodiments, the elastic waves need not propagate around the circumference so long as the R EMAT is positioned so as to detect the elastic wave or waves that contain the information sought from the measurement.

As used herein, the disclosures relevant to Lamb and Lamb-like guided wave modes similarly apply to any guided wave mode or modes, such as an SH type guided wave mode. Guided waves propagate in a bounded medium and have characteristics such as a phase velocity and group velocity. Phase and group velocity depend on the test object dimensions (usually the thickness or the smallest dimension), the test object physical properties, the elastic wavelength being propagated, and the frequency and periodicity of the forces that generate the elastic displacements. One skilled in the art would recognize that propagation characteristics of guided waves are generally much more complex than those of bulk (or even surface) waves and that guided waves can be used for measurement purposes.

Referring to FIGS. 12A-C, the T EMAT 1210 may launch a Lamb and Lamb-like guided wave mode using a T EMAT conductor set 1240 at a specified wavelength that is related to the LPMS physical characteristics. The EMAT measurement system 1200 is programmed to cause a tone burst of current up to several cycles duration (time length) at a specified frequency or range of frequencies to pass through the T EMAT conductor set 1240 (which resides partially or entirely within a magnetic field) and thereby generate an elastic wave having a group and phase velocity. In some embodiments, the R EMAT conductor set or sets detect the presence of one or more elastic wave modes as they propagate in the test object directly beneath the R EMAT conductor set or sets. The R EMAT conductor set or sets may provide electric signals at times (after pulse initiation) corresponding to a variety of elastic wave travel distances. The travel distances may be related to the relative placement of the R EMAT(s) 1220 with respect to the T EMAT 1210, related to the R EMAT 1220 position or positions with respect to any edges of the test object that are approximately parallel to the direction of motion of the test object, or related to the position of defects within the test object 1230. In some embodiments, the R EMAT(s) 1220 may be only or primarily configured to be sensitive to the elastic wave mode or modes that are generated by the T EMAT 1210. In other embodiments, the R EMAT(s) 1220 may be configured to be relatively insensitive to the primary elastic wave mode or modes that are generated by the T EMAT 1210. In other embodiments, the R EMAT(s) 1220 may be configured to be sensitive primarily to one or more of an elastic wave mode that was not generated by design but, for example, might be generated by mode conversion due to scattering from a plate edge or material anomaly. For example, the R EMAT(s) 1220 may be configured to be most sensitive to the elastic wave displacements that contain information sought to extract from the elastic wave measurement. In some embodiments, multiple R EMAT conductor sets 1242 may be used under the same or different magnets so that the above conditions can be realized simultaneously using separate channels or multiplexed R EMAT 1220 electronics and instrumentation, each channel providing separate and possibly distinct information. The multiple R EMAT conductor set 1242 may be particularly sensitive to elastic wave modes generated by the T EMAT 1210 or, in other cases, particularly insensitive to the elastic wave modes generated by the T EMAT 1210. Information of interest, such as phase shifts that relate to the presence of material anomalies, may also be obtained by comparing the signals from different R EMAT 1220 channels. In some embodiments, MS EMATs may be used in place of LF EMATs where LPMS may be incorporated into either configuration.

Figure 13:
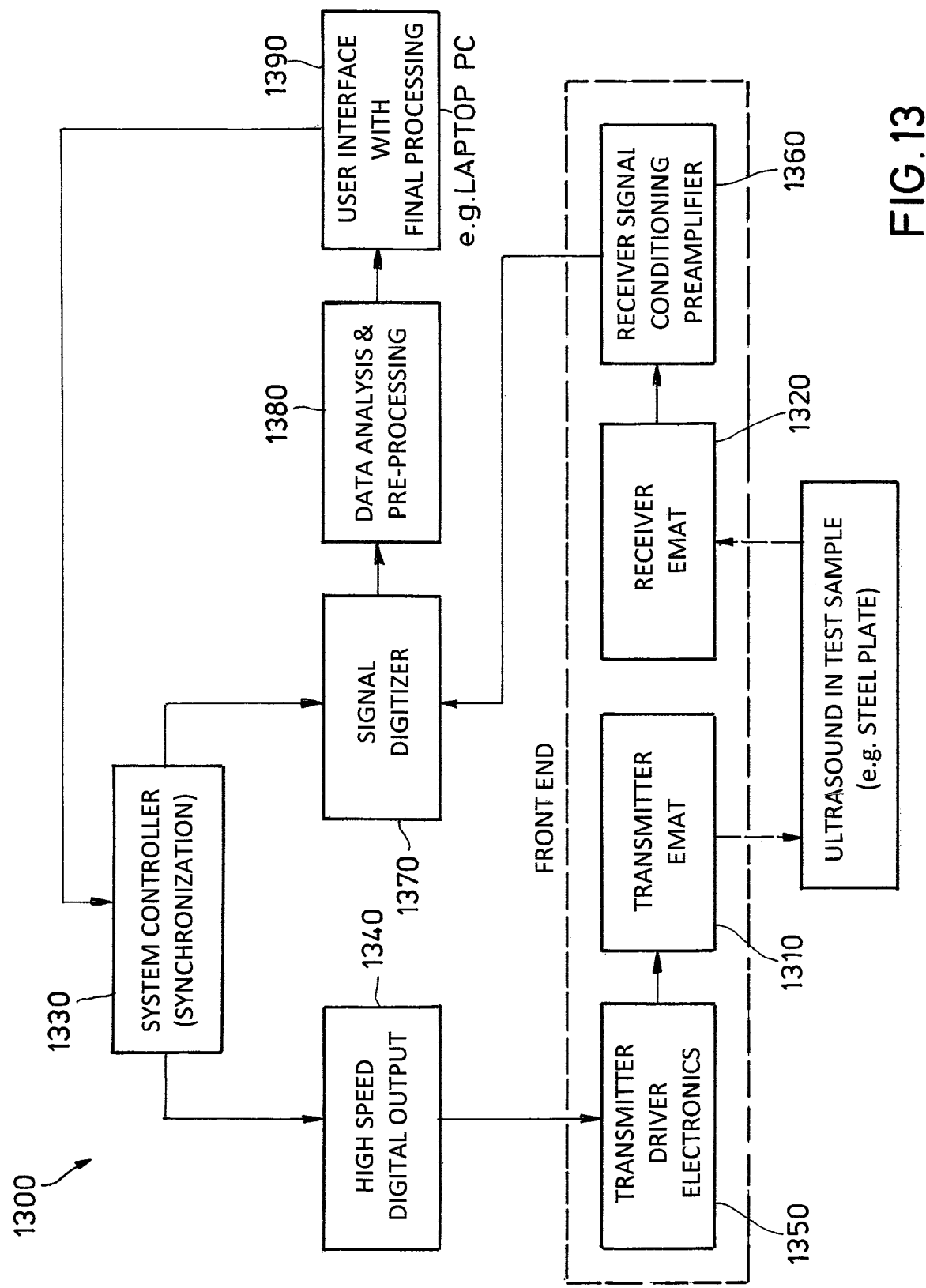
FIG. 13 shows a block diagram of an EMAT-based elastic wave measurement system and relevant instrumentation according to at least one embodiment of the present disclosure.

Referring to FIG. 13 shows a block diagram 1300 of an EMAT-based elastic wave measurement system 1200 and relevant instrumentation according to at least one embodiment of the present disclosure. The System Controller 1330 is the system component that includes software for overall system management. The High Speed Digital Output 1340 receives input from the System Controller 1330 and delivers digital output signals that cause the desired current waveform in the T EMAT 1210, 1310 to be generated. The Transmitter Driver Electronics 1350 is based on the system software, where it produces the required current in the T EMAT conductor set 1240 or subset that generates the desired elastic waves in the test object 1230. The T EMAT 1210, 1310 generates the required elastic waveform in the test object 1230; this elastic waveform may contain multiple wave modes. The R EMAT 1220, 1320 generates an output voltage corresponding to some component of the elastic wave displacement at the surface 1232 adjacent to the R EMAT conductor set 1242. The Receiver Signal Conditioning system 1360 (or Preamplifier) amplifies, filters, and performs any other necessary functions to provide an acceptable waveform input to the Signal Digitizer 1370. The Receiver Signal Conditioning system 1360 is configured to achieve an acceptable signal-to-noise ratio (SNR). The Signal Digitizer 1370 provides a digitized version of the analog signal presented to it by the Receiver Signal Conditioning system 1360. The Data Analysis and Pre-processing 1380 system extracts the desired information from the received signal. The User Interface with Final Processing 1390 system includes a console for the user/operator to input operator-determined measurement parameters, and any specific parameters that may be desired for processing the output of the data analysis and preprocessing stage so that the test information may be presented in a manner most easily interpreted by the user/operator. In some embodiments, the Transmitter Driver Electronics 1350 and the Receiver Signal Conditioning System 1360 may be located remotely with respect to the T EMAT 1210, 1310 and R EMAT 1220, 1320 assemblies.

According to at least one embodiment, various signal processing means are implemented to produce useful information from the set of signals emanating from the R EMAT 1220, 1320. Although temporal averaging of an electronic signal is commonly implemented to reduce random electronic noise within that signal, temporal averaging methods may have limited use in high-speed inspection systems, such as some embodiments described in the present disclosure, because they increase the time required for a given measurement. Instead, in some embodiments, as an EMAT system 1200 designed for high-speed inspection procedures, raw R EMAT output voltage or voltages are used to be subsequently amplified, filtered, digitized, correlated and sometimes processed in other ways that are beneficial for extracting the desired information from the signals. The amplification, filtering, digitization, correlation, or further relevant processing is not necessarily in the above order and some processes may be repeated at different stages within the measurement system.

According to at least one embodiment, the processed EMAT system output contains information available from the guided elastic wave examination of the test object 1230. In some embodiments, the digitized EMAT system output is further processed to extract certain aspects or specific features of the test object parameters to make the information in the EMAT system output signals clearer and/or easier to interpret by less skilled operators, to make the EMAT system output respond automatically to preprogrammed conditions or to cause the EMAT system output to change parameters of other equipment and apparatus associated with the EMAT measurements or other system operations. In some embodiments, various measurable parameters of elastic wave modes are used to monitor some condition or property of the test object 1230 such as its temperature or dimension, or to detect the presence and determine the physical size, and optionally the physical location, of some material anomalies within the test object 1230. For example, a Lamb or Lamb-like guided wave may be used to assess a plate or pipe for the presence of internal or surface defects such as pits, cracks and inclusions. Such physical and/or material characteristics of the test object 1230 may often be inferred from measurements such as a change in the amplitude of a specific elastic wave mode that travels directly from the T EMAT 1210 to the R EMAT 1220 or that is reflected from some material anomalies or test object edges or any other portion of the test object 1230 one or more times and then back to the R EMAT 1220 assembly. Some physical and material characteristics of the test object 1230 also influence the travel time of some or all of the elastic wave modes being generated. In some embodiments, the measurement system, whether based upon EMATs or other ultrasonic devices, adjusts a system measurement parameter such as frequency automatically so as to place the elastic wave measurement system parameters at more favorable values or levels in order to extract the desired information from the elastic wave measurement. This adaptive and iterative process aids in assuring maximum test reliability and utility.

According to at least one embodiment, median-removal signal processing is employed to minimize the effect of a slowly varying signal baseline. The slowly varying signal baseline may, for example, be introduced by changes in wave mode reflection amplitude due to slowly varying non-flat plate edges giving rise to a change in the wave mode reflection coefficient at the plate edge. In other embodiments, median-removal signal processing is employed to retain or enhance the "visibility" of local variations in the signal amplitude due to defects. The resulting signal is then emphasized by applying a mathematical operator, such as squaring the signal values, to improve the contrast before the signal is, for example, compared with an alarm threshold.

According to at least one embodiment, the EMAT-based elastic wave measurement system 1200 uses sequential but essentially instantaneous guided waves. In some embodiments, the EMAT based elastic wave measurement system 1200 is capable of extracting two or more different pieces of information about a test object 1230, or capable of determining the same information using two or more different wave modes, wave types, or wave parameters. In some embodiments, the EMAT-based elastic wave measurement system 1200 is capable of using information from one set of guided wave or other measurements as input to configure the subsequent generation of guided waves in real-time during a test procedure. These processes may be repeated multiple times.

According to at least one embodiment, there is a set of ultrasonic NDT/NDE measurements that adapts automatically to changing conditions within the manufacturing environment, including multiple and rapid changes in the test object itself. For example, changes in the physical dimensions of a metal strip that may contain material anomalies passing through the EMAT 1200 or other ultrasonic measurement system. A specific case might be the automated process of manufacturing a long string of several thousand meters of seam-welded pipe where the pipe wall thickness changes (either by design or inadvertently) over the length of the pipe. Although not to be bound by theory, because the strength of the pipe is related to its wall thickness, a system user may desire to know that the pipe wall thickness lies within specific boundaries during the manufacturing processes. A system user may desire to know whether there are any material anomalies in the metal plate prior to it being rolled, formed, and welded into a final object (such as a pipe). The material rolling and welding operations may be sensitive to changes in plate width; a system user may desire to know whether the width of the metal strip changes prior to it being rolled and welded to form the final pipe. A system user may desire to assess the metal strip prior to being rolled and welded for material anomalies that may exist anywhere within the metal strip (which becomes the pipe wall).

According to at least one embodiment, an adaptive, multimode guided wave or other inspection system may meet the above requirements by adapting to changing features of the test object, in this case the moving metal strip. Specific conditions and parameters described herein should in no way be interpreted as limiting cases. One skilled in the art of guided elastic waves and using guided wave or other elastic wave inspection systems would appreciate that examples disclosed herein are simply illustrative of features that can be realized in EMAT-based or other guided wave inspection systems 1200.

Referring back to FIGS. 12A-C, the T and R EMAT 1210, 1220 assembly is placed in sliding, rolling, magnetic levitation, or air bearing contact with the test object 1230 (for example, a steel or aluminum plate whose width and thickness may vary within defined ranges). The test object 1230 may contain material anomalies. In some embodiments, an EMAT based elastic wave measurement system 1200 may provide a specific output to the presence of material anomalies greater than some specified characteristics. The desired sensitivity of an inspection system is usually stated in terms of the ability of the inspection system to provide a highly reliable response to certain specific artificial material anomalies (that are sometimes defined as specific material defects) such as hemi-spherical pits, narrow machined grooves or channels (cracks of a particular orientation), and through or side-drilled holes. The detection of anomalies near or on one or both edges of the strip, represents a formidable challenge to conventional NDT/NDE systems, especially when measurements must be performed rapidly and interpreted automatically. As described above, in some embodiments, the EMAT-based elastic wave measurement system 1200 provides a continuous readout and/or plot of the plate thickness and width. As described above, in some embodiments, the EMAT-based elastic wave measurement system 1200 provides a continuous readout and/or plot of the presence of material anomalies.

According to at least one embodiment, the T and R EMAT conductor sets 1240, 1242 are configured based on factors or combination of factors such as the test object 1230 material, the types and potential locations of material anomalies that is desired to be detected and/or quantified, the range of test object 1230 thickness, the range of test object 1230 plate width, the speed at which the test object 1230 passes through the inspection system, or the like. The T EMAT instrumentation 1210 and conductor set 1240 configuration are configured to generate a range of frequencies in the T EMAT 1210 exciting currents for extracting the desired information from the R EMAT 1220 signals. The LPMS structure and the range of frequencies used to generate the guided elastic wave modes are those that the EMAT system 1200 designer determined to be optimal for the particular inspection and measurement objectives. For example, the through-wall thickness of the test object influences some of the guided wave propagation characteristics (such as the phase and group velocities of the different guided wave modes) of most of the various guided wave modes. Hence, in order to monitor or measure the through-wall thickness of the test object, a user may select an elastic guided wave mode, such as the S0 mode or the SH1 mode, that exhibits characteristics that are sensitive to the test object through-wall thickness. As another example, the width of the test object 1230 (the larger of the dimensions perpendicular to the direction of test object travel) may be determined by measuring the round-trip travel time for one or more of the guided wave modes. In order to avoid or eliminate complexities in interpreting measurement results, it may be desirable for the elastic wave mode used for measuring/monitoring the test object 1230 width to depend as little as possible on other parameters of the test object 1230 (such as the plate thickness) that are also subject to change during a particular measurement sequence. For width measurements, it might be preferable to use an elastic wave mode with propagation characteristics that are relatively independent of the test object 1230 through-wall thickness, such as the surface wave, the A0 mode, or especially the SH0 mode.

According to at least one embodiment, guided elastic wave modes sensitive to material anomalies may not be modes having a relatively strong dependence on the test object 1230 through wall thickness. Thus, a guided elastic wave examination of the test object 1230 for the three parameters, wall thickness, plate width, and the presence of material anomalies, might require selectively generating, receiving, and processing the information contained in multiple different guided wave modes. In some embodiments, measurement reliability and/or accuracy may be improved by measuring the same parameter in more than one way such as using two different wave modes to extract the same parameter of the test object 1230. It is to be understood that the adaptive, multimode inspection system disclosed herein is not only based on the use of EMATs to generate and receive the desired types of elastic wave displacements, but that it is also applicable to the use of different or conventional means of generating and/or receiving elastic wave displacements. To elaborate, the embodiments described in FIGS. 12A-C show that the adaptive, multimode guided wave inspection system is based on using T and R EMATs 1210, 1220 to generate Lamb or Lamb-like guided waves in the test object 1230; however equivalent tests might be and have been carried out using different types of guided waves such as SH guided waves, or even guided waves that are not generated using EMATs.

Figure 14A:
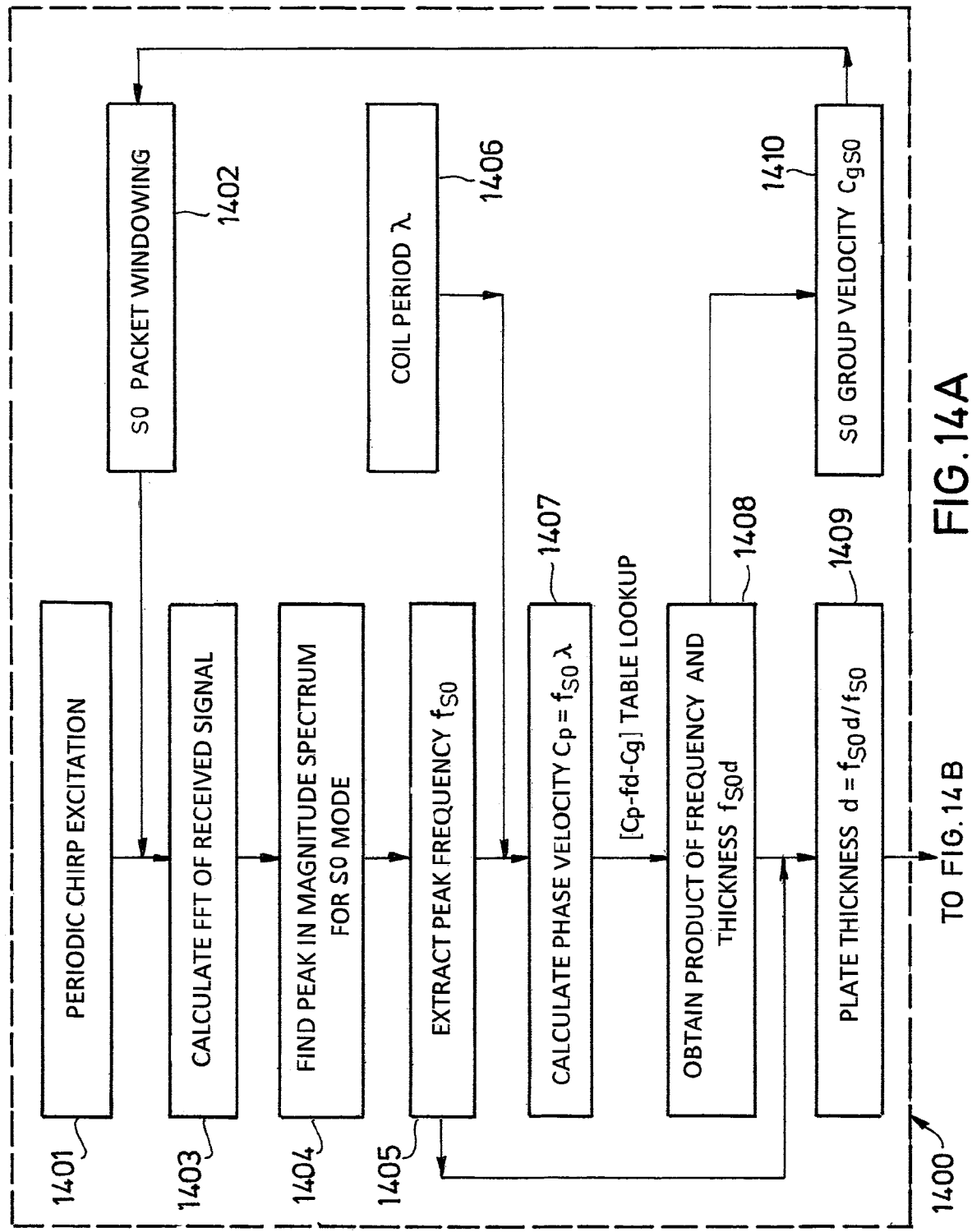
FIGS. 14A and B show flow charts of one exemplary logic sequence according to at least one embodiment of the present disclosure.
Figure 14B:
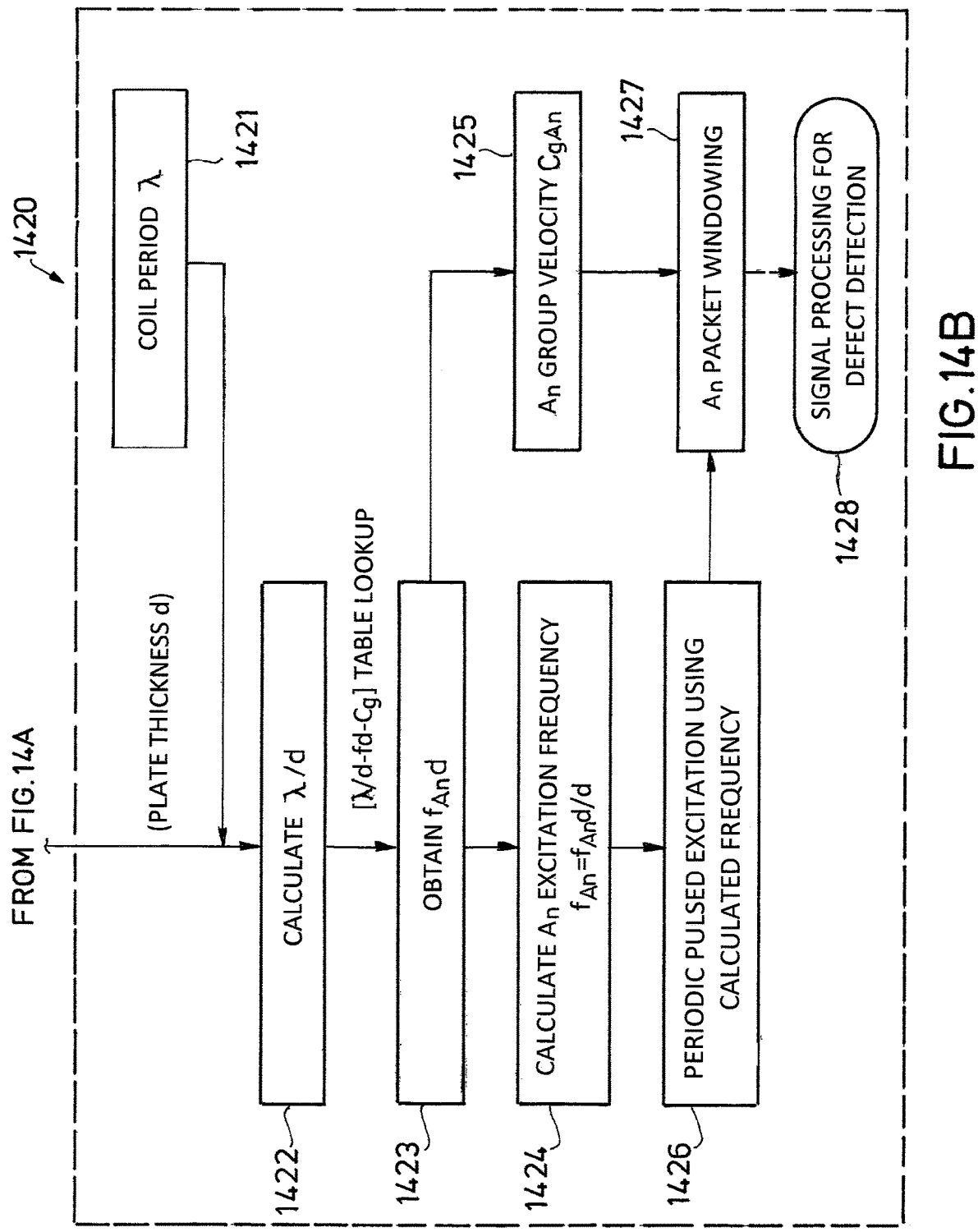
FIGS. 14C and D show flow charts of one exemplary logic sequence according to at least one embodiment of the present disclosure.
FIGS. 14E and F show flow charts of one exemplary logic sequence according to at least one embodiment of the present disclosure.
FIGS. 14G and H show flow charts of one exemplary logic sequence according to at least one embodiment of the present disclosure. The logic sequence may be used in an adaptive, multi-mode guided wave inspection system having the capability of operating at high inspection speed while simultaneously measuring several parameters of the test object.
FIG. 14J shows a schematic representation for generating guided waves according to at least one embodiment of the present disclosure.

Referring now to FIGS. 14A-B show flow charts 1400, 1420 showing one exemplary logic sequence that may be used in an adaptive, multimode guided wave inspection system having the capability of operating at high inspection speed while simultaneously measuring several parameters of the test object in multiple ways. As shown in FIG. 14A, flow chart 1400 shows a logic sequence of extracting the plate thickness using the dispersive characteristics of the S0 Lamb and Lamb-like mode. As shown in FIG. 14B, flow chart 1420 shows a logic sequence of how the logic sequence of flow chart 1400 may be continued to allow the detection of defects and subsequently displaying their presence. In some embodiments, it is provided that within a single automated sequence of measurements, the characteristics of different guided wave modes may be exploited in order to measure or monitor multiple specific features of a test object. The guided waves may exhibit Lamb or Lamb-like displacement characteristics or have displacements predominantly parallel to the test object surface and perpendicular to the direction of propagation (usually referred to as SH guided wave modes). In some embodiments, the generation and/or detection of surface waves (also sometimes referred to as Rayleigh waves) may be adequate for the desired measurements to be accomplished. Structures in which the guided waves propagate may have any geometry ranging from flat plates and pipes of arbitrary dimensions and cross-sections, to beams and even complex materials such as "honeycomb" panels.

Figure 14C:
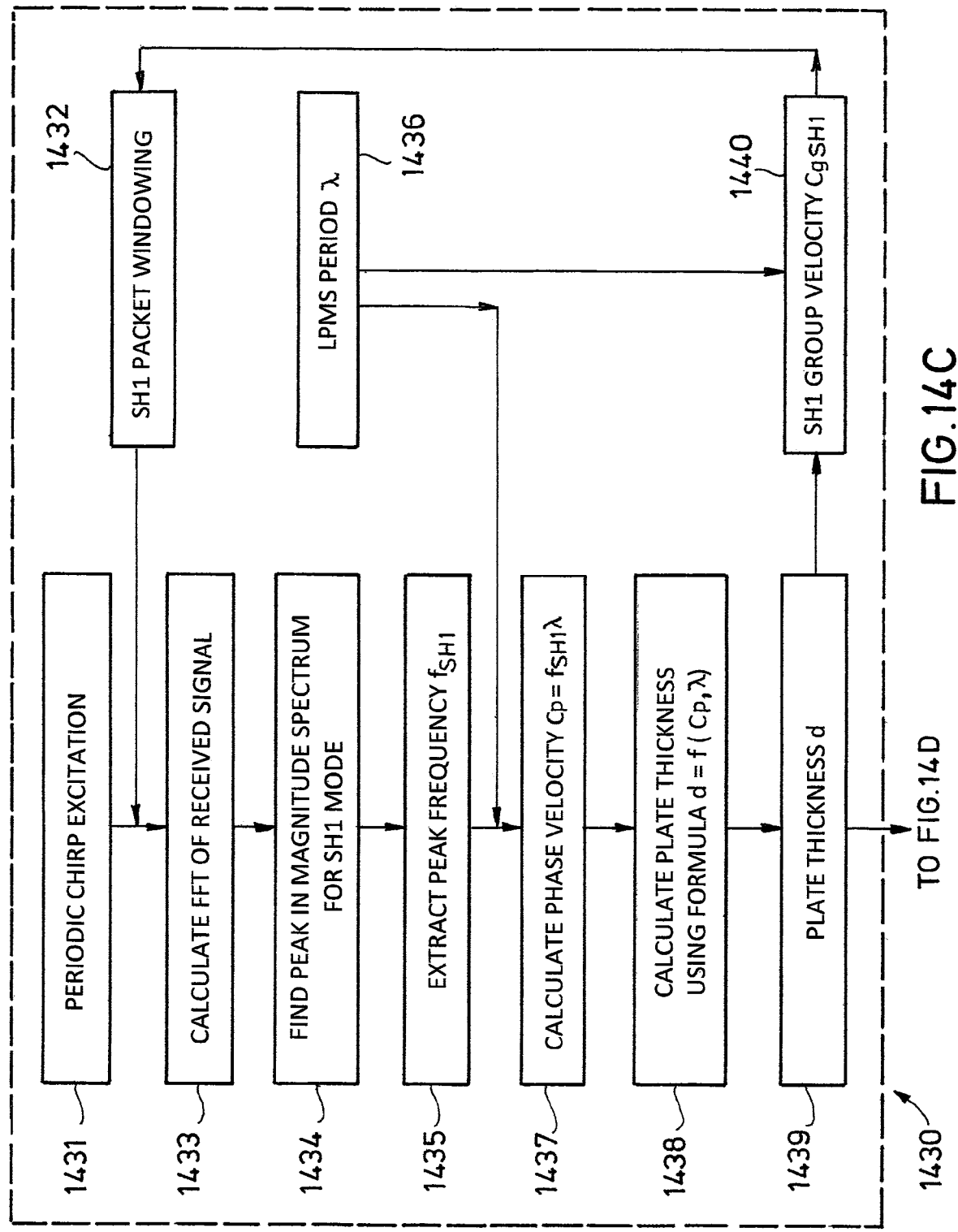
Figure 14D:
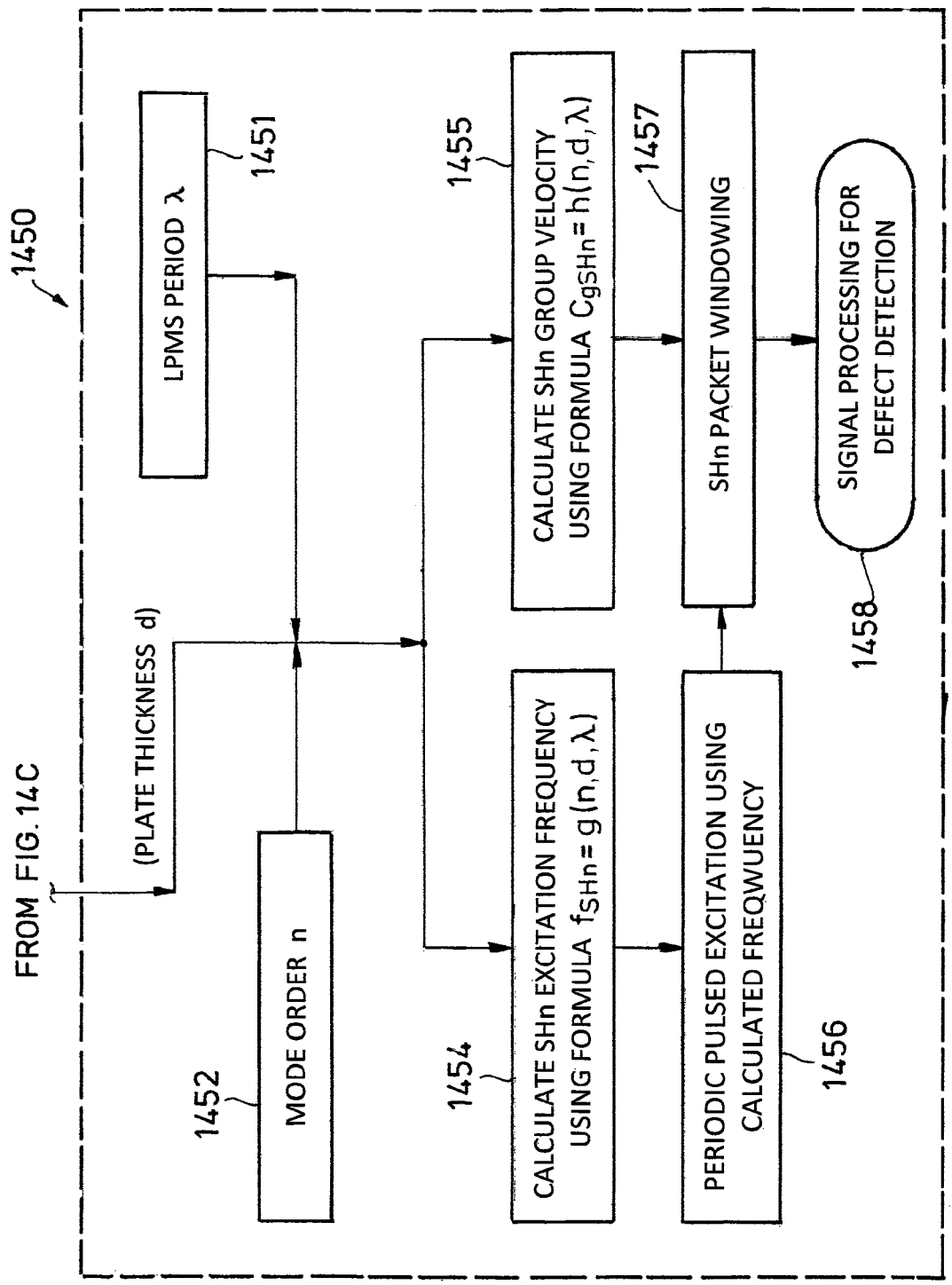

Referring now to FIGS. 14C-D show flow charts 1430, 1450 showing another exemplary logic sequence that may be used in an adaptive, multimode guided wave inspection system where there exist well-known, closed-form analytic expressions for the phase and group velocities and having the capability of operating at high inspection speed while simultaneously measuring several parameters of the test object in multiple ways. A non-limiting example of this embodiment is deploying the LPMS EMAT based elastic wave measurement system 1100 depicted in FIGS. 11A-B. As shown in FIG. 14C, flow chart 1430 shows a logic sequence of extracting the plate thickness using the dispersive characteristics of the SH1 mode. As shown in FIG. 14D, flow chart 1450 shows a logic sequence of how the logic sequence of flow chart 1430 may be continued to allow the detection of defects and subsequently displaying their presence. In some embodiments, it is provided that within a single automated sequence of measurements, the characteristics of different guided wave modes may be exploited in order to measure or monitor multiple specific features of a test object such as plate width using, for example, a surface wave, the A0 mode, or the SH0 mode. The guided waves may exhibit Lamb-like displacement characteristics or have displacements predominantly parallel to the test object surface and perpendicular to the direction of propagation (usually referred to as SH guided wave modes). The structures in which the guided waves propagate may have any geometry ranging from flat plates and pipes of arbitrary dimensions, to beams and even complex materials such as "honeycomb" panels.

Figure 14E:
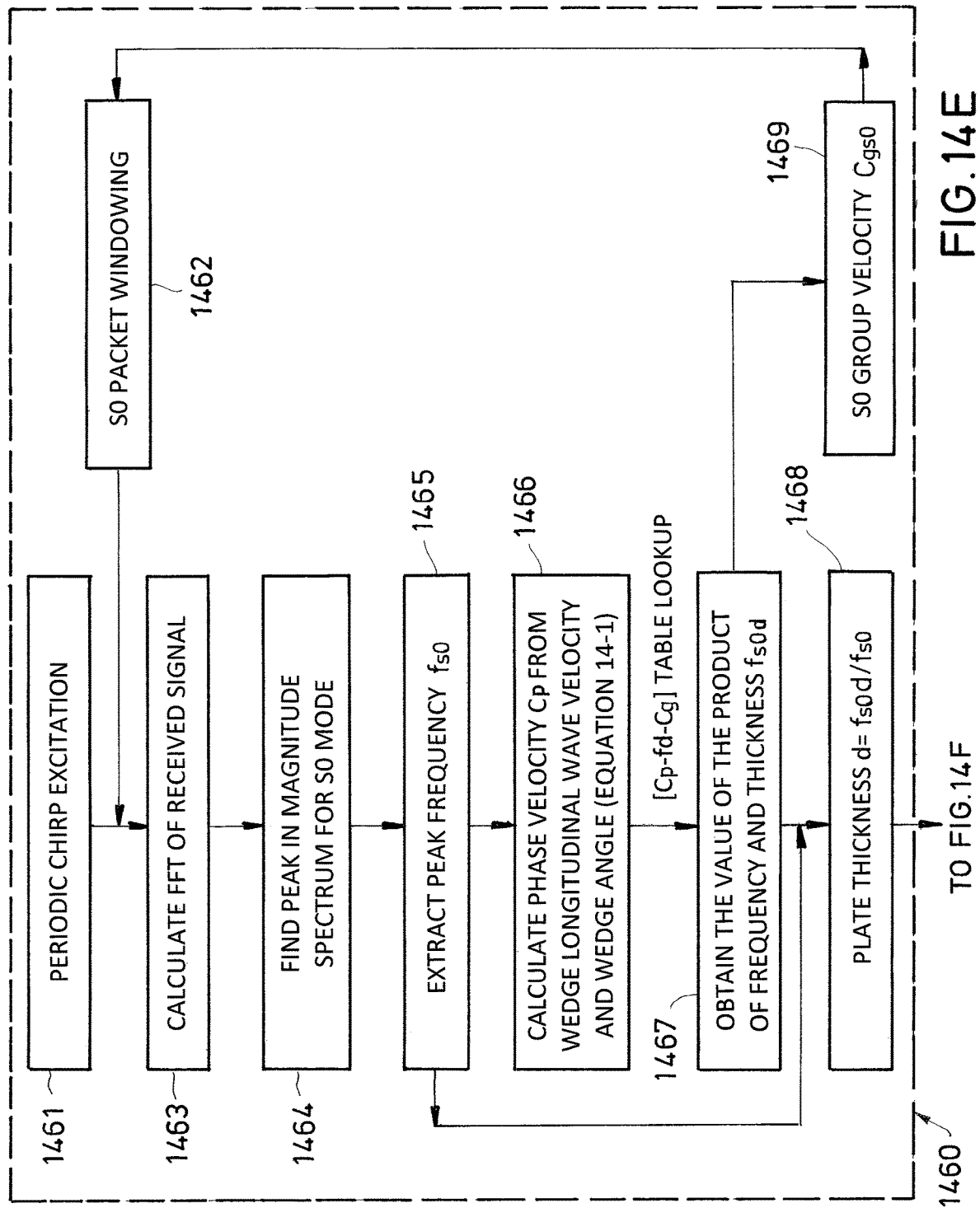
Figure 14F:
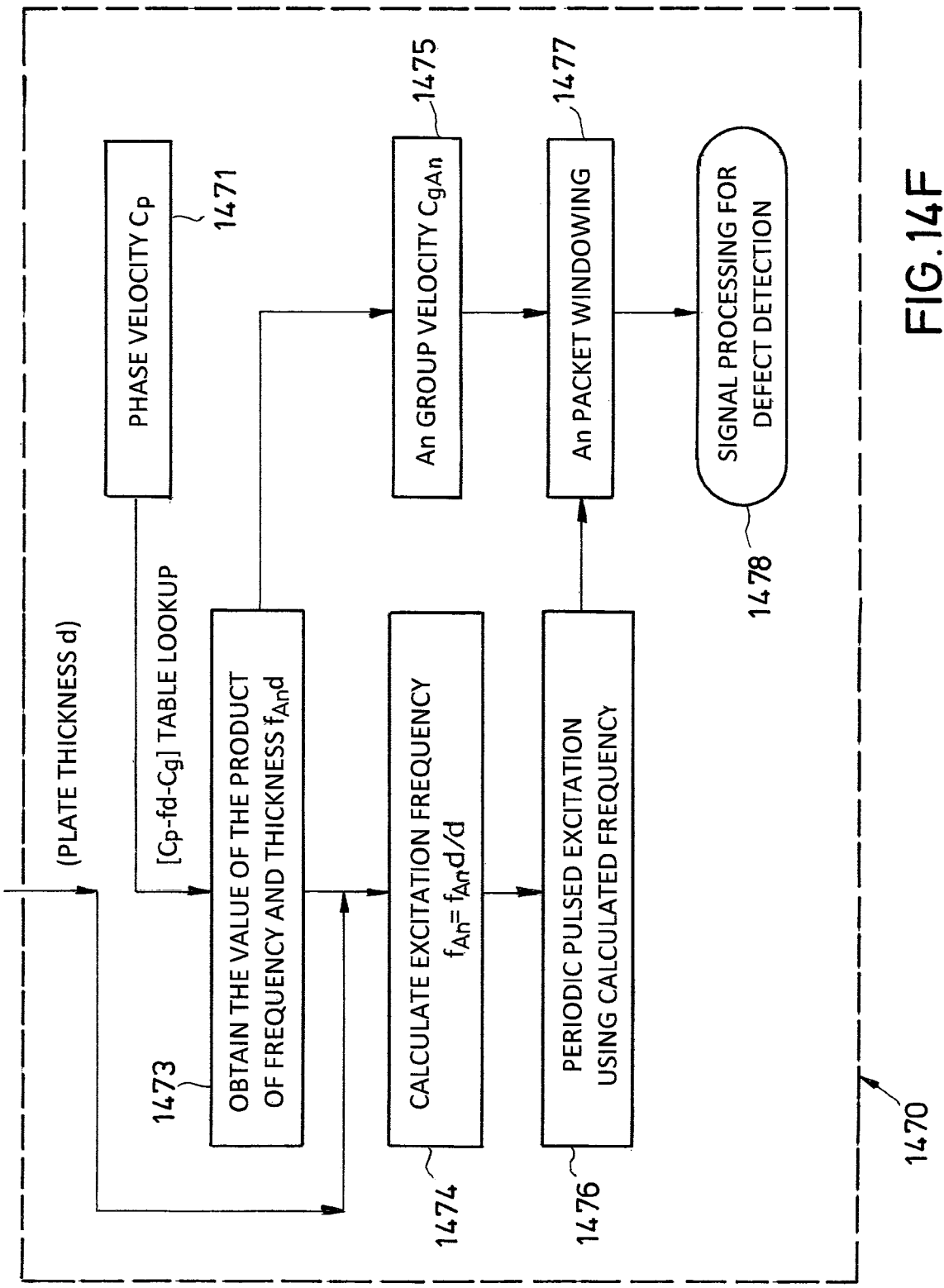

Referring now to FIGS. 14E-F show flow charts 1460, 1470 showing another exemplary logic sequence that may be used in an adaptive, multimode guided wave inspection system where a piezoelectric transducer on a wedge (as shown for example in FIG. 14J) is used to generate Lamb or Lamb-like waves and having the capability of operating at high inspection speed while simultaneously measuring several parameters of the test object in multiple ways. As shown in FIG. 14E, flow chart 1460 shows a logic sequence of extracting the plate thickness using the dispersive characteristics of the S0 Lamb and Lamb-like mode. As shown in FIG. 14F, flow chart 1470 shows a logic sequence of how the logic sequence of flow chart 1460 may be continued to allow the detection of defects and subsequently displaying their presence. In some embodiments, it is provided that within a single automated sequence of measurements, the characteristics of different guided wave modes may be exploited in order to measure or monitor multiple specific features of a test object. The guided waves may exhibit Lamb or Lamb-like displacement characteristics or have displacements predominantly parallel to the test object surface and perpendicular to the direction of propagation (usually referred to as SH guided wave modes). In some embodiments, the generation and/or detection of surface waves (also sometimes referred to as Rayleigh waves) may be adequate for the desired measurements to be accomplished. Structures in which the guided waves propagate may have any geometry ranging from flat plates and pipes of arbitrary dimensions and cross-sections, to beams and even complex materials such as "honeycomb" panels.

Figure 14G:
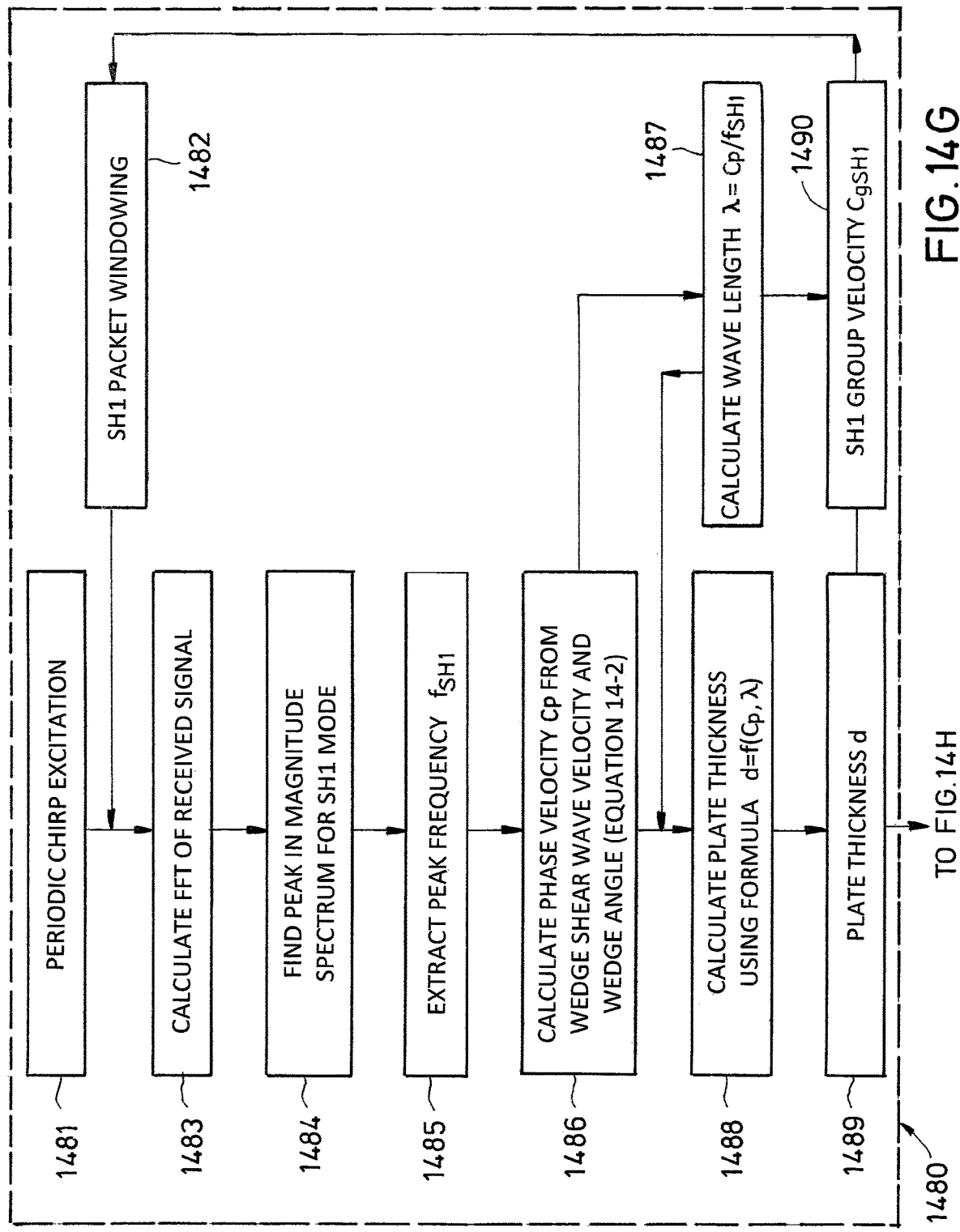
Figure 14H:
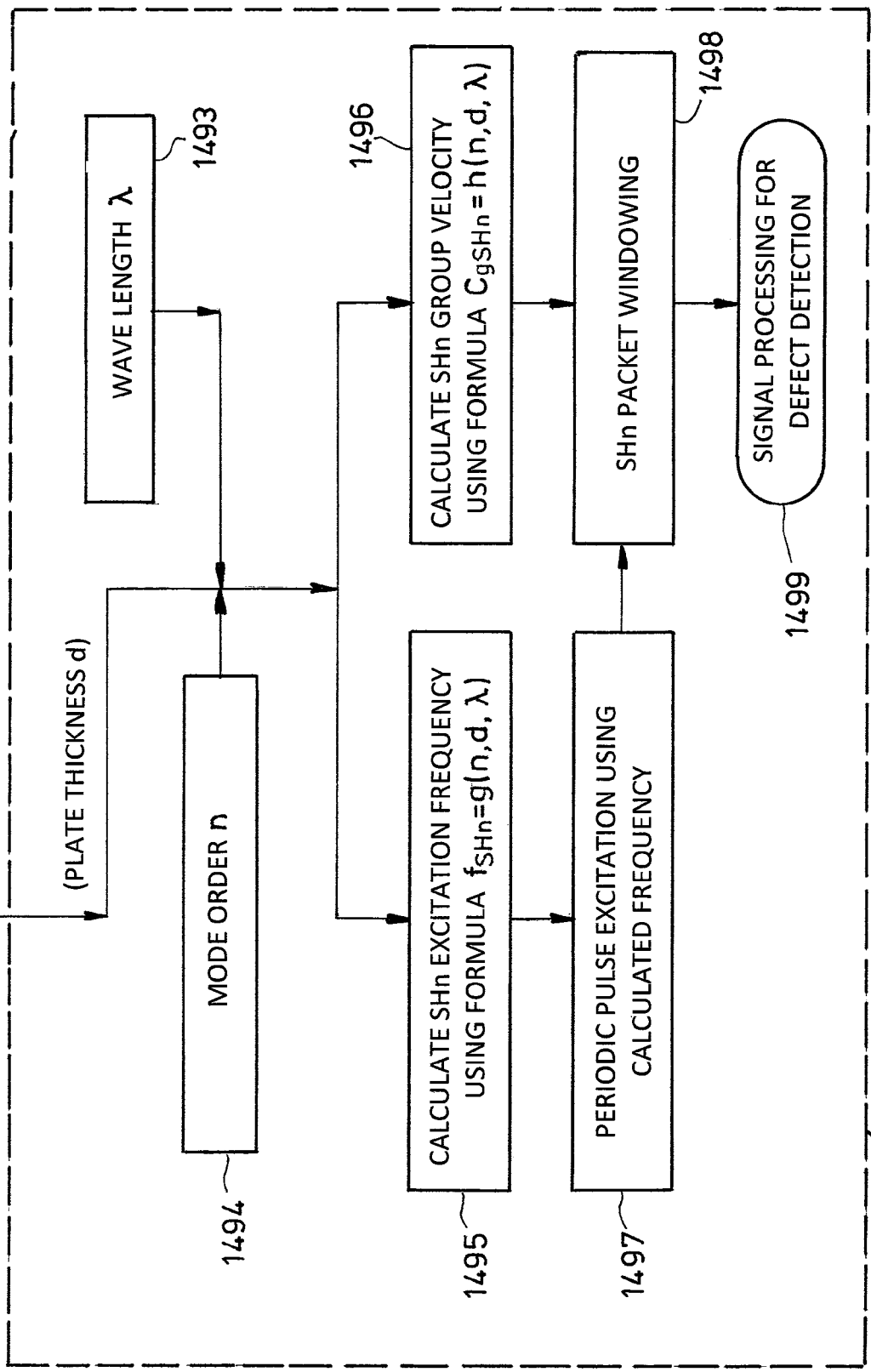

Referring now to FIGS. 14G-H show flow charts 1480, 1492 showing another exemplary logic sequence that may be used in an adaptive, multimode guided wave inspection system where a piezoelectric transducer on a wedge (as shown for example in FIG. 14J) is used to generate guided SH waves and where there exist well-known, closed-form analytic expressions for the phase and group velocities and having the capability of operating at high inspection speed while simultaneously measuring several parameters of the test object in multiple ways. A non-limiting example of this embodiment is deploying the LPMS EMAT based elastic wave measurement system 1100 depicted in FIGS. 11A-B. As shown in FIG. 14G, flow chart 1480 shows a logic sequence of extracting the plate thickness using the dispersive characteristics of the SH1 mode. As shown in FIG. 14H, flow chart 1492 shows a logic sequence of how the logic sequence of flow chart 1480 may be continued to allow the detection of defects and subsequently displaying their presence. In some embodiments, it is provided that within a single automated sequence of measurements, the characteristics of different guided wave modes may be exploited in order to measure or monitor multiple specific features of a test object such as plate width using, for example, a surface wave, the A0 mode, or the SH0 mode. The guided waves may exhibit Lamb-like displacement characteristics or have displacements predominantly parallel to the test object surface and perpendicular to the direction of propagation (usually referred to as SH guided wave modes). The structures in which the guided waves propagate may have any geometry ranging from flat plates and pipes of arbitrary dimensions, to beams and even complex materials such as "honeycomb" panels.

Lamb and Lamb-like waves are elastic perturbations propagating in a magnetic or non-magnetic test object such as a pipe, plate or other generally laminar structure with traction-free or other boundaries, for which some of the displacement components occur in a plane containing the normal of the test object (the plate) surface and the direction of wave propagation. One characteristic of Lamb and Lamb-like waves is that their velocity depends not only on the material elastic properties and other physical properties, but also on the thickness of the material, the guided wave frequency, and physical properties of materials attached or bonded to one or both surfaces. The dependence of phase and group velocities on material thickness and frequency is fundamental to the understanding of Lamb and Lamb-like wave utilization in NDT/NDE and may be represented by the phase and group velocity dispersion curves, as shown for example in FIGS. 15A and B, where phase and group velocity dispersion curves are shown for an uncoated plate (solid lines) and an uncoated 14-inch diameter pipe (dashed lines), both made of mild steel, where neither surfaces are in contact with a physical medium and each test object having a wall thickness of 11.1 mm. Lamb-like and other wave modes may be generated and propagated in structures that do not have a traction-free surface; these wave modes have different, sometimes dramatically different, phase and group velocity curves when compared to those for traction-free surfaces. Phase and group velocity curves differing in several details also exist for SH guided wave modes and these curves may be used for similar purposes to the Lamb wave dispersion curves.

Figure 15A:
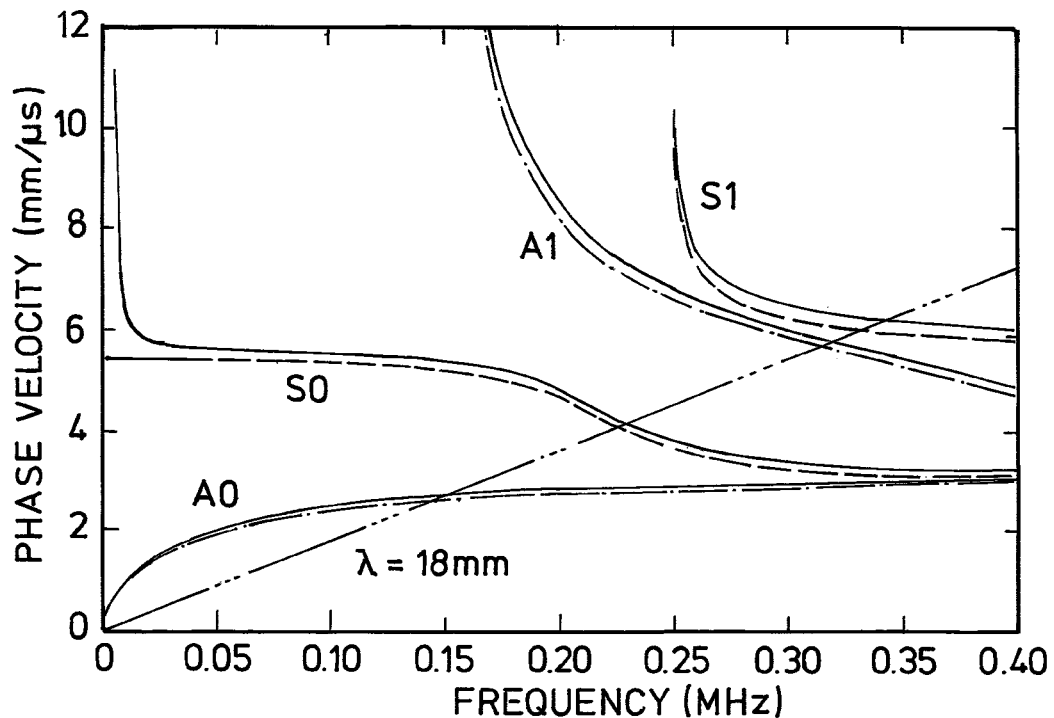
FIGS. 15A and B show examples of phase and group velocity dispersion curves for Lamb and Lamb-like waves according to at least one embodiment of the present disclosure. The dispersion curves are shown for a plate (solid lines) and a 14-inch diameter pipe (dashed lines), both made of mild steel and having a thickness of 11.1 mm.
Figure 15B:
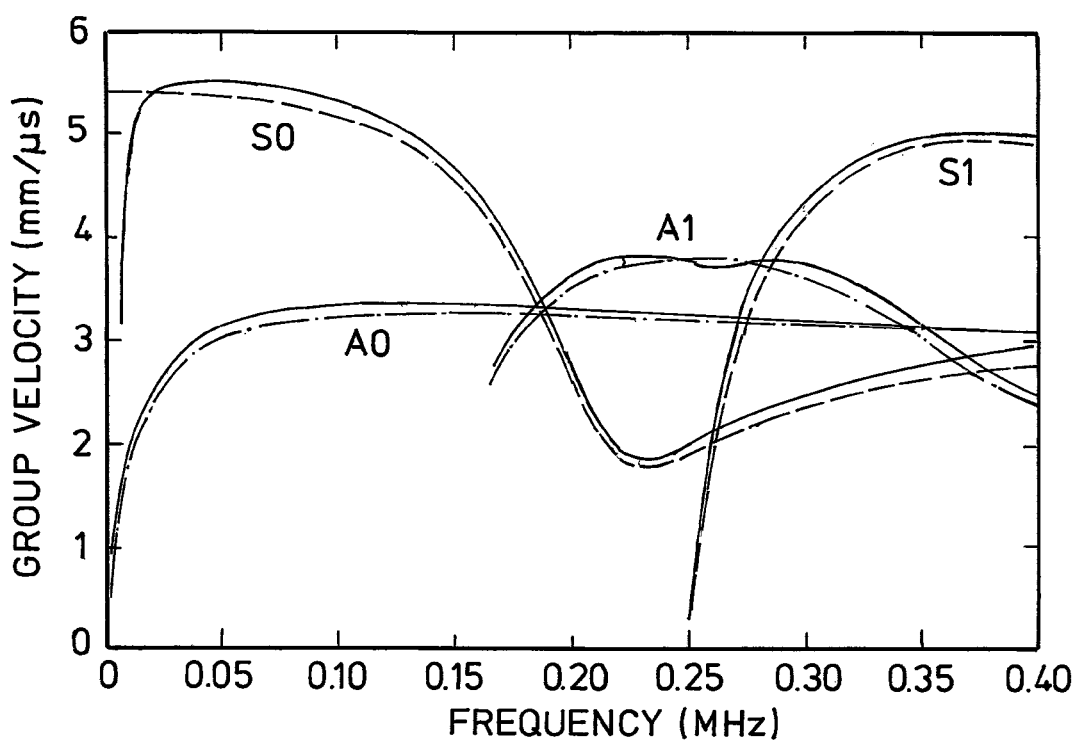

Referring to FIG. 15A, phase velocity dispersion curves for traction-free surfaces can be computed numerically from the Rayleigh-Lamb frequency relations that result from Navier's equation governing the wave propagation and the traction-free boundary conditions. According to the symmetry of their displacement profile with respect to the midplane of the plate, the modes or curves are labeled as S0, S1, S2 ... and A0, A1, A2 ..., where S stands for symmetric modes and A stands for antisymmetric modes. The wavelength, $\lambda$, is 18 mm. Referring to FIG. 15B, group velocity dispersion curves can be derived from phase velocity dispersion curves. Group velocity gives the traveling speed of a wave packet that is composed of a group of waves at approximately the same frequency. In some embodiments, dispersion curves for other guided wave modes may be calculated. In some cases, dispersion curves must be calculated numerically. In other embodiments, such as dispersion curves of SH guided wave propagation in a plate with traction-free, unloaded surfaces, closed form analytic solutions exist.

According to at least one embodiment, the plate is homogeneous and isotropic. Material constants (e.g., Young's modulus, Poisson's Ratio, and material density) are used to compute the phase velocity, $C_p$, as a function of the frequency (f)—thickness (d) product, f·d (hereinafter referred to as fd). The group velocity, $C_g$, is then derived from the phase velocity dispersion curves, also as a function of the frequency-thickness product fd.

Referring back to FIGS. 14A-B, the adaptive, multimode guided wave inspection system relates to real-time determination of the plate thickness, shown for example in flow chart 1400. For example, for Lamb waves generated by a MC EMAT, the wavelength, $\lambda$, of the Lamb waves is determined by the geometrical period of the Lorentz forces generated by the conductor arrangement in the T EMAT conductor set, e.g., twice the spacing between MC conductors. Substantially ignoring the bandwidth of the MC in the wavenumber domain due to finite number of wavelengths in the MC, possible operating points of an MC EMAT when generating Lamb waves can be represented by an excitation line in the phase velocity dispersion curve plot (such as shown in FIG. 15A) that passes through the origin and has a slope equal to the wavelength, λ. When a chirp (a continuous frequency sweep) current signal (as a single tone-burst) is sent through the transmitter subsystem (such as the T EMAT conductor set), there may be local peak or peaks in the magnitude spectrum of receiver subsystem (such as the R EMAT) output at frequencies where the excitation line intersects the phase velocity dispersion curves. As used herein, these frequencies are referred to as peak frequencies. Because the phase velocity, $C_p$, is a function of frequency-thickness product, fd, the curves of $C_p(f)$ may shift to the right or left with respect to the frequency axis as the plate thickness decreases or increases, respectively, suggesting that the plate thickness can be extracted from the shift of the phase velocity curves $C_p(f)$ with respect to the frequency axis.

In some embodiments, the excitation frequency can be changed in discrete steps instead of a swept frequency within a tone-burst. Stepped frequencies can be used in a series of sequential tone-bursts. This way, more power can go into each frequency and can be used when the SNR is low or marginal.

Referring to FIGS. 14A and 15A-B, the fundamental symmetric mode S0 is capable of measuring the plate thickness using the above-mentioned peak frequency because a portion of the S0 phase velocity dispersion curve $C_{pS0}(f)$ is dispersive, i.e., has a significant dependence on frequency. The wavelength λ is selected such that the excitation line of the T EMAT conductor set intersects this dispersive portion of the $C_{pS0}(f)$ curve for a desired range of plate thicknesses. When the plate thickness changes and causes the $C_{pS0}(f)$ curve to shift, the intersection point between the $C_{pS0}(f)$ curve and the excitation line may exhibit a good sensitivity to thickness changes, manifesting itself as different peak frequencies. The procedure for measuring the plate thickness using the S0 mode and the peak frequency method is described in FIG. 14A. In some embodiments, the plate thickness measured this way is not a local thickness at any particular spot on the plate but an average thickness of the plate over the propagation path of the Lamb wave (which, for example, may be the plate width or the distance between two R EMATs). The group velocity of the S0 mode, $C_{gS0}$, as one of the outputs of the $[C_p$-fd-$C_g]$ table lookup, is fed back in combination with the plate width (an approximation of which nominal value may be assumed known) to calculate the arrival time of an S0 packet, e.g., after a round-trip, and improve the windowing accuracy prior to the Fast Fourier Transform (FFT) operation for finding the peak frequency. The $[C_p$-fd-$C_g]$ look-up table is composed of sets of $[C_p$-fd-$C_g]$ triplets that are created from the phase and group velocity dispersion curves of the S0 mode (as mentioned above, determined from numerical solutions of the Navier's equation).

As shown in FIG. 14A, the embodiment of flow chart 1400 describes plate thickness measurement using the S0 mode and determining the peak frequency thereof In block 1401, a chirp (frequency sweep) excitation signal is transmitted through the T EMAT conductor set on a periodic basis. In block 1403, the R EMAT conductor set receives the chirp signal in block 1401 that traveled on or through the test object. The R EMAT conductor set also receives a superimposed S0 packet used for windowing in block 1402. Relevant instrumentation, such as the Data Analysis and Pre-processing 1380 system shown in FIG. 13, utilizes Fourier Transform or Fast Fourier Transform to convert the R EMAT output signal to the frequency domain. In block 1404, the magnitude spectrum of the R EMAT output for the S0 mode is obtained. A local peak or peaks may exist in the magnitude spectrum at frequencies where the excitation line intersects the phase velocity dispersion curves. In block 1405, the peak frequency corresponding to the S0 mode, $f_{S0}$, is extracted, which, in some embodiments, is the peak frequency having the greatest amplitude in the frequency domain. In block 1406, wavelength λ is selected which corresponds to the coil period of the T EMAT conductor set. The wavelength λ is selected such that the excitation line of the T EMAT conductor set intersects this portion of the $C_{pS0}(f)$ curve for a desired range of plate thicknesses. In block 1407, phase velocity $C_p$ is obtained which is the product of the peak frequency $f_{S0}$ obtained in block 1405 and the wavelength λ obtained in block 1406. In block 1408, the frequency-thickness product of the S0 mode, $f_{S0}d$, is obtained by searching the $[C_p$-fd-$C_g]$ look-up table. The $[C_p$-fd-$C_g]$ look-up table is composed of sets of $[C_p$-fd-$C_g]$ triplets that are created from the phase and group velocity dispersion curves of the S0 mode shown for example in FIGS. 15A and B, respectively. In block 1409, the plate thickness d is obtained by dividing the S0 mode frequency-thickness product $f_{S0}d$ obtained in block 1408 by the S0 mode peak frequency $f_{S0}$ obtained in block 1405. In block 1410, the group velocity of the S0 mode, $C_{gS0}$, is obtained by searching the $[C_p$-fd-$C_g]$ look-up table. In block 1402, the group velocity of the S0 mode, $C_{gS0}$, as one of the outputs of the $[C_p$-fd-$C_g]$ look-up table obtained in block 1410, is fed back in combination with the plate width (an approximation of which nominal value may be assumed known) to calculate the arrival time of an S0 packet, e.g., after a round-trip, and improve the windowing accuracy prior to the Fast Fourier Transform (FFT) operation for finding the peak frequency in blocks 1403 and 1404.

Referring to FIGS. 14B and 15A-B, the adaptive, multi-mode guided wave inspection system relates to the self-adjusted generation of a particular Lamb or Lamb-like mode based on the real-time measured plate thickness for the purpose of defect detection, for example by using the output extracted from flow chart 1400 of FIG. 14A. The procedure is described in flow chart 1420 of FIG. 14B and is centered on a [λ/d-fd-$C_g$] look-up table composed of sets of [λ/d-fd-$C_g$] triplets that are created from the phase and group velocity dispersion curves of the $A_1$ mode. Similar to the case of S0 packet windowing, the group velocity of the $A_1$ mode, $C_{gA1}$, as one of the outputs of the [λ/d-fd-$C_g$] look-up table, is used in combination with the plate width to calculate the arrival time of an $A_1$ packet, e.g., after a round-trip, and improve the windowing accuracy prior to computing the signal power of the windowed $A_1$ packet for defect detection. Similar related approaches may be used for defect detection using other modes that propagate in the test object.

As shown in FIG. 14B, the embodiment of flow chart 1420 describes an $A_1$ mode generation for defect detection. In block 1421, as in block 1406, wavelength λ is selected which corresponds to the coil period of the T EMAT conductor set. The wavelength λ is selected such that the excitation line of the T EMAT conductor set intersects this portion of the $C_{pS0}(f)$ curve for a desired range of plate thicknesses. In block 1422 value λ/d is obtained by dividing the wavelength λ obtained in block 1421 by the plate thickness d obtained in block 1409 of flow chart 1400. In block 1423, the frequency-thickness product of the $A_n$ mode, $f_{An}d$, is obtained by searching the [λ/d-fd-$C_g$] look-up table. The [λ/d-fd-$C_g$] look-up table is composed of sets of [λ/d-fd-$C_g$] triplets that are created from the phase and group velocity dispersion curves of the $A_n$ mode, shown for example in FIGS. 15A and B, respectively. In block 1424, the $A_n$ excitation frequency, fan, is obtained by dividing the frequency-thickness product of the $A_n$ mode $f_{An}d$ obtained in block 1423 by the plate thickness d obtained in block 1409 of flow chart 1400. In block 1425, the group velocity of the $A_n$ mode, $C_{gAn}$, is obtained by searching the [a/d-fd-$C_g$] look-up table. In block 1426, an excitation signal, having an $A_n$ excitation frequency $f_{An}$ obtained in block 1424, is transmitted through the T EMAT conductor set on a periodic basis. In block 1427, the group velocity of the $A_1$ mode, $C_{gAn}$, as one of the outputs of the [λ/d-fd-$C_g$] look-up table obtained in block 1425, is used in combination with the plate width to calculate the arrival time of an $A_1$ packet, e.g., after a round-trip, and improve the windowing accuracy prior to block 1428, where the signal power of the windowed $A_1$ packet is computed for defect detection. Other signal processing approaches such as phase shift computation through cross correlation of two packets or of the current value of a single packet with its previous value in time or other approaches know in the art may be used as a metric or metrics for defect detection. Similar related approaches may be used for defect detection using other, higher order, modes that propagate in the test object.

According to at least one embodiment, median-removal signal processing is employed to minimize the effect of a slowly varying signal baseline. The slowly varying signal baseline may, for example, be introduced by changes in wave mode reflection amplitude due to slowly varying non-flat plate edges giving rise to a change in the wave mode reflection coefficient at the plate edge. In other embodiments, median-removal signal processing is employed to retain local variations in the signal amplitude due to defects. The resulting signal may then be emphasized by applying a mathematical operator, such as squaring the signal values, to improve the contrast before the signal is compared with an alarm threshold.

Referring back to FIGS. 11A-B, an LPMS EMAT-based elastic wave measurement system 1100 used in conjunction with the adaptive, multimode guided wave inspection system is configured to generate or receive guided elastic waves such as SH guided waves. SH guided waves have distinct displacement profiles and dispersion curves when compared with Lamb and Lamb-like guided waves. SH guided waves have not been widely used for NDT/NDE inspection systems, due to the relative difficulty in generating and detecting those waves, especially in systems where the test object moves with respect to the transducer assembly (such as EMAT system 1200 shown in FIGS. 12A-C) and especially in systems where magnetic test objects are used.

According to at least one embodiment, SH guided waves are generated by an excitation force parallel to the surface at which these guided waves are generated and perpendicular to their propagation direction. Conventionally, piezoelectric elastic wave generators were used to generate SH guided waves when a relatively high viscosity coupling medium is used between the piezoelectric generator and the test object surface. In some embodiments, MS or LF EMATs are used to generate and receive SH guided waves. In addition, analogous to the disclosure with respect to Lamb waves, the SH0 mode in plates is non-dispersive so the mode group and phase velocity can be calculated precisely based only upon the known or readily determinable elastic constants for the material. Additionally, the SH0 mode in pipes generally exhibits a relatively large range of diameter and wall thickness where the SH0 mode is essentially non-dispersive. The SH1 and higher modes are dispersive and may be used for thickness determination.

According to at least one embodiment, SH waves and SH guided waves provide a clearer, often less ambiguous rendering of internal features (material anomalies) such as cracks and pits independent of whether the object being evaluated is magnetic or not. This increased clarity in measurements using SH waves (whether bulk waves or guided waves) relates to the existence of fewer extraneous modes of SH and other waves being reflected from surfaces or scattered by material anomalies, when compared to the reflection and/or scattering of Lamb and/or Lamb-like guided waves or other wave modes having either SV or longitudinal displacements.

Referring now to FIG. 14C, the embodiment of flow chart 1430 describes plate thickness measurement using the SH1 mode and determining the peak frequency thereof. In some embodiments, LPMS EMAT based elastic wave measurement system 1100 depicted in FIGS. 11A-B can be implemented. In block 1431, a chirp (frequency sweep) excitation signal is transmitted through the LPMS-based T EMAT conductor set on a periodic basis. In block 1433, the LPMS-based R EMAT conductor set receives the chirp signal in block 1431 that traveled on or through the test object. The LPMS-based R EMAT conductor set also receives a superimposed SH1 packet used for windowing in block 1432 Relevant instrumentation, such as the Data Analysis and Pre-processing 1380 system shown in FIG. 13, utilizes Fourier Transform or Fast Fourier Transform to convert the LPMS-based R EMAT output signal to the frequency domain. In block 1434, the magnitude spectrum of the LPMS-based R EMAT output for the SH1 mode is obtained. A local peak or peaks may exist in the magnitude spectrum at frequencies where the excitation line intersects the phase velocity dispersion curves. In block 1435, the peak frequency corresponding to the SH1 mode, $f_{SH1}$, is extracted, which, in some embodiments, is the peak frequency having the greatest amplitude in the frequency domain. In block 1436, wavelength λ is selected which corresponds to the LPMS period of the T EMAT magnet structure. The wavelength λ is selected such that the excitation line of the LPMS magnet structure of the T EMAT intersects this portion of the $C_{pSH1}(f)$ curve for a desired range of plate thicknesses. In block 1437, phase velocity $C_p$ is obtained which is the product of the peak frequency $f_{SH1}$ obtained in block 1435 and the wavelength λ obtained in block 1436. In blocks 1438 and 1439, the plate thickness d is a function of phase velocity $C_p$ and wavelength λ. Therefore the plate thickness d can be derived by using the values of the phase velocity $C_p$ obtained in block 1437 and the wavelength λ obtained in block 1436. In block 1440, the group velocity of the SH1 mode, $C_{gSH1}$, is obtained by using the plate thickness d obtained in block 1439 and the wavelength λ obtained in block 1436. In block 1432, the group velocity of the SH1 mode, $C_{gSH1}$, obtained in block 1440, is fed back in combination with the plate width (an approximation of which nominal value may be assumed known) to calculate the arrival time of an SH1 packet, e.g., after a round-trip, and improve the windowing accuracy prior to the Fast Fourier Transform (FFT) operation for finding the peak frequency in blocks 1433 and 1434.

Referring to FIG. 14D, the embodiment of flow chart 1450 describes an $SH_n$ mode generation for defect detection.

In some embodiments, LPMS EMAT based elastic wave measurement system 1100 depicted in FIGS. 11A-B can be implemented. In block 1451, as in block 1436, wavelength λ is selected which corresponds to the LPMS period of the T EMAT magnet structure. The wavelength λ is selected such that the excitation line of the LPMS magnet structure of the T EMAT intersects this portion of the $C_{pSHn}(f)$ curve for a desired range of plate thicknesses. In block 1452, the mode order n of the $SH_n$ mode is selected. In block 1454, the $SH_n$ excitation frequency, $f_{SHn}$, is a function of the mode order n, the plate thickness d, and the wavelength λ. Therefore, the $SH_n$ excitation frequency, $f_{SHn}$, can be derived by using the values of the mode order n obtained in block 1452, the plate thickness d obtained in block 1439 of flow chart 1430, and the wavelength λ obtained in block 1451. In block 1455, the group velocity of the $SH_n$ mode, $C_{gSHn}$, is a function of the mode order n, the plate thickness d, and the wavelength λ. The group velocity of the $SH_n$ mode, $C_{gSHn}$, can be derived by using the values of the mode order n obtained in block 1452, the plate thickness d obtained in block 1439 of flow chart 1430, and the wavelength λ obtained in block 1451. In block 1456, an excitation signal, having an $SH_n$ excitation frequency $f_{SHn}$ obtained in block 1454, is transmitted through the LPMS-based T EMAT conductor set on a periodic basis. In block 1457, the group velocity of the $SH_n$ mode, $C_{gSHn}$, obtained in block 1455, is used in combination with the plate width to calculate the arrival time of an $SH_n$ packet, e.g., after a round-trip, and improve the windowing accuracy prior to block 1458, where the signal power of the windowed $SH_n$ packet is computed for defect detection. Other signal processing approaches such as phase shift computation through cross correlation of two packets or of the current value of a single packet with its previous value in time or other approaches know in the art may be used as a metric or metrics for defect detection.

As shown in FIGS. 14A-B, an MC EMAT can be used for generating Lamb and Lamb-like waves, making it necessary to choose an optimal wavelength as a defined parameter of the measurement system, which enters into the algorithm as an input. As shown in FIGS. 14C-D, an LPMS EMAT can be used for generating guided SH waves, making it necessary to choose an optimal wavelength as a defined parameter of the measurement system, which enters into the algorithm as an input. These examples show efficient excitation of a particular guided wave mode when the transducer period, i.e., the coil period for the MC EMAT or the magnet period for the LPMS SH EMAT, is equal to the mode wavelength. In these examples, the transducer period is one of the design parameters of the transducer and is normally fixed unless made changeable by design for other reasons. When the bandwidth of the wavelength, due to a finite number of periods in a transducer, is ignored, a fixed transducer period can be represented by a line in the phase velocity versus frequency plot, passing through the origin and having a slope equivalent to the period/wavelength, as shown for example in FIG. 15A. This line refers to the excitation line of the EMAT.

However, when using piezoelectric means to generate guided waves or Lamb and Lamb-like waves, one does not define the wavelength. The wedge angle defines the matching to the phase velocity. As a result, the excitation line is represented by a constant phase velocity line in the phase velocity dispersion plot, instead of having a constant wavelength λ for the case of MC EMATs, as shown for example in FIG. 15A. The peak frequencies now correspond to the intersection points between the constant phase velocity line and individual phase velocity dispersion curves. Thus a different procedure may follow, as shown for example in FIGS. 14E-H.

Figure 14J:
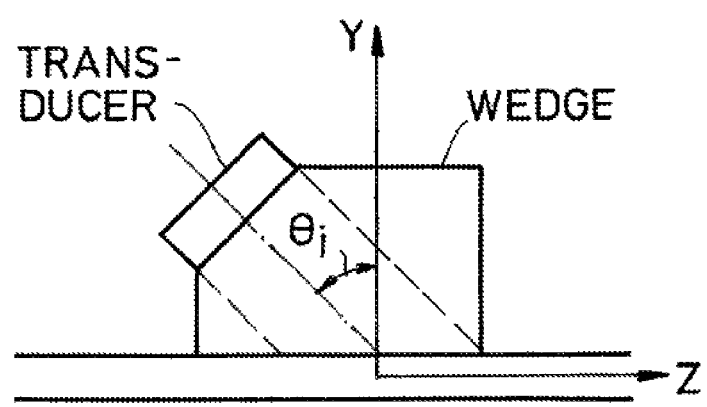

As shown in FIG. 14J, for wedge generated guided waves such as Lamb, Rayleigh, and guided SH waves shown for example in FIGS. 14E-H, a wavelength is much lesser than the size of the loaded region (i.e., the projected area of the piezoelectric transducer on the wedge-test object interface as shown for example in FIG. 14J). Let $k_w$ be the wave number in the wedge and k be the wave number of the plate mode. Snell's law provides that $\theta_i = \sin^{-1}(k/k_w)$. For Lamb and Rayleigh waves, k is equivalent to $k_{Lamb}$ (wave number of the Lamb mode or $k_{Ray}$ (wave number of the Rayleigh wave), where $k_w$ is equivalent to $2\pi/\lambda_w$, $\lambda_w$ is equivalent to $V_{Longwedge}/f$, and $V_{Longwedge}$ is equivalent to the longitudinal wave velocity in the wedge. For Lamb and Rayleigh waves, the matched phase velocity of the mode is:

$$C_p = V_{LongWedge}/\sin \theta_i \qquad \text{(Equation 14-1)}$$

For SH waves, k is equivalent to $k_{SH}$, where $k_w$ is equivalent to $2\pi/\lambda_m$, $\lambda_w$ is equivalent to $v_{ShearWedge}/f$, and $v_{ShearWedge}$ is equivalent to the shear wave velocity in the wedge. In some embodiments, the shear wave velocity is about 1.4 mm/μs. For SH waves, the matched phase velocity of the mode is:

$$C_{pSH} = v_{ShearWedge}/\sin \theta_i \qquad \text{(Equation 14-2)}$$

It should be noted that $\lambda_{SH} < k_w$ or $v_{ShearWedge} < C_{pSH}$. Under these conditions, Equations (14-1) and (14-2) can adequately describe the phase matching between the incident wave field and the guided wave mode generated in the test object and the bandwidth in wavenumber will be small. Thus, the corresponding bandwidth in phase velocity will also be small, making it acceptable to represent the wedge generation of guided waves using a constant phase velocity line in the phase velocity versus frequency plot. This line refers to the excitation line of the transducer-wedge combination.

Referring now to FIG. 14E, the embodiment of flow chart 1460 describes plate thickness measurement using the S0 mode and determining the peak frequency thereof In block 1461, a chirp (frequency sweep) excitation signal is transmitted through the piezoelectric transducer on a periodic basis. In block 1463, the R EMAT conductor set receives the chirp signal in block 1461 that traveled on or through the test object. The R EMAT conductor set also receives a superimposed S0 packet used for windowing in block 1462. Relevant instrumentation, such as the Data Analysis and Pre-processing 1380 system shown in FIG. 13, utilizes Fourier Transform or Fast Fourier Transform to convert the R EMAT output signal to the frequency domain. In block 1464, the magnitude spectrum of the R EMAT output for the S0 mode is obtained. A local peak or peaks may exist in the magnitude spectrum at frequencies where the constant phase velocity line intersects individual phase velocity dispersion curves. In block 1465, the peak frequency corresponding to the S0 mode, $f_{S0}$, is extracted, which, in some embodiments, is the peak frequency having the greatest amplitude in the frequency domain. In block 1466, phase velocity $C_p$ is obtained by the longitudinal wave velocity in the wedge material and the wedge angle, as shown in Equation 14-1. In block 1467, the frequency-thickness product of the S0 mode, $f_{S0}d$, is obtained by searching the $[C_p\text{-fd-}C_g]$ look-up table. The $[C_p\text{-fd-}C_g]$ look-up table is composed of sets of $[C_p\text{-fd-}C_g]$ triplets that are created from the phase and group velocity dispersion curves of the S0 mode shown for example in FIGS. 15A and B, respectively. In block 1468, the plate thickness d is obtained by dividing the S0 mode frequency-thickness product $f_{S0}d$ obtained in block 1467 by the S0 mode peak frequency $f_{S0}$ obtained in block 1465. In block 1469, the group velocity of the S0 mode, $C_{gS0}$, is obtained by searching the $[C_p\text{-fd-}C_g]$ look-up table. In block 1462, the group velocity of the S0 mode, $C_{gS0}$, as one of the outputs of the $[C_p\text{-fd-}C_g]$ look-up table obtained in block 1469, is fed back in combination with the plate width (an approximation of which nominal value may be assumed known) to calculate the arrival time of an S0 packet, e.g., after a round-trip, and improve the windowing accuracy prior to the Fast Fourier Transform (FFT) operation for finding the peak frequency in blocks 1463 and 1464.

Referring to FIGS. 14F, the adaptive, multimode guided wave inspection system relates to the self-adjusted generation of a particular Lamb or Lamb-like mode based on the real-time measured plate thickness for the purpose of defect detection, for example by using the output extracted from flow chart 1460 of FIG. 14E. The procedure is described in flow chart 1470 of FIG. 14F and is centered on a $[C_p\text{-fd-}C_g]$ look-up table composed of sets of $[C_p\text{-fd-}C_g]$ triplets that are created from the phase and group velocity dispersion curves of the $A_1$ mode. Similar to the case of S0 packet windowing, the group velocity of the $A_1$ mode, $C_{gAn}$, as one of the outputs of the $[C_p\text{-fd-}C_g]$ look-up table, is used in combination with the plate width to calculate the arrival time of an $A_1$ packet, e.g., after a round-trip, and improve the windowing accuracy prior to computing the signal power of the windowed $A_1$ packet for defect detection. Similar related approaches may be used for defect detection using other modes that propagate in the test object. In contrast to FIG. 14B, since $C_p$ is known in the case of wedge excitation, it can be directly used as the input for table look-up.

As shown in FIG. 14F, the embodiment of flow chart 1470 describes an $A_n$ mode generation for defect detection. In block 1471, as in block 1466, phase velocity $C_p$ is obtained. In block 1473, the frequency-thickness product of the $A_n$ mode, $f_{An}d$, is obtained by searching the $[C_p\text{-fd-}C_g]$ look-up table. The $[C_p\text{-fd-}C_g]$ look-up table is composed of sets of $[C_p\text{-fd-}C_g]$ triplets that are created from the phase and group velocity dispersion curves of the $A_n$ mode, shown for example in FIGS. 15A and B, respectively. In block 1474, the $A_n$ excitation frequency, fan, is obtained by dividing the frequency-thickness product of the $A_n$ mode $f_{An}d$ obtained in block 1473 by the plate thickness d obtained in block 1468 of flow chart 1460. In block 1475, the group velocity of the $A_1$ mode, $C_{gAn}$, is obtained by searching the $[C_p\text{-fd-}C_g]$ look-up table. In block 1476, an excitation signal, having an $A_n$ excitation frequency fan obtained in block 1474, is transmitted through the piezoelectric transducer on a periodic basis. In block 1477, the group velocity of the $A_1$ mode, $C_{gAn}$, as one of the outputs of the $[C_p\text{-fd-}C_g]$ look-up table obtained in block 1475, is used in combination with the plate width to calculate the arrival time of an $A_n$ packet, e.g., after a round-trip, and improve the windowing accuracy prior to block 1478, where the signal power of the windowed $A_1$ packet is computed for defect detection. Other signal processing approaches such as phase shift computation through cross correlation of two packets or of the current value of a single packet with its previous value in time or other approaches know in the art may be used as a metric or metrics for defect detection. Similar related approaches may be used for defect detection using other, higher order, modes that propagate in the test object.

Referring now to FIG. 14G, the embodiment of flow chart 1480 describes plate thickness measurement using the SH1 mode and determining the peak frequency thereof. In block 1481, a chirp (frequency sweep) excitation signal is transmitted through the piezoelectric transducer on a periodic basis. In block 1483, the R EMAT conductor set receives the chirp signal in block 1481 that traveled on or through the test object. The R EMAT conductor set also receives a superimposed SH1 packet used for windowing in block 1482. Relevant instrumentation, such as the Data Analysis and Pre-processing 1380 system shown in FIG. 13, utilizes Fourier Transform or Fast Fourier Transform to convert the R EMAT output signal to the frequency domain. In block 1484, the magnitude spectrum of the R EMAT output for the SH1 mode is obtained. A local peak or peaks may exist in the magnitude spectrum at frequencies where the constant phase velocity line intersects individual phase velocity dispersion curves. In block 1485, the peak frequency corresponding to the SH1 mode, $f_{SH1}$, is extracted, which, in some embodiments, is the peak frequency having the greatest amplitude in the frequency domain. In block 1486, phase velocity $C_p$ is obtained by the shear wave velocity in the wedge material and the wedge angle, as shown in Equation 14-2. In block 1487, wavelength λ is obtained by dividing the phase velocity $C_p$ obtained in block 1486 by the SH1 mode peak frequency $f_{SH1}$ obtained in block 1485. In blocks 1488 and 1489, the plate thickness d is a function of phase velocity $C_p$ and wavelength λ. Therefore the plate thickness d can be derived by using the values of the phase velocity $C_p$ obtained in block 1486 and the wavelength λ obtained in block 1487. In block 1490, the group velocity of the SH1 mode, $C_{gSH1}$, is obtained by using the plate thickness d obtained in block 1489 and the wavelength λ obtained in block 1487. In block 1482, the group velocity of the SH1 mode, $C_{gSH1}$, obtained in block 1490, is fed back in combination with the plate width (an approximation of which nominal value may be assumed known) to calculate the arrival time of an SH1 packet, e.g., after a round-trip, and improve the windowing accuracy prior to the Fast Fourier Transform (FFT) operation for finding the peak frequency in blocks 1483 and 1484.

Referring to FIG. 14H, the embodiment of flow chart 1492 describes an $SH_n$ mode generation for defect detection. In block 1493, as in block 1487, wavelength λ is obtained. In block 1494, the mode order n of the $SH_n$ mode is selected. In block 1495, the $SH_b$ excitation frequency, $f_{SHn}$, is a function of the mode order n, the plate thickness d, and the wavelength λ. Therefore, the $SH_n$ excitation frequency, $f_{SHn}$, can be derived by using the values of the mode order n obtained in block 1494, the plate thickness d obtained in block 1489 of flow chart 1480, and the wavelength λ obtained in block 1493. In block 1496, the group velocity of the $SH_n$ mode, $C_{gSHn}$, is a function of the mode order n, the plate thickness d, and the wavelength λ. The group velocity of the $SH_n$ mode, $C_{gSHn}$, can be derived by using the values of the mode order n obtained in block 1494, the plate thickness d obtained in block 1489 of flow chart 1480, and the wavelength λ obtained in block 1493. In block 1497, an excitation signal, having an $SH_1$ excitation frequency $f_{SHn}$ obtained in block 1495, is transmitted through the piezoelectric transducer on a periodic basis. In block 1498, the group velocity of the $SH_n$ mode, $C_{gSHn}$, obtained in block 1496, is used in combination with the plate width to calculate the arrival time of an $SH_n$ packet, e.g., after a round-trip, and improve the windowing accuracy prior to block 1499, where the signal power of the windowed $SH_n$ packet is computed for defect detection. Other signal processing approaches such as phase shift computation through cross correlation of two packets or of the current value of a single packet with its previous value in time or other approaches know in the art may be used as a metric or metrics for defect detection.

In some embodiments, the logic sequences shown in FIGS. 14A-H may be implemented to form an adaptive, iterative, and multi-mode guided wave inspection system having the capability of operating at high inspection speed while simultaneously measuring several parameters of the test object and detecting multiple types of defects. The adaptive and iterative characteristics of the method/algorithm allow for a dynamical fine-tuning of the performance of the inspection as certain physical features of the test object vary during a relatively high-speed scan/inspection of the test object. In some embodiments, the adaptive, iterative, and multi-mode guided wave inspection system and method thereof can be utilized to measure wall thickness, to measure plate width or pipe diameter (or certain diameter intermediate between the inner and outer diameters), and to detect (and optionally sizing) a variety of defects.

In some embodiments, the adaptive, iterative, and multi-mode guided wave inspection system and method thereof are well-suited for inspecting plates or strips with changing wall thickness (whether or not by design). In some embodiments, the adaptive, iterative, and multi-mode guided wave inspection system and method thereof are well-suited for inspecting aging pipes and other structures of which the actual wall thickness may be significantly different from their nominal values. For example, when these pipes are subsurface, it is generally more difficult to obtain the actual wall thickness before the inspection. Engineering documents or standard engineering practice often provide valuable guidance in this respect.

In some embodiments, the adaptive, iterative, and multi-mode guided wave inspection system and method thereof can be implemented with various guided wave modes including but not limited to Lamb and Lamb-like waves in plates or strips, Lamb-like waves in pipes, guided SH waves in plates or strips, and guided SH waves in pipes.

In an example embodiment of the adaptive, iterative, and multi-mode guided wave inspection methods shown in FIGS. 14A-H, the first step relates to the determination of the wall thickness of the test object. The test object may include a plate, strip, or pipe. Wall thickness is determined by exciting the transmitter subsystem while sweeping the excitation frequency within a prescribed range. FFT of the received signal is calculated. Peak frequency is found in the magnitude spectrum of the system response. Average wall thickness can be calculated utilizing the relationship between the peak frequency and the wall thickness determined from dispersion characteristics of the wave modes that are utilized. The group velocity of the guided wave mode is determined. The wall thickness measurement is further improved by iteratively fine-tuning the windowing of the wave mode packets using the group velocity and the width of the plate or strip or diameter of the pipe.

In an example embodiment of the adaptive, iterative, and multi-mode guided wave inspection methods shown in FIGS. 14A-H, the second step relates to the adaptive excitation of desired wave modes. Certain guided wave mode or modes can be excited using the excitation frequency calculated from the adaptively measured wall thickness in the first step to measure width of the plate or strip or some intermediate diameter of the pipe between the inner and outer diameter. Certain guided wave mode or modes can be excited using the excitation frequency calculated from the adaptively measured wall thickness to detect a variety of forms of defects in plate or strip or the wall of the pipe.

In an example embodiment of the adaptive, iterative, and multi-mode guided wave inspection methods shown in FIGS. 14A-H, the logic of the first and second steps can be repeated continuously during an inspection with possibly different frequencies or repetition rates. For example, the first step can be repeated every second, while the defect detection of the second step can be repeated every few milliseconds so that no small defect escapes detection. As such, the first step sets the stage for a tuned performance of the second step. In addition, the wall thickness measured in the first step can be used to fine-tune the gating or windowing of certain packets in the receiver signal to improve the overall performance of parameter measurement and defect detection.

Referring back to FIGS. 11A-B, such an LPMS EMAT-based elastic wave measurement system 1100 may have wide applications due to the fact that magnetic materials are widely used, such as in railroads, seam welded and seamless pipes, construction, and the like. It should be noted that magnetic materials are in no way required for the practical utilization of LPMS EMAT-based measurement systems. In some embodiments, the LPMS EMAT-based elastic wave measurement system 1100 may be deployed for rail inspection to detect rail head cracking. In other embodiments, similar SH or other EMAT structures may be used to detect and quantify surface and internal material anomalies in lieu of using other approaches such as piezoelectric-based ultrasonic inspection systems. For example, NBSH waves may be used in lieu of longitudinal waves for measuring the rail height and for detecting the presence and determining the size of some bolt-hole cracks. Angle beam SH waves may be used for detecting and quantifying a variety of internal cracks throughout the rail head and the rest of the rail body. According to at least one embodiment, a T EMAT 1110 embodiment such as shown in FIGS. 11A-B may generate a bulk, surface-skimming SH wave propagating approximately parallel to the rail head surface and along the rail axis. An R EMAT 1120 such as shown in FIGS. 11A-B may detect the presence of this surface skimming SH wave after it has traveled some appropriate distance. In some embodiments, other useful information may be obtained using multiple R EMATs 1120 with appropriate separation distances along and diagonally across the rail axis. Changes in the relative amplitude of the displacements detected by the R EMATs 1120 reflect changes in cracking or other potentially defective conditions within the railhead. In some embodiments, a T EMAT 1110 may transmit the surface skimming SH wave at an angle with respect to the rail axis to gain additional information by enhancing signal loss when the SH displacements are reflected from one side of the railhead such as the gauge or the inner side of the rail (the rail wheel flange may concentrate railhead stress at the top inner region of the railhead). In some embodiments, a special LPMS or other EMAT can be formed to generate SH displacements in the rail head near to and around the gauge curved surface to evaluate this difficult-to-reach region for the presence of small cracks that may have a propensity to grow rapidly. In some embodiments, similar approaches may be adopted for weld and spot-weld evaluation for such welds in steel or other metal plates, in steel or other metal tubing, and in other welded assemblies. In some embodiments, SH bulk or guided waves, generated for example by structures shown in FIGS. 7A-B and 8, are suitable for pigging applications, where the SH guided waves may propagate circumferentially, axially, or in another manner such as a spiral configuration within the wall of the pipe or other test object. In some embodiments, SH bulk and guided waves, generated for example by structures shown in FIGS. 7A-B and 8, are suitable for measuring and monitoring residual and applied stresses. In some embodiments, SH bulk and guided waves, generated for example by structures shown in FIGS. 7A-B and 8, are suitable for weld defect detection and sizing.

According to at least one embodiment, an LPMS EMAT based elastic wave measurement system 1100 may be suitable for long range ultrasonic testing to find pitting and cracking in piping systems at distances up to tens of meters or, in some embodiments, over 100 meters from the wave source. The LPMS EMAT based elastic wave measurement system 1100 may implement using SH guided waves generated by the LPMS unit 1110. For long range ultrasonic testing, the SH EMAT 1110 structure is configured to send SH waves along the pipe axis and may use frequencies in the range of about 10 to about 100 kHz for long-range testing on pipe. In some embodiments, the frequencies used for long range ultrasonic testing on pipes are lower than that for rail inspection. In some embodiments, multiple R EMATs may be deployed. In addition, various forms of long-range ultrasonic testing may be adapted to locate dis-bonds between pipe insulation or other material and the outer pipe surface. SH wave propagation within the pipe wall may be influenced by material within the pipe and this influence depends upon material adhesion characteristics of the pipe's inner surface. Similar approaches relate to material on the outer surface. Long range SH waves can be launched along the axis of a pipe to evaluate inaccessible portions of the pipe, including buried or insulated section of the pipe. Related approaches may be applied to infrastructure assessment such as the measure and/or monitoring of various properties of tanks, bridge beams, and the like.

According to at least one embodiment, an LPMS EMAT-based elastic wave measurement system 1100 may be suitable for short range ultrasonic testing to characterize defects anywhere within the body wall in test objects 1130, such as pipes, at distances up to about 1 m or up to about 2 m from the transmitting conductor set 1140. In some embodiments, the SH guided waves propagate along the pipe axis and anywhere within the body wall as the SH guided wave system moves around or is deployed around the circumference in a manner that evaluates the entire material volume over a specified axial distance. In some embodiments, the axially propagating SH guided wave generated by T EMATs distributed around all or a portion of the circumference may be excited so as to focus elastic energy into controlled regions axially separated from the T EMAT structure and thereby increase detection sensitivity and system utility. Accompanying these T EMATs, there would be an arrangement of R EMATs distributed around the circumference and otherwise over the surface of the pipe or other test object. Signals emanating from these R EMATs may be processed using standard signal processing methods, in some embodiments, methods associated with the use of phased ultrasonic arrays in a manner that enhances the detection of material anomalies. Additionally, the well-known Synthetic Aperture Focusing Technique (SAFT) method may be used. In other embodiments, the SH guided waves propagate around the pipe and anywhere within the body wall as the SH guided wave system moves along the pipe axis in a manner that may evaluate the entire material circumferential volume. In some embodiments, the LPMS EMAT based elastic wave measurement system 1100 may include an LPMS EMAT to have a curved shape so as to conform or substantially conform to the pipe circumference. In some embodiments, the frequency/wavelength and mode of these SH waves have properties that often allow the waves to propagate the desired distance and to interact with materials on the test object surface 1132. In some embodiments, frequencies may be in the range of about 100 to about 900 kHz. In other embodiments, frequencies may be lower than about 25 kHz, especially for thick-walled or thick material. In some embodiments, shielding techniques are implemented to minimize coupling between the transmitting and receiving conductor sets 1140, 1142. The shielding may result in a smaller dead zone or blind region in some EMAT measurement configurations. In some embodiments, such short range ultrasonic testing may be used to evaluate refinery piping for defects within the body wall using an axial scanning system that transmits guided waves around the circumference. In other embodiments, such short range ultrasonic testing may be used to evaluate refinery piping for defects within the body wall using a circumferential scanning system that transmits waves parallel to the pipe axis to evaluate, for example, girth welds. For example, the LPMS shown in FIGS. 6A-B may be used to generate Lamb-like elastic modes and the LPMS shown in FIGS. 7A-B and 8 may be used to generate SH guided waves. In some embodiments, such LPMS EMAT systems 1100 may be configured to operate at a large frequency times thickness (fd) product, greater than about 5 or about 10 (in units of MHz-mm), where higher-order mode clusters (HOMC) have been used for guided wave NDT. In other embodiments, such LPMS EMAT systems 1100 may be configured to characterize defects in the body wall of coiled tubing and other Oil Country Tubular Goods (OCTG), including defect characterization within the weld and heat affected zone. An LPMS SH EMAT configuration 1100 may be used in coiled tubing and other OCTG evaluation where magnetic domain noise may exist following certain types of heat treatment or other fabrication processes. In some embodiments, such LPMS EMAT systems 1100 configured for short range ultrasonic testing may be used to detect and characterize defects in seamless tubing used in the petroleum industry for oil well casing and choke and kill lines that, for example, may accompany the use and installation of offshore risers. In some embodiments, multiple R EMATs may be deployed, sometimes in the form of phased arrays.

According to at least one embodiment, LPMS SH and Lamb-like EMAT structures, such as shown in FIGS. 6A-B, 7A-B, and 8, are suitable for evaluating welds, including thick section welds such as those contained in the longitudinal and circumferential welds of risers and a variety of pressure vessels. In some embodiments, various LPMS structures, such as shown in FIGS. 6A-B, 7A-B, and 8, are suitable for evaluating reformer tubes and similar objects for changes in the internal material structure, such as grain growth and grain reorientation, and for cracking. In some embodiments, various LPMS structures, such as shown in FIGS. 6A-B, 7A-B, and 8, are suitable for evaluating an outer region of support plates used on large aboveground storage tanks and similar structures where there is limited access for placement of transmitting and receiving transducers for extracting information from particular regions of the test object 1130 where either a transmitting or receiving structures cannot be placed. An LPMS having compact physical size may be suitable compared to other means of generating guided waves for such tasks. In some embodiments, time-of-flight diffraction (ToFD) may be used when SH or other waves are incident upon a crack being sized, as opposed to the customary approach of using longitudinal and/or SV waves. In some embodiments, multiple R EMATs may be deployed.

According to at least one embodiment, guided waves generated via LPMS EMAT structures, such as shown in FIGS. 6A-B, 7A-B, and 8, may be suitable for assessing the integrity of civil structures such as bridges, power transmission towers, and wind turbine support structures. These applications may involve detecting stress corrosion cracking (SCC), dis-bonds, delaminations, and other material conditions and anomalies. In some embodiments, these applications may involve detecting regions of localized stress. In some embodiments, LPMS EMATs are used in what may be and has been referred to as resonant EMAT systems which may provide improved sensitivity to detecting small material anomalies and changes in internal stresses of a test object. In some embodiments, multiple R EMATs may be deployed. In some embodiments, a conducting material such as a conducting sheet may be bonded to the surface of a non-conducting or poorly conducting material wherein elastic forces are generated within the conducting material and these forces are transferred via the usually thin bonding layer to the underlying non-conducting or poorly conducting material.

According to at least one embodiment, an LPMS EMAT based elastic wave measurement system (including system 1100 shown in FIGS. 11A-B) may be incorporated into a mechanical crawler or a robot inspection system. In some embodiments, the LPMS EMAT based elastic wave measurement system 1100 is suitable for use in restricted spaces, such as a vacuum environment and they may be designed for use in hazardous environments.

According to at least one embodiment, an LPMS EMAT based elastic wave measurement system 1100 may be suitable for detecting and even characterizing viscoelastic materials on a surface of a structure. SH waves, including SH guided waves, show damping where viscoelastic materials are present on the surface of test objects where SH guided waves propagate and possibly for surfaces from which SH waves are reflected. The viscoelastic material may exist in joints or connections between two plates of conducting material or between multiple plate joints or in between one or more plates of conducting material and one or more plates of non-conducting material. The propagation, reflection, and transmission characteristics of the SH waves may also depend on the presence of voids and dis-bonds within the viscoelastic material. In some embodiments, an LPMS EMAT based elastic wave measurement system (including system 1100 shown in FIGS. 11A-B) is suitable for evaluating adhesive bonds that may exist in metal-metal or metal-nonmetal structures.

Figure 16A:
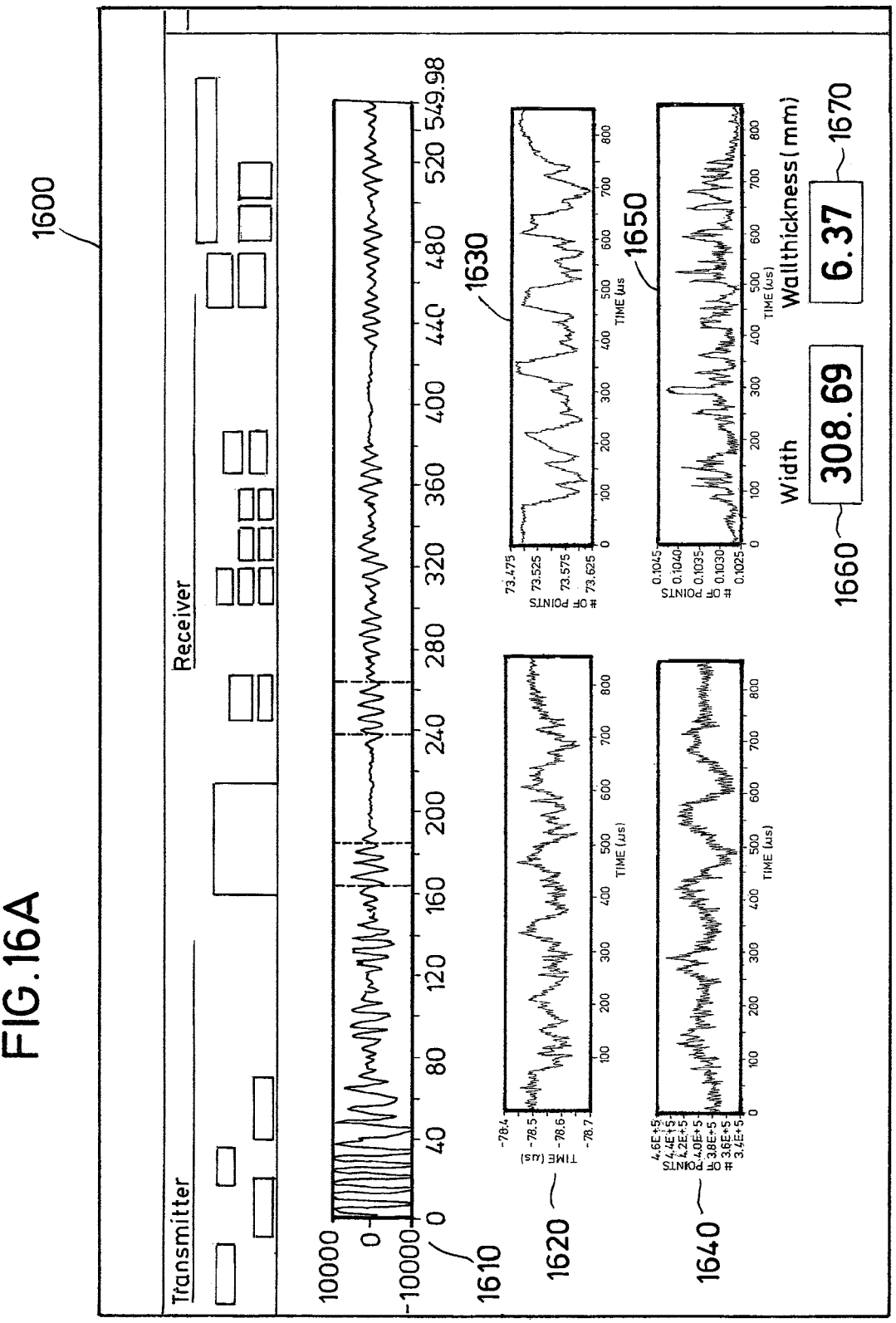
FIG. 16A shows a graphical depiction of a user interface according to at least one embodiment of the present disclosure.
Figure 16E:
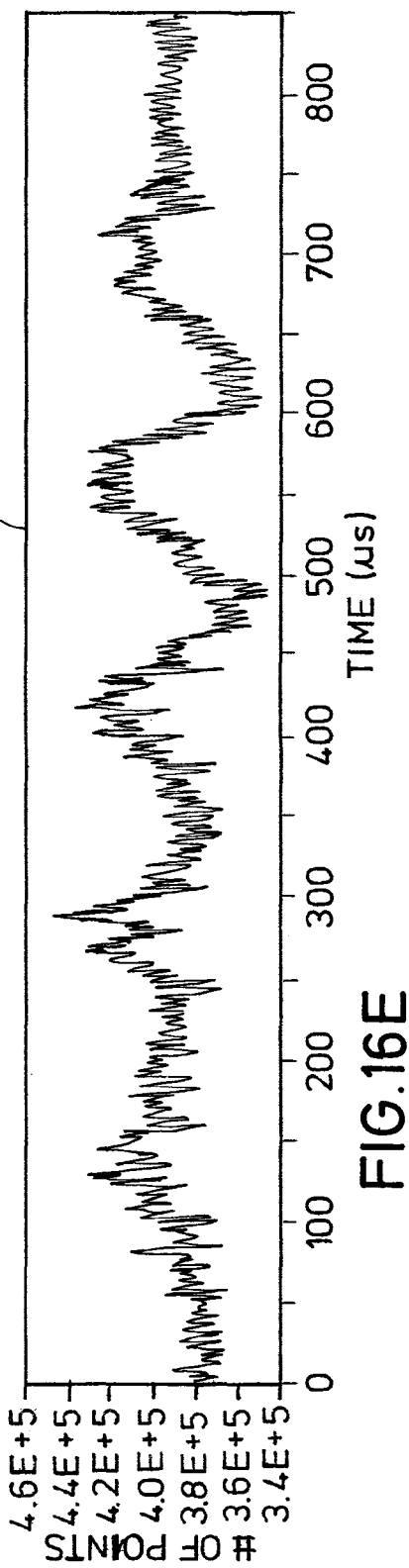
Figure 16F:
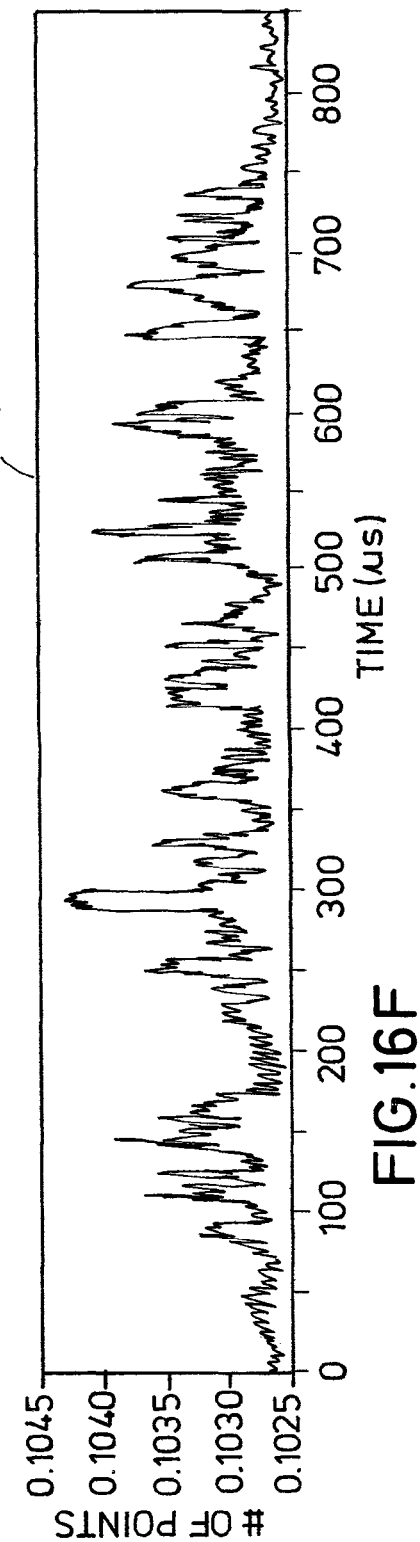

Referring now to FIG. 16A shows a graphical depiction of a user interface 1600 according to at least one embodiment of the present disclosure. FIGS. 16B-F show enlarged views of the graphs displayed on the user interface in FIG. 16A. Results are obtained where the plate thickness, plate width, and the presence of material anomalies, in some embodiments, naturally occurring material anomalies, are determined as the LPMS EMAT assembly is moved over the surface of a steel plate. FIG. 16B shows a graph 1610 of the R EMAT signal. Ranges 1612 and 1614 show windows that are used for specific aspects of data analysis. As described in FIGS. 12A-C, range 1612 corresponds to the short round trip for the SH0 mode generated by T EMAT 1210 and received by R EMAT 1220. Range 1614 corresponds to the long round trip for the SH0 mode generated by T EMAT 1210 and received by R EMAT 1220. FIG. 16C shows a graph 1620 corresponding to the difference in arrival times for the windowed signals (e.g., range 1614 minus range 1612). FIG. 16D shows a graph 1630 corresponding to a running average of ten such time-differences shown in FIG. 16C. FIG. 16E shows a graph 1640 corresponding to the amplitude profile for the same scan. FIG. 16F shows a graph 1650 corresponding to the time difference data obtained from graph 1630 with the median removed and squared. Referring back to FIG. 16A, the lower right hand side shows blocks 1660 and 1670, corresponding to the plate width determined using the SH0 mode and the wall thickness determined using the SH1 mode, both in mm, respectively.

Embodiments of the invention described herein may use the dimensions of certain elements and parameters of LPMS EMAT systems such as wavelength and the T-EMAT to R EMAT separation distance for the quantitative determination of certain parameters and properties of the test object such as thickness to establish the position of certain windows for certain data analysis and processing operations. One skilled in the art of making measurements using general ultrasonic methods would recognize that calibration procedures as opposed to direct measurement of these parameters may be a more appropriate approach to obtaining these quantities.

Embodiments of the invention described herein, therefore, are well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

Although the embodiments of the invention have been described in detail, it should be understood that various changes, substitutions, and alterations can be made hereupon without departing from the principle and scope of the invention. Accordingly, the scope of the present invention should be determined by the following claims and their appropriate legal equivalents.

Implementations of the subject matter and the functional operations described in this disclosure can be implemented in various systems, digital electronic circuitry, or in computer software, firmware, or hardware, including the structures disclosed in this specification and their structural equivalents, or in combinations thereof. Implementations of the subject matter described in this disclosure can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges can be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the embodiments of the invention.

While embodiments of the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. Embodiments of the invention can suitably comprise, consist or consist essentially of the elements disclosed and can be practiced in the absence of an element not disclosed.

What is claimed is:

1. An electromagnetic acoustic transducer (EMAT) system for nondestructive testing and evaluation of a test object, the EMAT system comprising:
   a plurality of alternating magnets having a like pole arrangement and in close proximity to one another and serially spaced apart,
   a conductor set comprising electrically conductive elements and adapted to generate or receive a plurality of wave modes, at least a portion of the conductor set being positioned in an active region,
   wherein the active region is defined by areas between and under the plurality of like pole magnets,
   wherein the plurality of like pole magnets are adapted to be positioned so that the direction of magnetization in the magnets is substantially parallel to the test object, and
   wherein the EMAT system is configured to generate or receive one or more of the following elastic waves in the test object and adjacent to the active region: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode.

2. The EMAT system of claim 1, further comprising:
   a magnet separator made from magnetic or non-magnetic material configured to provide fixation of the like pole arrangement of the plurality of magnets.

3. An electromagnetic acoustic transducer (EMAT) based elastic wave measurement system for nondestructive testing and evaluation of a test object, the EMAT based elastic wave measurement system comprising:
   a receiving EMAT configured to receive an elastic wave when positioned proximate to the test object,
   the receiving EMAT further comprising:
   a plurality of alternating magnets having a like pole arrangement and in close proximity to one another and serially spaced apart,
   a conductor set comprising electrically conductive elements and adapted to receive a plurality of wave modes, at least a portion of the conductor set being positioned in an active region,
   wherein the active region is defined by areas between and under the plurality of like pole magnets;
   wherein the plurality of like pole magnets are adapted to be positioned so that the direction of magnetization in the magnets is substantially parallel to the test object and,
   wherein the receiving EMAT is configured to receive one or more of the following elastic waves in the test object and adjacent to the active region: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode.

4. The EMAT based elastic wave measurement system of claim 3, further comprising:
a transmitting EMAT configured to generate a plurality of elastic waves,
the transmitting EMAT further comprising:
a second plurality of alternating magnets having a like pole arrangement and in close proximity to one another and serially spaced apart,
a second conductor set comprising electrically conductive elements and adapted to generate the plurality of wave modes, a portion of the conductor set being positioned in a second active region,
wherein the second active region is defined by areas between and under the second plurality of like pole magnets of the transmitting EMAT, and
wherein the second plurality of like pole magnets are adapted to be positioned so that the direction of magnetization in the magnets is substantially parallel to the test object, and
wherein the transmitting EMAT is configured to generate one or more of the plurality of elastic waves in the test object and adjacent to the second active region: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode.

5. The EMAT based elastic wave measurement system of claim 4, further comprising:
an EMAT driver configured to provide current to the transmitting EMAT;
a system controller including software for system management,
a high speed digital output configured to receive input from the system controller and deliver digital output signals for generating a desired waveform via the EMAT driver and the transmitting EMAT,
a receiver signal conditioning system configured to receive input from the receiving EMAT and deliver a waveform input to a signal digitizer,
the signal digitizer configured to receive input from the system controller and deliver a digitized version of the waveform input to a data analysis and pre-processing system,
the data analysis and pre-processing system configured to extract predetermined information from the digitized version of the waveform input, and
a user interface with processing system including a console for a measurement parameter input, wherein the user interface with processing system is configured to display information received from the data analysis and pre-processing system and deliver the measurement parameter input to the system controller.

6. An electromagnetic acoustic transducer (EMAT) system for nondestructive testing and evaluation of a test object, the EMAT system comprising:
a plurality of alternating magnets having a like pole arrangement and in close proximity to one another and serially spaced apart;
a first conductor set comprising electrically conductive elements and adapted to provide a plurality of wave modes, a portion of the first conductor set being positioned in an active region;
a second conductor set comprising electrically conductive elements, a portion of the second conductor set being positioned in the active region;
wherein the active region is defined by areas between and under the plurality of like pole magnets;
a first EMAT driver configured to provide current to the first conductor set; and
a second EMAT driver configured to provide current to the second conductor set,
wherein the plurality of like pole magnets are adapted to be positioned so that the direction of magnetization in the magnets is substantially parallel to the test object; and
wherein the EMAT system is configured to generate at least two elastic waves simultaneously.

7. The EMAT system of claim 6, wherein the at least two elastic waves include one of the following: having different phases or having difference frequencies.

8. The EMAT system of claim 6, wherein the elastic waves are one or more of the following: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode.

9. A method of elastic wave measurement for nondestructive testing and evaluation of a test object, the method comprising the steps of:
positioning an electromagnetic acoustic transducer (EMAT) proximate the test object;
the EMAT comprising:
a plurality of alternating magnets having like pole arrangements and in close proximity to one another and serially spaced apart,
a conductor set comprising electrically conductive elements and adapted to receive a plurality of wave modes, a portion of the conductor set being positioned in an active region,
wherein the active region is defined by areas between and under the plurality of like pole magnets,
wherein the plurality of like pole magnets are adapted to be positioned so that the direction of magnetization in the magnets is substantially parallel to the test object;
generating an elastic wave such that the elastic wave propagates at least one of in and on the test object,
detecting the elastic wave propagating at least one of in and on the test object via the EMAT, wherein the elastic wave is one or more of the following: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode, and
analyzing differences in elastic wave character between the elastic wave in the generating step and the elastic wave in the detecting step to evaluate the test object.

10. A method of elastic wave measurement for nondestructive testing and evaluation of a test object, the method comprising the steps of:
positioning an electromagnetic acoustic transducer (EMAT) proximate to the test object;
generating an elastic wave via the EMAT such that the elastic wave propagates at least one of in and on the test object, the EMAT comprising:
a plurality of alternating magnets having a like pole arrangement, each magnet being in close proximity to one another and serially spaced apart,
a conductor set comprising electrically conductive elements and adapted to generate a plurality of wave modes, a portion of the conductor set being positioned in an active region, and wherein the active region is defined by areas between and under the plurality of like pole magnets, wherein the plurality of like pole magnets are adapted to be positioned so that the direction of magnetization in the magnets is substantially parallel to the test object, and wherein the generated elastic wave is one or more of the following: a normal beam shear horizontal wave, an angle beam shear horizontal wave, a shear horizontal guided wave, an angle beam shear vertical wave, an angle beam longitudinal wave, a surface wave, a Rayleigh wave, a Lamb wave, an interfacial wave, and a pipe mode, detecting the elastic wave propagating at least one of in and on the test object; and analyzing differences in elastic wave character between the elastic wave in the generating step and the elastic wave in the detecting step to evaluate the test object.

11. The method of claim 10, further comprising the step of:

positioning a second EMAT proximate to the test object, wherein the elastic wave propagating at least one of in and on the test object is detected via the second EMAT, the second EMAT comprising:

a second plurality of alternating magnets having like pole arrangements and in close proximity to one another and serially spaced apart, a second conductor set comprising electrically conductive elements and adapted to receive a second plurality of wave modes, a portion of the second conductor set being positioned in an active region, wherein the active region is defined by areas between and under the second plurality of like pole magnets, and wherein the second plurality of like pole magnets are adapted to be positioned so that the direction of magnetization in the magnets is substantially parallel to the test object.

* * * * *